United States Patent
Namizuka

(10) Patent No.: US 6,934,057 B1
(45) Date of Patent: Aug. 23, 2005

(54) IMAGE-PROCESSING DEVICE INDEPENDENTLY CONTROLLING EACH OF FUNCTIONS THAT CORRECT DENSITY OF IMAGE

(75) Inventor: Yoshiyuki Namizuka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1008 days.

(21) Appl. No.: 09/704,624

(22) Filed: Nov. 3, 2000

(30) Foreign Application Priority Data

| Nov. 5, 1999 | (JP) | ................................. 11-315820 |
| Feb. 24, 2000 | (JP) | ............................. 2000-047993 |
| Aug. 31, 2000 | (JP) | ............................. 2000-264423 |

(51) Int. Cl.[7] .......................... H04N 1/40; H04N 1/405; H04N 1/407
(52) U.S. Cl. ..................... 358/2.1; 358/3.01; 358/3.03; 358/3.13; 358/3.21
(58) Field of Search ............................... 358/1.9, 3.01, 358/2.1, 3.21, 3.24, 3.26, 3.27, 504, 521, 358/406, 462, 1.13, 3.03, 3.06, 3.13; 347/131, 347/240, 251

(56) References Cited

U.S. PATENT DOCUMENTS 4,344,708 A * 8/1982 Tokuda ........................ 356/404
5,050,221 A   9/1991 Ohta et al.
6,384,857 B2 * 5/2002 Sasanuma et al. .......... 347/251

FOREIGN PATENT DOCUMENTS

JP         9-224155         8/1997

* cited by examiner

*Primary Examiner*—Scott A. Rogers
(74) *Attorney, Agent, or Firm*—Oblon, Spivak, McClelland, Maier & Neustadt, P.C.

(57) ABSTRACT

An image-processing device includes an image-reading unit that reads image data from a document optically, an image-recording unit that records the image data read onto recording paper, a first-density-correction unit that corrects first density characteristics that depend on the image-reading unit, a second-density-correction unit that corrects second characteristics to reproduce density of the document, a third-density-correction unit that corrects third density characteristics that depend on the image-recording unit, and a control unit that independently controls each of the first, second and third density-correction units to execute density correction.

The image-processing device can record a high-quality image by adjusting the above described density characteristics by controlling each of the first, second and third density-correction units independently.

35 Claims, 38 Drawing Sheets

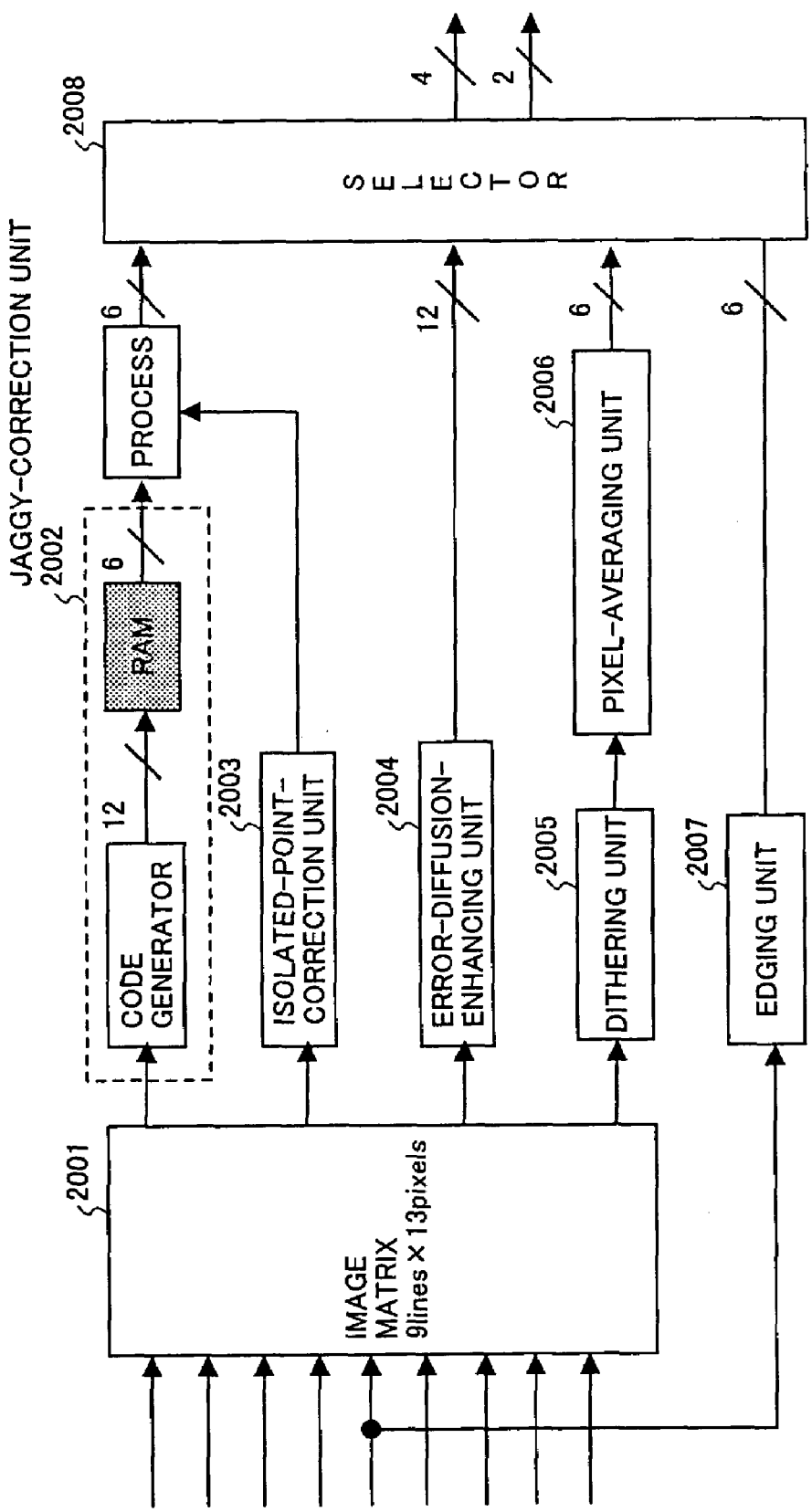

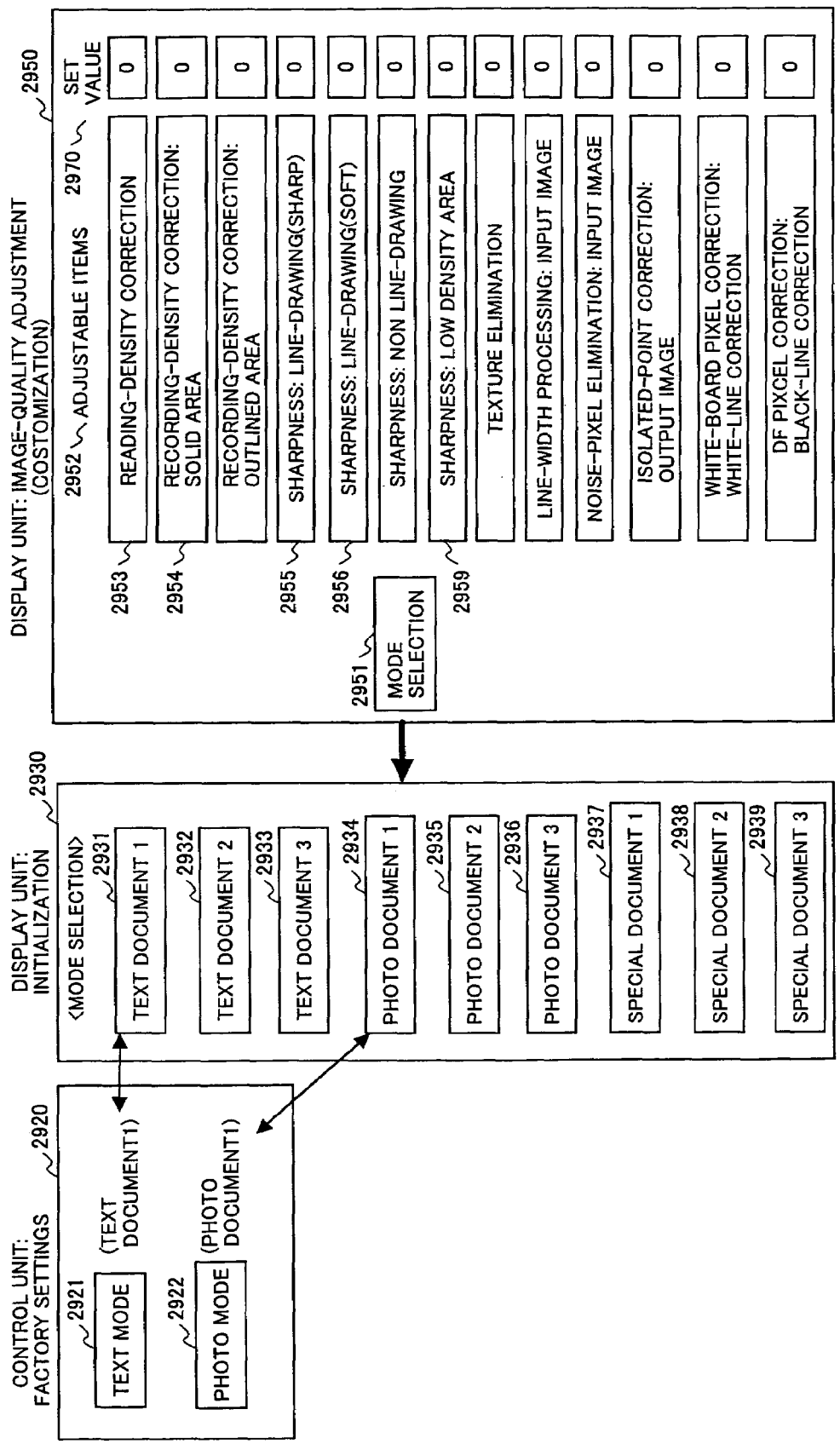

FIG.30A

DISPLAY UNIT: IMAGE-QUALITY ADJUSTMENT
(COSTOMIZATION)

| ADJUSTABLE ITEMS | SET VALUE |
|---|---|
| READING-DENSITY CORRECTION | +1 |
| RECORDING-DENSITY CORRECTION: SOLID AREA | -1 |
| RECORDING-DENSITY CORRECTION: OUTLINED AREA | +2 |
| SHARPNESS: LINE-DRAWING(SHARP) | 0 |
|  |  |
| SHARPNESS: NON LINE-DRAWING | -1 |
| SHARPNESS: LOW DENSITY AREA | +2 |
| TEXTURE ELIMINATION | 0 |
| LINE-WIDTH PROCESSING: INPUT IMAGE | 0 |
| NOISE-PIXEL ELIMINATION: INPUT IMAGE | 0 |
| ISOLATED-POINT CORRECTION: OUTPUT IMAGE | +2 |
| WHITE-BOARD PIXEL CORRECTION: WHITE-LINE CORRECTION | 0 |
| DF PIXCEL CORRECTION: BLACK-LINE CORRECTION | 0 |

TEXT DOCUMENT1

FIG.30B

DISPLAY UNIT: IMAGE-QUALITY ADJUSTMENT
(COSTOMIZATION)                                    2950

| 2952 ADJUSTABLE ITEMS 2970 | SET VALUE |
|---|---|
| READING-DENSITY CORRECTION | −1 |
| RECORDING-DENSITY CORRECTION: SOLID AREA | +1 |
| RECORDING-DENSITY CORRECTION: OUTLINED AREA | 0 |
| 2955 | 0 |
| SHARPNESS: LINE-DRAWING(SOFT) | +1 |
| | 0 |
| | 0 |
| | 0 |
| | 0 |
| NOISE-PIXEL ELIMINATION: INPUT IMAGE | 0 |
| ISOLATED-POINT CORRECTION: OUTPUT IMAGE | 0 |
| WHITE-BOARD PIXEL CORRECTION: WHITE-LINE CORRECTION | 0 |
| DF PIXCEL CORRECTION: BLACK-LINE CORRECTION | 0 |

PHOTO DOCUMENT2

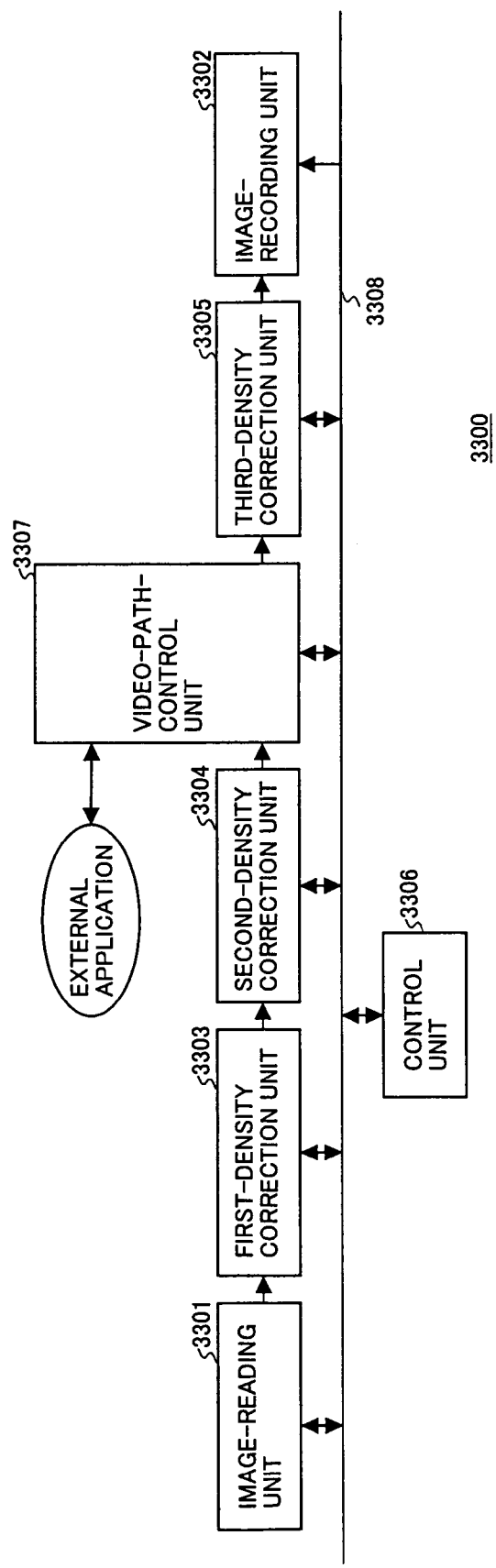

IMAGE-PROCESSING DEVICE INDEPENDENTLY CONTROLLING EACH OF FUNCTIONS THAT CORRECT DENSITY OF IMAGE

BACKGROUND OF THE INVENTION

1. Field of the Invention

The present invention relates to an image-processing device that reads image data optically by use of an image-reading unit such as a scanner from a document, and records the image data read by the image-reading unit on recoding paper by use of an image-recording unit such as a printer. The present invention particularly relates to an image-processing device, a method to process an image, and a record medium for efficiently correcting density of image data at an image-reading unit, the density of the image data at an image-recording unit and the density of the image data controlled by a density notch.

2. Description of the Related Art

A device that includes an image-reading unit such as a copy machine, a scanner and a facsimile is commonly used recently. A device that includes an image-recording unit such as a printer is also commonly used. In addition, a composite device that includes a plurality of devices such as a copy machine, a scanner, a facsimile and a printer has been placed on the market. The above-described devices adopt various methods to correct density of an image. For instance, a method to correct density characteristics of image data that depend on the image-reading unit by widening signal levels of the image data that is read from a document by the image-reading unit is referred to as input-density correction. A method to correct density of image data in an electrical area by increasing and decreasing the density by an operation using a density notch is referred to as notch-density correction. A method to correct density of image data by adjusting settings of the image-recording unit is referred to as recording-density correction.

For instance, Japanese Laid-Open Patent Application No. 9-224155 discloses an image-processing device that includes a plurality of density-conversion methods to convert density of image data to a digital signal by applying several data-conversion methods, and a method to select one of the density-conversion methods according to detection of density distribution of the image data. This conventional technology is adapted to the above-described input-density correction so that the image-processing device can easily execute density correction on various types of documents such as a document wherein texture density of the document is high, a document wherein texts are written in low density, a graph on a graph sheet, a photograph and a drawing. However, units and methods that execute the input-density correction and the notch-density correction are combined together in the above-described image-processing device, and thus a user cannot control each of the input-density correction and the notch-density correction separately. Additionally, the user cannot control the recording-density correction individually in the above-described image-processing device.

Accordingly, the image-processing device can only execute the input-density correction at its image-reading unit, but cannot execute the notch-density correction and the recording-density correction separately so that a high-quality output image may not be obtained by the above-described image-processing device. For instance, when a composite device whereto the above-described conventional technology is adapted executes a printer function, image data that has not been processed through the image-reading unit is supplied from an external application to the image-recording unit where the image data is recorded on recording paper, and thus the input-density correction on the image data at the image-reading unit is not executed. Additionally, when the composite device executes an image-copying function, stains are removed from the texture of image data read by the image-reading unit by executing the input-density correction at the image-reading unit. However, there is a case that an output image may not be a desirable one by light-emitting characteristics of the image-recording unit since the recording-density correction cannot be adjusted independently by a user.

Accordingly, it is a significant issue to efficiently execute the above-described input-density correction, notch-density correction and recording-density correction. In other words, it is a significant issue to optimize density correction in an image-processing device such as a copy machine, a scanner, a facsimile, a printer and a composite device.

SUMMARY OF THE INVENTION

Accordingly, it is a general object of the present invention to provide an image-processing device, a method to process an image, and a record medium for efficiently executing input-density correction, notch-density correction and recording-density correction.

The above-described object of the present invention is achieved by an image-processing device including an image-reading unit that reads image data from a document optically, an image-recording unit that records the image data read onto recording paper, a first-density-correction unit that corrects first density characteristics that depend on the image-reading unit, a second-density-correction unit that corrects second characteristics to reproduce density of the document, a third-density-correction unit that corrects third density characteristics that depend on the image-recording unit, and a control unit that independently controls each of the first, second and third density-correction units to execute density correction.

The image-processing device can record a high-quality image by adjusting the density of the image by controlling each of the first, second and third density-correction units independently.

Other objects, features and advantages of the present invention will become more apparent from the following detailed description when read in conjunction with the accompanying drawings.

BRIEF DESCRIPTION OF THE DRAWINGS

FIGS. 6A, 6B and 6C are diagrams showing respectively a 4×4 dither matrix, a 6×6 dither matrix, and a 8×8 dither matrix;

FIG. 20 is a block diagram showing a smoothing function provided in the composite device;

FIGS. 29A and 29B are block diagrams showing an operation screen provided in an operation unit according to a fourth embodiment of the present invention;

FIGS. 30A and 30B are block diagrams showing the operation screen and adjustable items of an image-quality mode;

FIG. 33 is a block diagram showing an image-processing system according to a sixth embodiment of the present invention.

DESCRIPTION OF THE PREFERRED EMBODIMENTS

A description will now be given of preferred embodiments of the present invention, with reference to the accompanying drawings.

Figure 1:
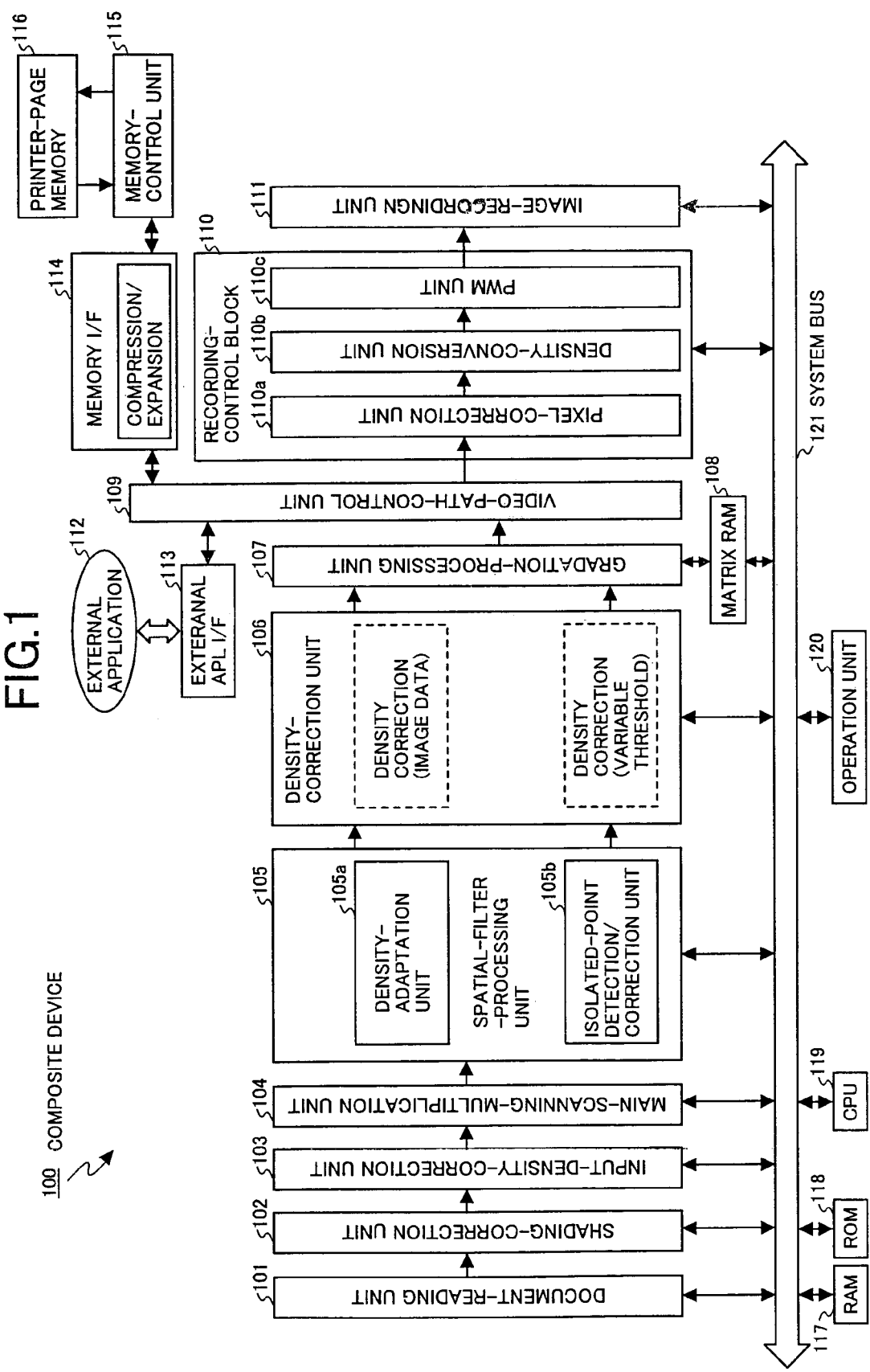
FIG. 1 is a block diagram showing a structure of a composite device according to a first embodiment of the present invention.

FIG. 1 is a block diagram showing a structure of a composite device including an image-reading unit and an image-recording unit, according to a first embodiment of the present invention. A composite device 100 shown in FIG. 1 can control input-density correction, notch-density correction, and recording-density correction individually to execute the most appropriate density correction on input image data for recording a high-quality image. The input-density correction is a method to correct density of an image by use of an image signal obtained from the image when the image is read by the image-reading unit. The notch-density correction is a method to correct density of an image in electricity domain by adjusting recording density of the image by a user operating a density notch. The recording-density correction is a method to correct density of an image by controlling the image-recording unit.

Conventional composite devices execute the input-density correction and the notch-density correction as a single process, whereas the composite device according to the first embodiment of the present invention can control and execute each of the above-described corrections individually. Additionally, a user can adjust the recording-density correction executed by the composite device according to the first embodiment by use of a control unit provided therein. Accordingly, the composite device according to the first embodiment can eliminate stains on the texture of a document, can set density of an image to be a desirable value by controlling a density notch, and can adjust sharpness of the image according to a type of the document.

The composite device 100 shown in FIG. 1 includes a document-reading unit 101, a shading-correction unit 102, an input-density-correction unit 103, a main-scanning-multiplication unit 104, a spatial-filter-processing unit 105, a density-correction unit 106, a gradation-processing unit 107, a matrix RAM (Random Access Memory) 108, a video-path-control unit 109, a recording-control block 110, an image-recording unit 111, an external application (APL) 112, an external-application interface (I/F) 113, a memory interface 114, a memory-control unit 115, a printer-page memory 116, a RAM 117, a ROM (Read Only Memory) 118, a CPU (Central Processing Unit) 119, an operation unit 120, and a system bus 121.

The document-reading unit 101 is a scanner optically reading a document provided on a document tray not shown in FIG. 1. In other words, the document-reading unit 101 reads density of the document by executing an optical image-scanning process, for instance, by emitting light from a light source onto the document, and then receiving the light reflected on the document. The document-reading unit 101 then converts the density of the document read by the optical image-scanning process to an analog electric signal by use of an imaging device such as a CCD (Charge Coupled Device), and converts the analog electric signal to a digital electric signal, followed by supplying the digital electric signal as a density signal to the shading-correction unit 102. The shading-correction unit 102 is a processing unit that corrects unevenness of the density of the document caused by the light source and the optical image-scanning process. To be concrete, the shading-correction unit 102 reads a density signal indicating density of a white board in advance by use of the document-reading unit 101, and stores the density signal indicating the density of the white board as a standard density signal in a memory. When receiving the density signal indicating the density of the document, the shading-correction unit 102 corrects the density signal of the document for each dot at each image-reading line of the document in a main-scanning direction by use of the standard density signal stored in the memory. The corrected density signal of the document is then supplied to the input-density-correction unit 103. The density signal of the document after being processed through the above-described shading correction executed by the shading-correction unit 102 is linear to a reflection rate of the light that is emitted from the light source and reflected by the document.

The input-density-correction unit 103 is a processing unit that corrects density characteristics of a document depending on the document-reading unit 101, and converts a density signal supplied from the shading-correction unit 102 to another digital signal which characteristic is linear to density of an image recorded on a surface of the document. To be concrete, the characteristics of the document-reading unit 101 reading an image is measured, and a conversion table including the opposite characteristics of the document-reading unit 101 reading the image is downloaded to the RAM 117 in advance. The input-density-correction unit 103 converts the density signal supplied from the shading-correction unit 102 to another density signal that is linear to the density of the image recorded on the document by use of γ-correction with reference to the conversion table. Additionally, the input-density-correction unit 103 increases density of a part of the document having a low density, and decreases density of a part of the document having a high density, thereby increasing effect of the density correction.

The main-scanning-multiplication unit 104 is a processing unit that expands and reduces size of an image recorded on the document by each image-reading line by the CCD in the main-scanning direction. The main-scanning-multiplication unit 104 expands and reduces the image by each image-reading line with keeping an MTF of an optical system provided in the document-reading unit 101 by use of a convolution method, so as to keep resolution of the image read from the document-reading unit 101. On the other hand, expansion and reduction of the image by each image-reading line in a sub-scanning direction are mechanically controlled.

The spatial-filter-processing unit 105 prepares for gradation processing of the image, and extracts features of the image by use of a density-adaptation unit 105a and an isolated-point detection/correction unit 105b included therein. The spatial-filter-processing unit 105 further includes an MTF-correcting function, a smoothing function, an edge-segment-extracting function and a variable-threshold-setting function, and outputs filtered image data and a variable threshold calculated from various conditions for binarization to the following density-correction unit 106.

The density-correction unit 106 is a processing unit that attends to density correction of a document read by the document-reading unit 101 according to image data and a variable threshold received from the spatial-filter-processing unit 105, and converts density to be reproduced according to an operation using the density notch. Additionally, the density-correction unit 106 can download any conversion data stored in the RAM 117 for the image data and the variable threshold, the conversion data generally being the same value for the image data and the variable threshold. However, the density-correction unit 106 can also download different conversion data for the image data and the variable threshold to change gradation characteristics of an output image outputted from the image-recording unit 111 intentionally.

The gradation-processing unit 107 diffuses density data for each pixel of the image data in a unit area, and thus converts the density data for each pixel to data corresponding to characteristics of the image-recording unit 111. The gradation-processing unit 107 includes various gradation-processing modes such as a simple-multi-valuing mode, a binarization mode, a dithering mode, an error-diffusing mode, a phase-control mode, and the like. A threshold for quantization is diffused in a unit area for executing the diffusion of the density data for each pixel of the image data, and the diffusion of the threshold carries out download of any value to the matrix RAM 108, and selection of appropriate quantization by switching a method to access the matrix RAM 108 according to a gradation-processing mode.

The recording-control block 110 corrects edges of a line drawing by smoothing the edges, and includes a pixel-correction unit 110a, a density-conversion unit 110b and a PWM (Pulse Width Modulation) unit 110c. The pixel-correction unit 110a and the density-conversion unit 110b execute density-conversion process considering start-up characteristics to electric signals in an image-forming process so as to increase dot-reproduction characteristics preceding a PWM process. The PWM unit 110c modulates pulse width of laser for recording an image. To be concrete, the PWM unit 110c reproduces gradation of the image wherein collection and diffusion of dots are smoothed by making phase control executed by the gradation-processing unit 107 and the phase control executed by smoothing process of the pixel-correction unit 110a inter-dependent on the PWM process.

The image-recording unit 111 reproduces the image on imprint paper by creating, imprinting, and fusing the image on the photosensitive by use of the laser. According to the first embodiment of the present invention, a laser printer is used for the image-recording unit 111. However, in a case that an image-development method such by an inkjet printer other than the laser printer is applied to the image-recording unit 111, structures of the PWM unit 110c and the image-recording unit 111 become different from the image-recording unit 111 according to the first embodiment. The processes executed by the document-recording unit 101 through the density-conversion unit 110b are identical for applying the laser printer to the image-recording unit 111 and applying the image-development method other than the laser printer to the image-recording unit 111.

It should be noted that the density correction of the document executed by the input-density-correction unit 103, the density correction executed by the density correction unit 106, and gradation-processing modes set by the gradation-processing unit 107, and the density conversion executed by the recording-control block 110 can be individually controlled by the operation unit 120. For instance, processing modes for recording the image may be selected by use of the operation unit 120 according to a document type, that is whether the document contains mainly patterns and pictures or mainly letters in the composite device 100. Additionally, parameters used for density correction may be selected and changed by use of the operation unit 120 according to density of the document. Each unit in the composite device 100 is controlled by operation mode set by the operation unit 120 that is stored in the RAM 117 through the CPU 119 and the system bus 121.

The video-path-control unit 109 controls paths for image-signal flow in the composite device 100. To be concrete, the video-path-control unit 109 controls a signal of the image scanned by the scanner provided in the document-reading unit 101. If an A/D conversion level is 8 bits after reading the image data by use of the CCD, the video-path-control unit 109 controls a path for the image-signal flow with the specific bit length (8 bits). Additionally, the video-path-control unit 109 controls a path through the external-application interface 113 to the external application 112. Additionally, the video-path-control unit 109 controls a data path after image-quality processing, wherein bit width of the image signal is converted to a binary or multi-valued number so that the bit width of the image signal fits the bus width. The video-path-control unit 109 controls input and output signals of the external application 112, wherein the image signal is expressed in a binary number for the external application 112 requesting facsimile reception and transmission, and printout by a personal computer. Additionally, the video-path-control unit 109 controls the memory interface 114 that compresses and expands the image data, and reading data from and writing data in the printer-page memory 116 through the memory-control unit 115, wherein the video-path-control unit 109 transfers the image data in the bit width that matches writing characteristics of the printer-page memory 116, which is bit width of data that the printer-page memory 116 accepts.

The external-application interface 113 controls interface signals between the composite device 100 and the external application 112, and controls paths for printing the image requested by a facsimile and a computer, outputting the image according to a request from the scanner, and transmitting an output image from a computer by use of a facsimile function.

Figure 2A:
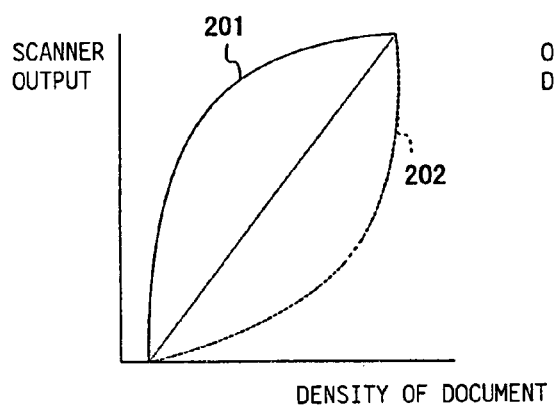
FIGS. 2A and 2B are graphs showing characteristics of γ-correction.
Figure 2B:
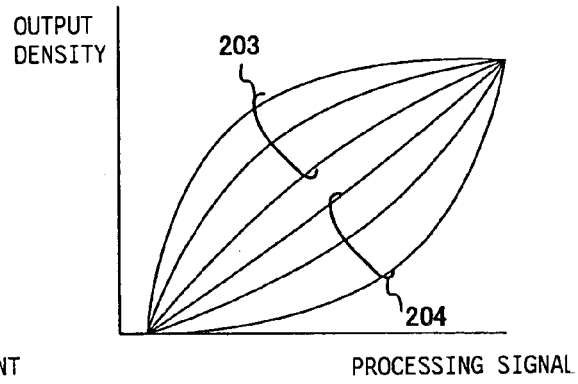

A description will now be given of the r-correction carried out by the scanner provided in the document-reading unit 101, and the density correction of the document read by the scanner. FIG. 2A is a graph showing characteristics of the γ-correction carried out by the scanner provided in the document-reading unit 101. FIG. 2B is a graph showing the conversion table for the density correction of the document read by the scanner. Density characteristic 201 shown in FIG. 2A shows conversion characteristics of the image data after the shading correction of the density of the image data has been executed. As seen in FIG. 2A, the density characteristic 201 is not a straight line rising steeply at low density and being saturated with a electric signal outputted from the scanner at high density, and thus the density characteristic 201 is a general exponential function Exp(γ). The density characteristic 201 is converted to a space linear to the density of the document by multiplying the density characteristic 201 by a curve 202 that is expressed as an exponential function Exp(1/γ), and thus the density characteristic 201 is converted to a function linear to the density of the document. Accordingly, dynamic range of the density increases.

On the other hand, the recording-density correction multiplies a value of characteristics after downloading the conversion table shown in FIG. 2B to the RAM 117 for executing density conversion, considering affect of γ characteristics.

The conversion table shown in FIG. 2B includes several curves such as a convex curve 203 and a concave curve 204. The convex curve 203 is used for reproducing a low-density part of the document. The concave curve 204 is used for eliminating a low-density part of the document corresponding to texture of the document. Data used for recording the image may be set to any value by selecting a combination of a processing mode for recording the image and adjustment of the density notch. Data used for transmitting an image by uses of a facsimile can only be set to a characteristic that is linear to data or to density of the document, since the image-recording characteristics of the facsimile are unknown. However, affect of the image-recording characteristics are considerable for copying the document, and dot-reproduction characteristic of the image-recording system for copying the document shifts conversion that is linear to density to the recording-control block 110b, and sets correction of the document by the density conversion as its main function.

Density reproduction and gradation reproduction can be set to various values by downloading conversion parameters to the RAM 117. The RAM 117 stores data for the γ-correction of the scanner, the density correction of the image data, the density correction according to the variable threshold, setting of the threshold for quantization for dithering and error-diffusion process, the smoothing process, and the density conversion γ for the image-recording control.

Figure 3:
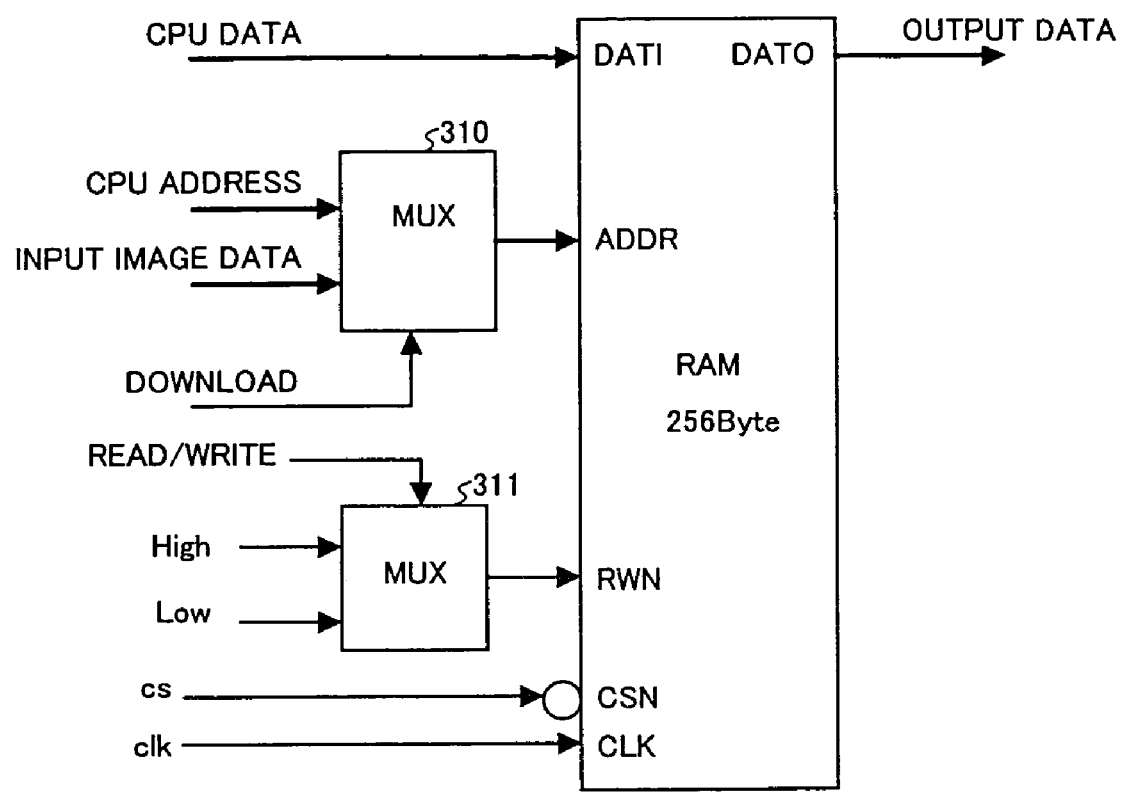
FIG. 3 is a block diagram showing a switching mechanism to access a RAM from a CPU in the composite device.

A description will now be given of a method to access the RAM 117 from the CPU 119 and to refer to the conversion table stored in the RAM 117 by the CPU 119. FIG. 3 is a block diagram showing a switching mechanism to access the RAM 117 from the CPU 119. The size of the RAM 117 can be set to any size including an address space enough for storing a gradation number for each pixel of an input image. For example, if the document-reading unit 101 converts analog CCD data obtained from the input image to an 8-bit digital signal, the address space in the RAM 117 should be set to 8 bits at least. When the CPU 119 accesses the RAM 117 for downloading reference data to the RAM 117, an address bus (CPU address) from the CPU 119 is selected by a multiplexer (MUX) 310 with using a "download" signal, and an address in the RAM 117 to write the reference data in is supplied to an address terminal (ADDR) of the RAM 117. Additionally, assuming that a high signal and a low signal are respectively a data-read mode and a data-write mode, the low signal is selected by a multiplexer (MUX) 311 by using a READ/WRITE signal for writing the reference data in the RAM 117, and then the reference data from the CPU 119 (CPU data) is inputted to a data input terminal (DATI) of the RAM 117.

When the CPU 119 accesses the RAM 117 for reading a value on the conversion table stored in the RAM 117, an input image data is selected by the MUX 310 with using the download signal, and is supplied to the address terminal of the RAM 117. Additionally, the high signal is selected by the MUX 311 with using the READ/WRITE signal for the CPU 119 to read the value on the conversion table from the RAM 117, and thus the value on the conversion table stored in an address that corresponds to the input image data in the RAM 117 is calculated out from a data output terminal (DATO) of the RAM 117. Accordingly, a structure of the RAM 117 can be simplified, and time taken for arithmetic operations can be shortened since the address to write the reference data in the RAM 117 and the input image data are supplied to the same input terminal, that is, the address terminal of the RAM-117. Additionally, data stored in the RAM 117 can be altered.

Figure 4:
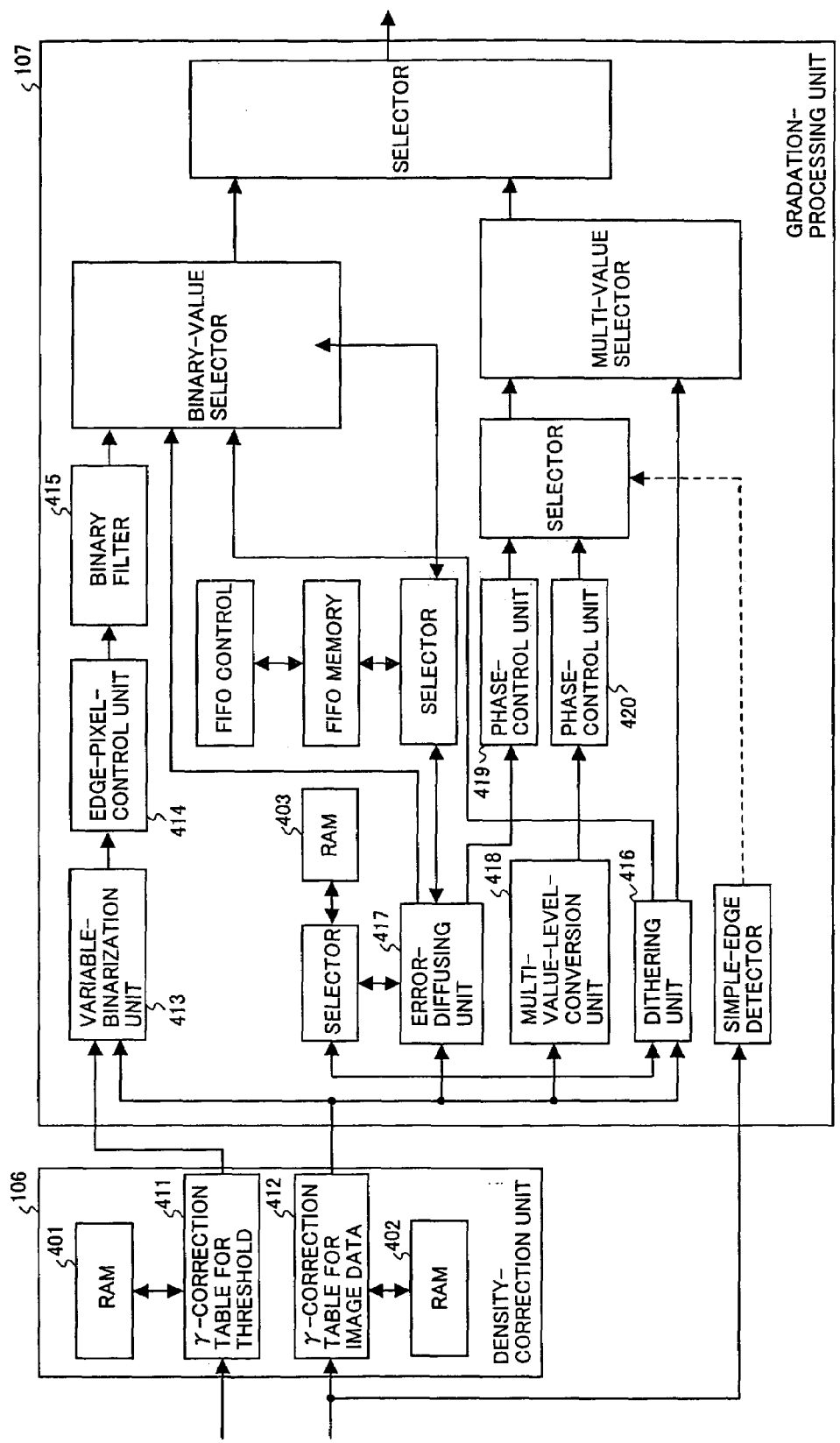
FIG. 4 is a block diagram showing detailed structures of a density-correction unit and a gradation-processing unit provided in the composite device.

A description will now be given of the density-correction unit 106 and the gradation-processing unit 107 with reference to FIG. 4. FIG. 4 is a block diagram showing detailed structures of the density-correction unit 106 and the gradation-processing unit 107. The density-correction unit 106 includes a RAM 401 and a RAM 402. The RAM 401 stores a γ-correction table 411 used for density conversion of the variable threshold. The RAM 402 stores a γ-correction table 412 used for density conversion of the image data. The gradation-processing unit 107 includes a RAM 403, a variable-binarization unit 413, an edge-pixel-control unit 414, a binary filter 415, a dithering unit 416, an error-diffusing unit 417, a multi-value-level-conversion unit 418, and phase control units 419 and 420. The RAM 403 is a matrix RAM for storing thresholds used for dithering and error diffusing of the input image data. The gradation-processing unit 107 includes two different paths for data inputted thereto. One of the paths is used for binarization process, and the other path is used for multi-valuing process. Simple-binarization process includes processes taken by the variable-binarization unit 413, the edge-pixel-control unit 414, and the binary filter 415. Each of the dithering unit 416 and the error-diffusing unit 417 uses a single path for the binarization and the multi-valuing, wherein one of the binarization and the multi-valuing is selected by data stored in the RAM 403 and switching between address/switching control of the RAM 403 by the CPU 119. The phase-control units 419 and 420 add phase information respectively to data processed through the error-diffusing unit 417 being selected for the multi-valuing and the multi-value-level-conversion unit 418 according to density distribution of the document in the main-scanning direction of the scanner provided in the document-reading unit 101 for forming dots. For instance in triple-valuing, a signal level can be altered among values "00", "01", "10", and "11" by providing 2-bit space to the signal level. Regularly, the values "00", "01", "10" and "11" are obtained by quad-valuing. However, density level can be expressed in the triple-valuing by setting the value "00" to white color, the value "11" to black color, and the values "01 and "10" to fifty percent duty for the pulse width modulated by the PWM so that the above four 2-bit values may be interpreted as three values. The value "01" turns on the laser onto a right half of an area for forming dots with right phase. On the other hand, the value "10" turns on the laser onto a left-half of the area for forming dots with left phase. The phase and the density are defined by the phase control units 419 and 420 being linked with the PWM unit 110C.

Figure 5:
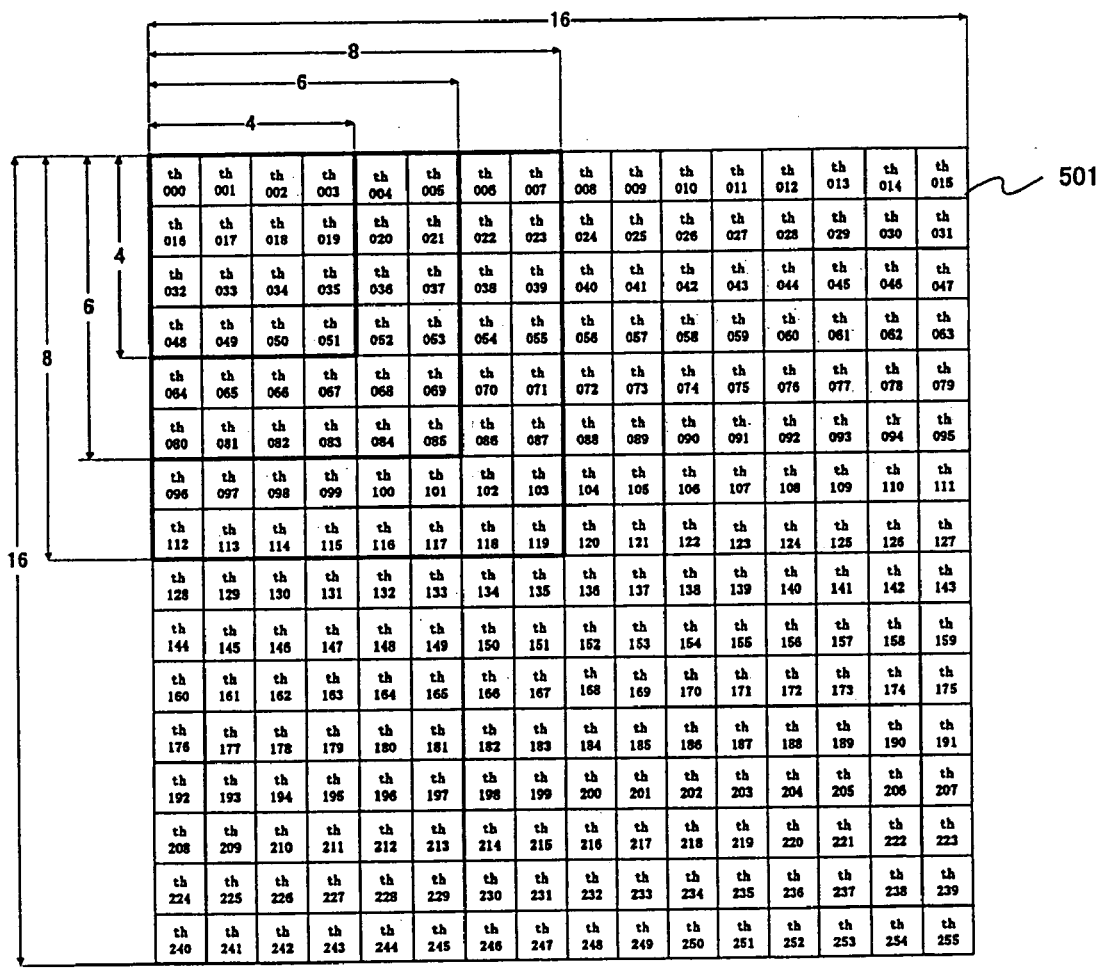
FIG. 5 is a diagram showing a binary dither matrix.

A description will now be given of a method to download a binary dither matrix to the RAM 403 provided in the gradation-processing unit 107 when the RAM 403 includes the 8-bit address space with reference to FIG. 5. FIG. 5 is a diagram showing a binary dither matrix 501. Each box shown in FIG. 5 indicates a pixel. Size of the binary dither matrix 501 may be selected by any combination of 4, 6, 8, or 16 pixels in the main-scanning direction and 4, 6, 8, or 16 pixels in the sub-scanning direction. The combination of the pixels and pattern data are actually selected according to a necessary line number and line decimation of an image. Additionally, each pixel in the binary dither matrix 501 stored in the RAM 403 is not accessed sequentially but in two dimensions based on a two-dimensional arrangement of pixels in the binary dither matrix 501, and thus control of the RAM 403 is simplified.

Figures 6A, 6B, 6C:
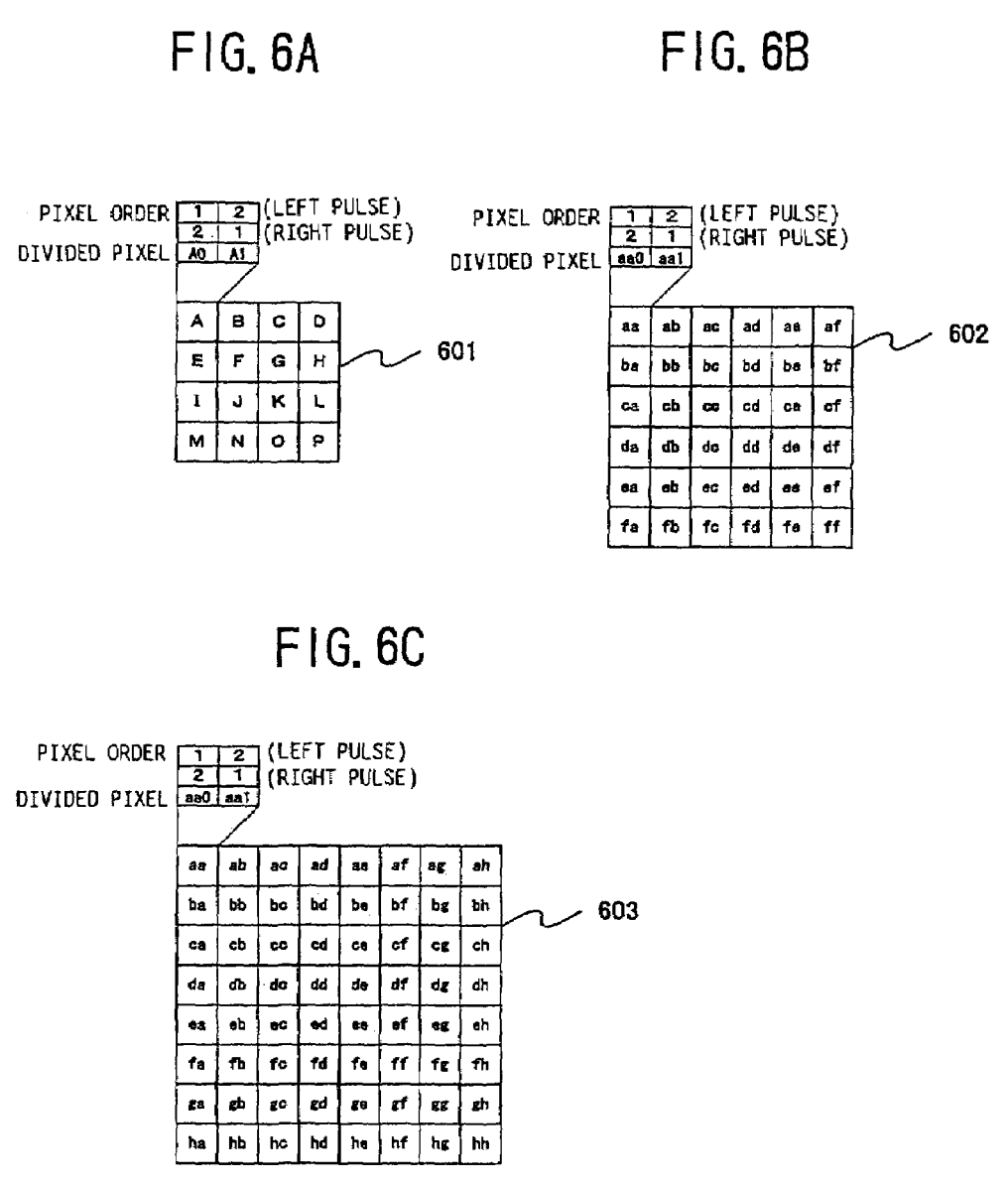

A description will now be given of a method to access the RAM 403 as a multi-valued dither matrix with reference to FIGS. 6A, 6B and 6C. FIGS. 6A, 6B and 6C are diagrams showing respectively a 4×4 dither matrix, a 6×6 dither matrix, and 8×8 dither matrix. Each pixel in the dither matrixes shown in FIGS. 6A, 6B and 6C is triple-valued. The number of addresses in the main-scanning direction necessary for each pixel in the dither matrixes shown in FIGS. 6A, 6B, and 6C is twice as much as the number of addresses in the sub-scanning direction necessary for each pixel. For instance, two addresses are provided for each pixel in the main-scanning direction for a 4×4 dither matrix 601 shown in FIG. 6A, and eight addresses are referred when accessing the matrix 601. Additionally, a pixel A includes thresholds A0 and A1, and density of the pixel A is compared with the thresholds A0 and A1. Similarly, each pixel in the matrix 601 is provided with two thresholds, and density of each pixel is compared with the thresholds provided therein.

The thresholds A0 and A1 are set to values so that the threshold A0 is smaller than the threshold A1 for the left pulse. Additionally, the threshold A0 is set to a value greater than a value of the threshold A1 for the right pulse. If the density of the pixel A is smaller than the thresholds A0 and A1 when comparing the density of the pixel A with the thresholds A0 and A1 provided therein, a pulse code "00" is set to a period for keeping the laser on for every segment of a pulsing area as a result of quantization of the density of the pixel A. If the density of the pixel A is greater than the thresholds A0 and A1, a pulse code "11" is set to the period for keeping the laser on. Else, the density of the pixel A is between the thresholds A0 and A1, and a pulse code "01" is set to the period for keeping the laser on when a right pulse system (right phase) is provided for forming the dots, and a pulse code "10" is set to the period when a left pulse system (left phase) is provided for forming the dots. Similarly, a pulse code is generated for each pixel in a 6×6 dither matrix 602 shown in FIG. 6B and a 8×8 dither matrix 603 shown in FIG. 6C by downloading threshold arrangements to the RAM 403 considering phase generation.

Figure 7A:
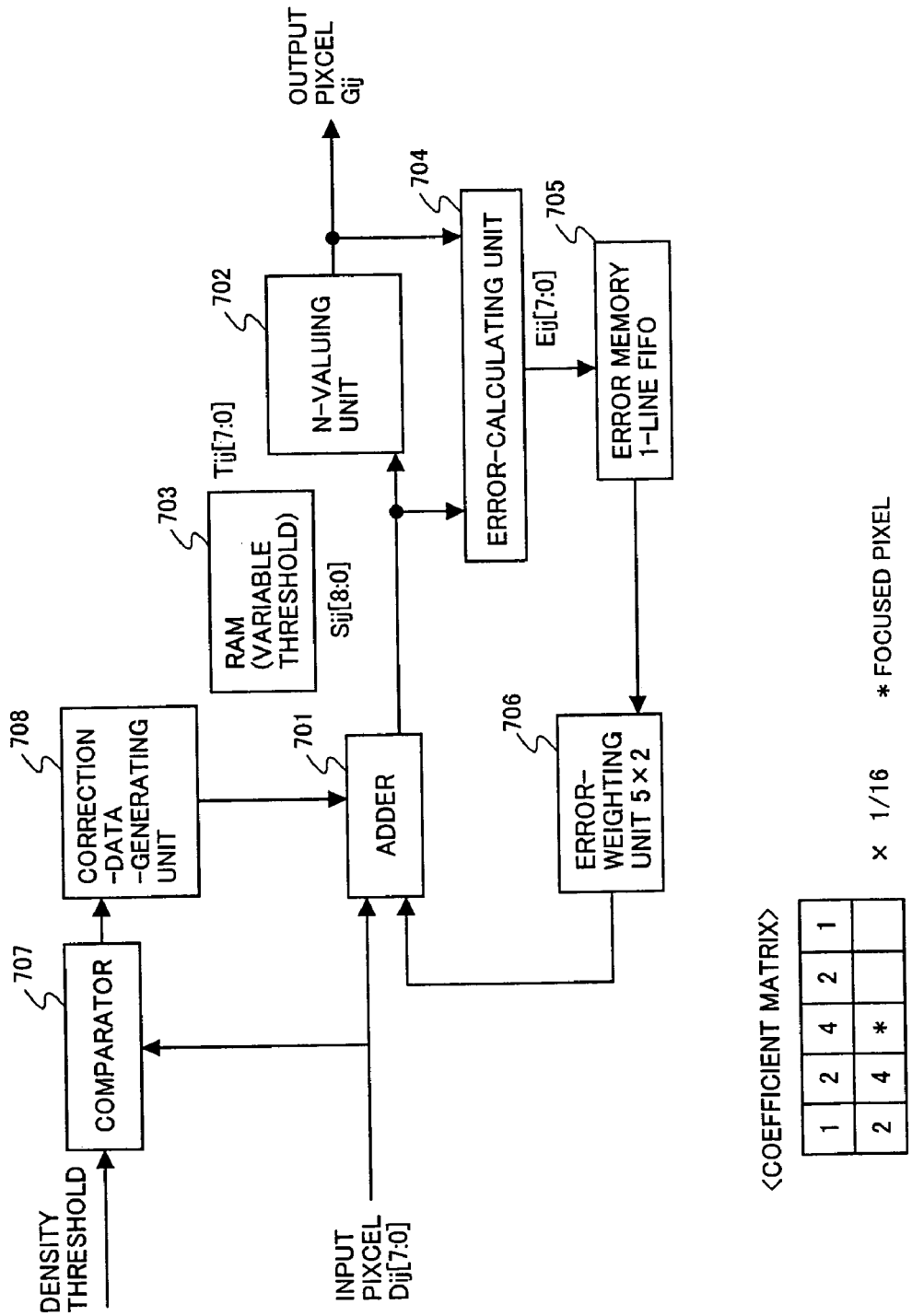
FIGS. 7A and 7B are diagrams for describing a binary-error-diffusion process and a multi-valued-error-diffusion process.
Figure 7B:

A description will now be given of binary and multi-valued error-diffusing processes with reference to FIGS. 7A and 7B. The error-diffusing unit 417 provided in the gradation-processing unit 107 is shown in FIG. 7A, and includes an adder 701, a N-valuing unit 702, a RAM 703, an error-calculating unit 704, an error memory 705, an error-weighting unit 706, a comparator 707, and a correction-data-generating unit 708. Initially, the comparator 707 compares an input pixel with a density threshold inputted thereto, and directs the correction-data-generating unit 708 to generate a correction data. The correction data generated by the correction data generating unit 708 is then added to or subtracted from the input pixel by the adder 701 to decrease roughness of low density part of the input image, thereby adding a processing mode that adds any data to the input pixel. Subtraction of the correction data is executed by the adder 701 by providing a complement that indicates the subtraction as a part of the correction data. The N-valuing unit 702 executes N-valuing of data outputted from the adder 701 based on a threshold for quantization corresponding to result of calculation between the input image and errors supplied from the RAM 703 after selecting a variable threshold for the threshold for quantization between a fixed threshold and the variable threshold. The N-valued data outputted from the N-valuing unit 702 is then supplied to the error-calculating unit 704. The error-calculating unit 704 calculates an error between the data outputted from the adder 701 and the N-valued data supplied from the N-valuing unit 702, and supplies the calculated error to the error memory 705. The error memory 705 holds the error received from the error-calculating unit 704 for a certain period, and supplies to the error-weighting unit 706. The error-weighting unit 706 then weights the error, and supplies the weighted error to the adder 701 where the weighted error is added to the input pixel. As described above, regular texture of the input image is generated by adding the correction data to each pixel in the input image. Additionally, dots (pixels)

are concentrated in a unit area of the input image by adding the error (noise) to each pixel therein, and thus effective dots are amplified.

When a variable threshold is used as the threshold for quantization, a threshold that repeats by a unit block is stored in the RAM 403 of the gradation-processing unit 107. FIG. 7B shows a binary 8×8 variable area including a threshold 710. The texture of the image data is reduced by changing the threshold 710 in a block. Additionally, storage of edges of the image data and reproduction of the gradation are adjusted by providing fixed thresholds and variable thresholds in the 8×8 matrix. When executing the multi-valued error-diffusing process, each of the pixels in the matrix includes a plurality of thresholds, and quantization (pulse) code is set for the pixel by use of the thresholds. The phase is rearranged according to the density distribution in the main-scanning direction. The error memory 705 includes a one-line FIFO memory. The error-weighting unit 706 includes a coefficient of two lines, each line including five pixels, for instance. It should be noted that the size of the matrix and the coefficient distribution may be altered.

Figure 8:
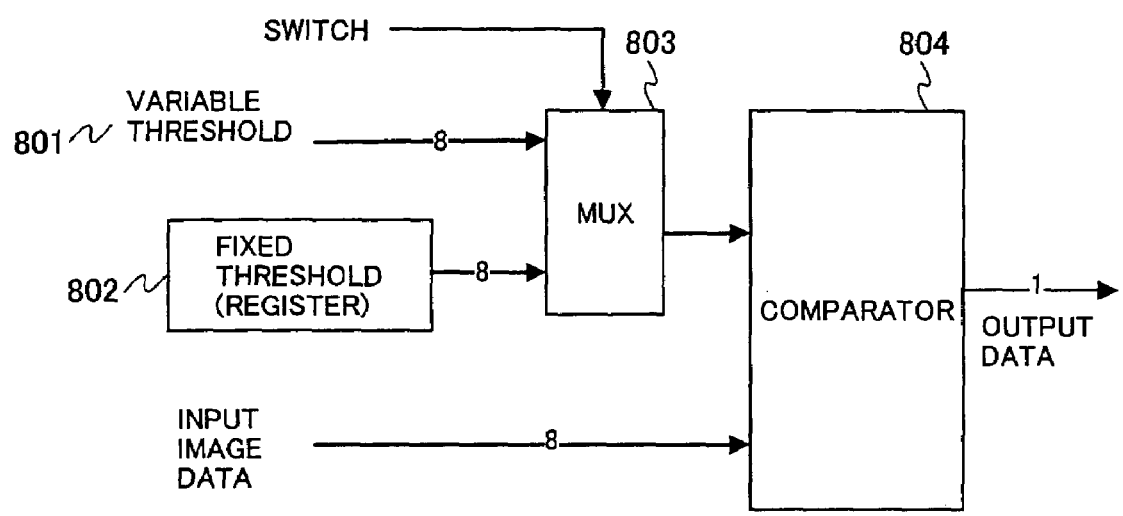
FIG. 8 is a block diagram showing a circuit to switch a value of a threshold between a variable threshold and a fixed threshold.

A description will now be given of switching a threshold for quantization between a variable threshold and a fixed threshold with reference to FIG. 8. The threshold for quantization is switched by selecting a processing mode through the system bus 121. A variable threshold 801 stored in the RAM 403 is altered by address control in the main and sub scanning direction, and by multi-valued level when the error-diffusing mode is selected as a processing mode. If the simple binarization process is selected, the variable threshold 801 is set to a threshold that is set and which density is corrected by the spatial-filtering unit 105. A fixed threshold 802 is not a value fixed by hardware, but is a value set by the CPU 119 in a register. In addition, the value of the fixed threshold 802 may be changed according to a processing mode and characteristics of the image data. One of the variable threshold 801 and the fixed threshold 802 is selected by a multiplexer (MUX) 803, and is supplied to a comparator 804 where the selected threshold is compared with the input image data.

Figure 9:
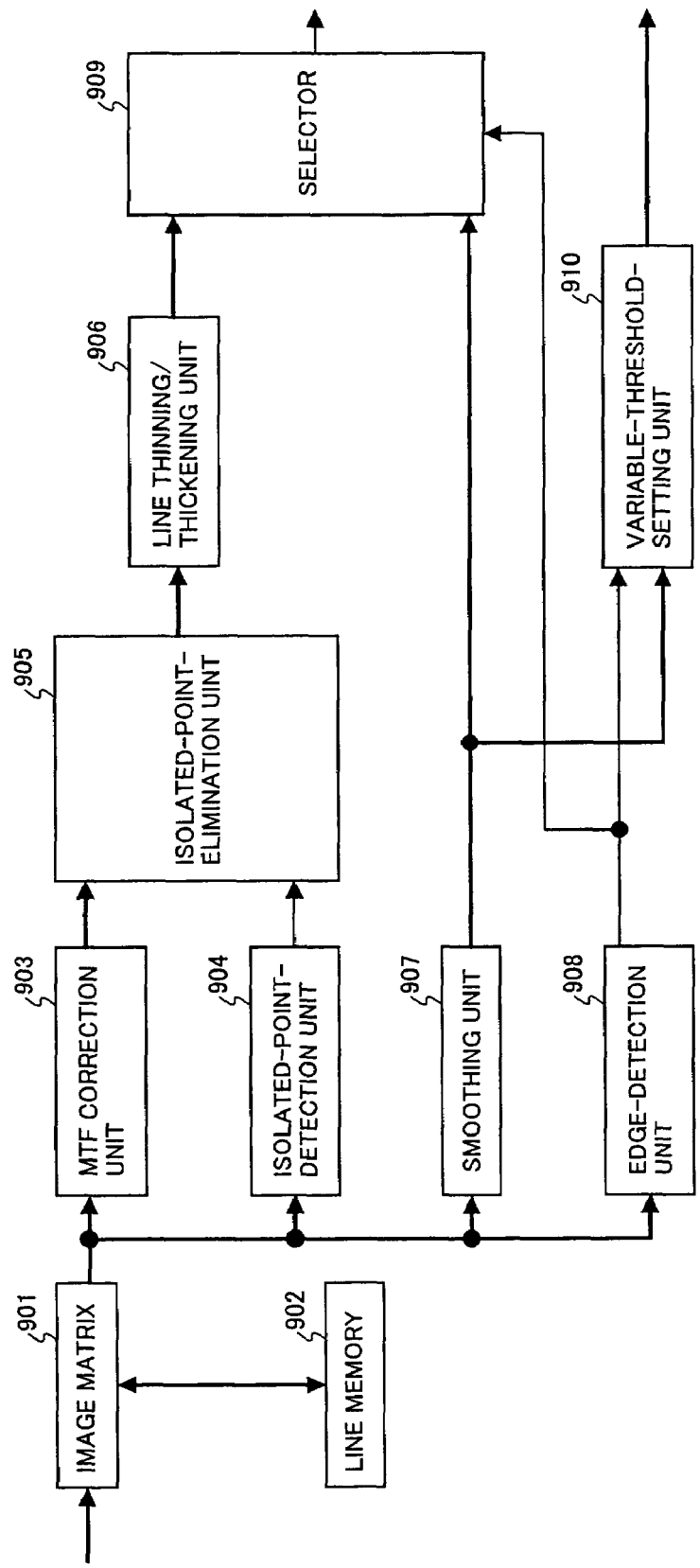
FIG. 9 is a block diagram showing a spatial-filter-processing unit provided in the composite device.

A description will now be given of a structure of the spatial-filtering unit 105 with reference to FIG. 9. A two-dimensional image matrix 901 is provided in the spatial-filtering unit 105 by use of a plurality of line memories 902. Frequency characteristics of the image data in the two-dimensional image matrix 901 are corrected, and features are extracted from the density characteristics. An MTF-correction unit 903 can select any MTF-correction coefficients and correction rate for each of the main and sub scanning directions individually to correct the MTF of the optical system, and can support various types of processing modes, documents, and optical systems. An isolated-point-detection unit 904 detects a noise in the texture of the document and in the image of the document by detecting regularity in the arrangement of the pixels on the image data, and then deciding whether a pixel that does not obey the regularity is an isolated point or a part of a meshed image. An isolated-point-elimination unit 905 selects and executes either elimination of the isolated point detected by the isolated-point-detection unit 904 completely, or replacement of the isolated point detected by the isolated-point-detection unit 904 with average of pixels surrounding the isolated point. Additionally, the isolated-point-elimination unit 905 eliminates noises on the image. A line thinning/thickening unit 906 thins and thickens line density in each of the main and sub directions individually and adjusts balance of line-density reproductions in the main and sub scanning directions according to an MTF-correction coefficient. A smoothing unit 907 eliminates moiré generated by a meshed image and an aliasing noise at A/D conversion, and extracts information for setting a variable threshold. An edge-detection unit 908 detects edge segments in horizontal, vertical, left-slanted, and right-slanted direction, and generates a switching signal for optimizing filtering process and a control signal for selecting a variable threshold. A selector 909 selects an MTF corrected video path for an edge-forming element of filtered image data. A variable-threshold-setting unit 910 sets a threshold for each pixel to be binary according to output signals from the smoothing unit 907 and from edge-detection unit 908.

Figure 10:
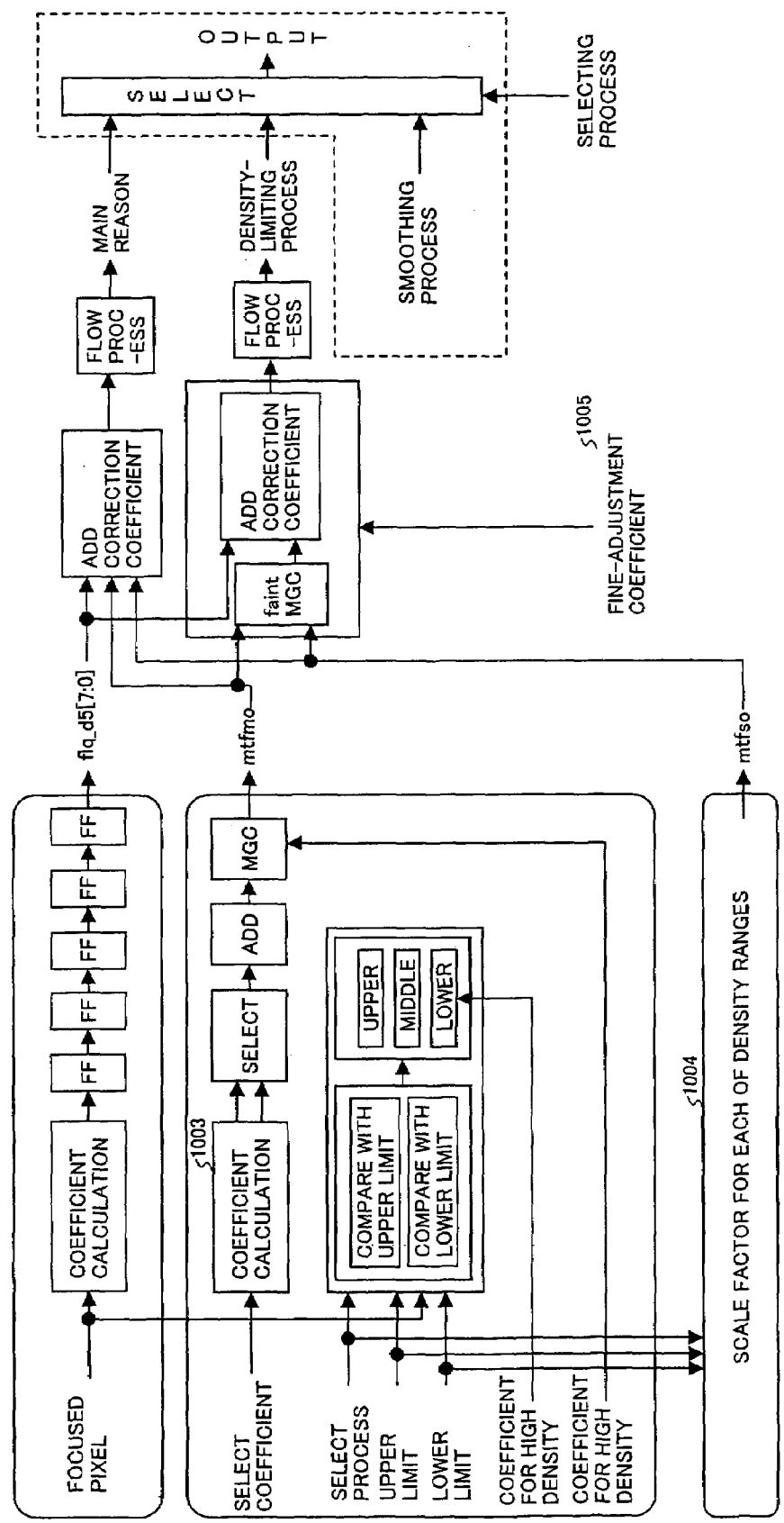
FIG. 10 is a block diagram showing a circuit that controls switching of density data of an MTF correction.

A description will now be given of switching control related to density data of an MTF correction with reference to FIG. 10. An MTF correction is executed on a focused pixel. A correction coefficient and a scale factor are switched among range of the density level. Initially, an upper limit 1001 and a lower limit 1002 of a threshold are set for selecting a density level. The switching control is executed individually in each of a density range higher than the upper limit 1001 (UPPER), a density range between the upper limit 1001 and the lower limit 1002 (MIDDLE), and a density lower than the lower limit 1002 (LOWER). Additionally, a correction coefficient 1003 and a scale factor 1004 are individually set in each of the UPPER density range, the MIDDLE density range, and the LOWER density range. Accordingly, an image-filtering process is optimized for each density range so that gradation of each pixel is stably reproduced. In addition to the correction coefficient 1003 and the scale factor 1004, a fine-adjustment coefficient 1005 is set and added to the focused pixel after the MTF correction for executing weak MTF correction on the focused pixel.

Figure 11:
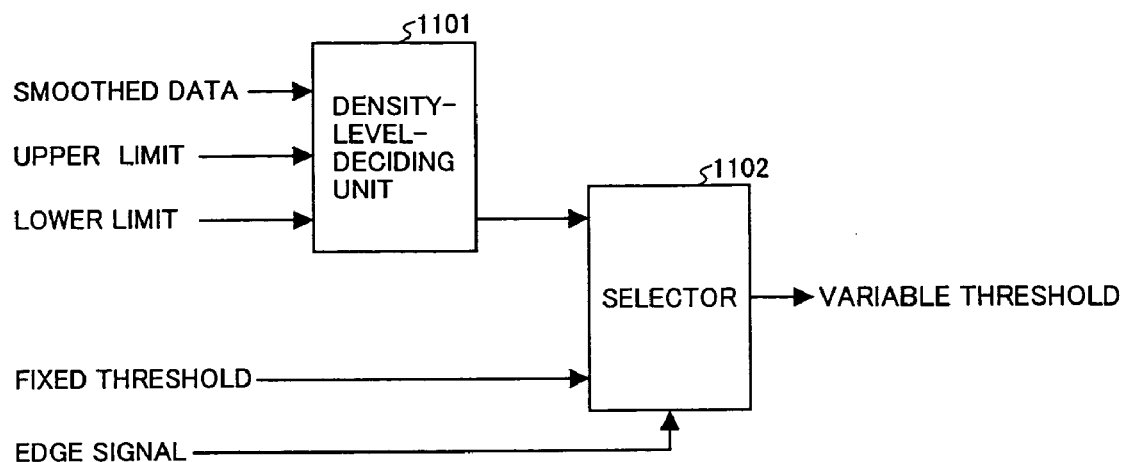
FIG. 11 is a block diagram showing a circuit that executes a threshold-setting process.

A description will now be given of a threshold-setting process with reference to FIG. 11. A density-level-deciding unit 1101 compares the upper limit 1001 and the lower limit 1002 stored in a register for the smoothed image signal. The smoothed image signal is supplied to a selector 1102 if a value of the smoothed image signal is between the upper limit 1001 and the lower limit 1002. The upper limit 1001 is supplied to the selector 1102 if the value of the smoothed image signal is above the upper limit 1001. The lower limit 1002 is supplied to the selector 1102 if the value of the smoothed image signal is below the lower limit 1002. Then, the selector 1102 selects either an output signal from the density-level-deciding unit 1101 or a fixed threshold stored in a register by use of an edge signal to output the selected signal as a variable threshold therefrom. In a case that the variable threshold outputted from the selector 1102 is a threshold that completely depends on the density of the texture of the image, the fixed threshold is selected by the selector 1102 as the variable threshold for a non-edged part. The output signal from the density-level-deciding unit 1101 is selected by the selector 1102 as the variable threshold for an edged part.

A description will now be given of a method to detect an isolated point with reference to FIG. 12. An isolated-point-detection circuit shown in FIG. 12 includes a 5×5 matrix 1201, a 7×7 matrix 1202, a 9×9 matrix 1203, an isolated-point-decision unit 1204, a state-change-decision unit 1205, and a data-comparison unit 1208. If a focused pixel, that is, a pixel located in the center of a matrix is completely isolated from pixels located at inside edges of the matrix, the pixel is called an isolated point (isolated pixel). The 7×7 matrix 1202 is used for recoding an image which size is equal to that of an original image, and the isolated point sized 4×4 can be detected at maximum. When recording the image which size is reduced than that of the original image, space between the isolated point and its surrounding pixels is reduced. Accordingly, a 2×2 pixel should be detected in the 5×5 matrix 1201 so as to detect a 4×4 isolated point which size is reduced by 50%. On the other hand, when recording the image which size is expanded to more than 200% of the size of the original image, the 4×4 isolated point is also expanded, and thus the 9×9 matrix 1203 must be used to detect the isolated point that remains on the image. It should be noted that a value "kmx" is supplied by the CPU 119 to a selector so as to select an appropriate matrix among the matrixes 1201, 1202 and 1203. Additionally, a value "kath" and image data are supplied to a matrix.

A dither pattern with low density is removed in addition to an isolated point from the image by detecting the isolated point only by use of the relation between the isolated point and its surrounding pixels, and deleting the detected isolated point in a matrix such as the 5×5 matrix 1201 and the 9×9 matrix 1203, the dither pattern being useful information on the image. Consequently, detection and deletion of the isolated point are limited by adding a process to compare the image data supplied by the CPU 119 with a threshold "kbth" supplied by the CPU 119 and a state-changing process to the detection of the isolated point.

Figure 12:
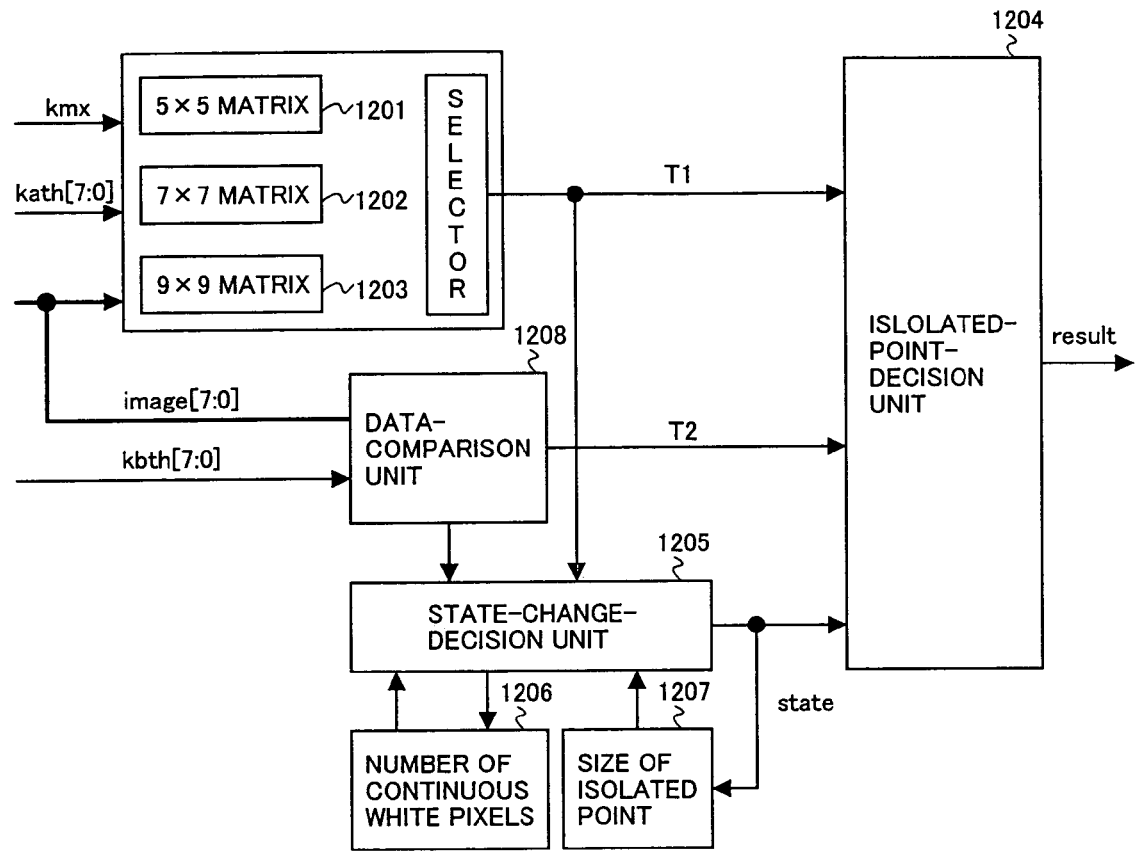
FIG. 12 is a block diagram showing an isolated-point-detection circuit to detect an isolated point.

In FIG. 12, a value T1 indicates whether the focused pixel is an isolated point, a white pixel, or others. If the focused pixel is detected as an isolated point or a white pixel, the value T1 becomes "1". Otherwise, the value T1 becomes "0". Subsequently, the value T1 is supplied to the isolated-point-decision unit 1204 and the state-change-decision unit 1205. The data-comparison unit 1208 decides whether the focused pixel is a white pixel by comparing the image data and the threshold "kbth"; and then supplies a value T2 to the isolated-point-decision unit 1204 and the state-change-decision unit 1205. If the value of the focused pixel is smaller than the threshold "kbth", the focused pixel is detected as a white pixel, and the value T2 becomes "1". If the value of the focused pixel is larger than the threshold "kbth", the focused pixel is detected as a non-white pixel, and thus the value T2 becomes "0". The state-change-decision unit 1205 counts the number of white pixels that are continuously placed in a matrix (1206), and measures size of an isolated point (1207) from the values T1 and T2. The state-change-decision 1205 then decides which state the focused pixel is in among states PAPER, DOT, and PICTURE. The state PAPER where detection of the type of the focused pixel starts indicates that the focused pixel is a part of an area where white pixels are continuously placed. The state DOT indicates that the focused pixel is actually an isolated point. Additionally, the state PICTURE indicates that the focused pixel is a part of a pattern, a letter, a mesh, or an area where the white pixels are not placed continuously and widely. Information about a state wherein the focused pixel is in addition to the values T1 and T2 is supplied to the isolated-point-decision unit 1204, where the focused pixel is determined as either an isolated point or not, and the result is outputted therefrom as a "result" signal.

Figure 13:
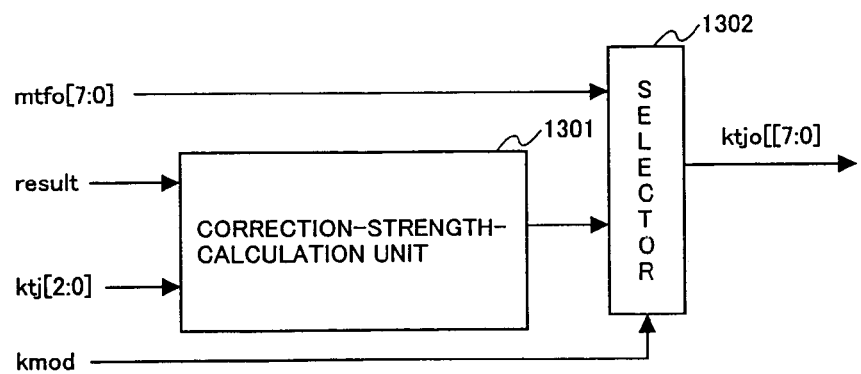
FIG. 13 is a block diagram showing an isolated-point-correction circuit to correct the isolated point detected by the isolated-point-detection circuit.

A description will now be given of a method to correct an isolated point detected by the isolated-point-detection circuit with reference to FIG. 13. An isolated-point-correction circuit shown in FIG. 13 includes a correction-strength-calculation unit 1301 and a selector 1302. A signal "mtfo" is image data after being processed through the MTF correction. The image data "mtfo" and an isolated point have been emphasized by the MTF correction so that quality of a copied image becomes worse by repeating a process to copy the image. Accordingly, the isolated point is smoothed with its surrounding pixels or is replaced by a white pixel instead od being processed through the MTF correction. A signal "kmod" is supplied to the selector 1302, and selects to execute an isolated-point-correction process or not. If the isolated-point-correction process is to be executed, a signal "ktj" switches a correction level in the correction-strength-calculation unit 1301. The correction-strength-calculation unit 1301 set conversion of the isolated point to a white level as a maximum correction strength, and then weakens the correction level to ⅓₂, ⅛, and ½ of the image data "mtfo".

Figure 14:
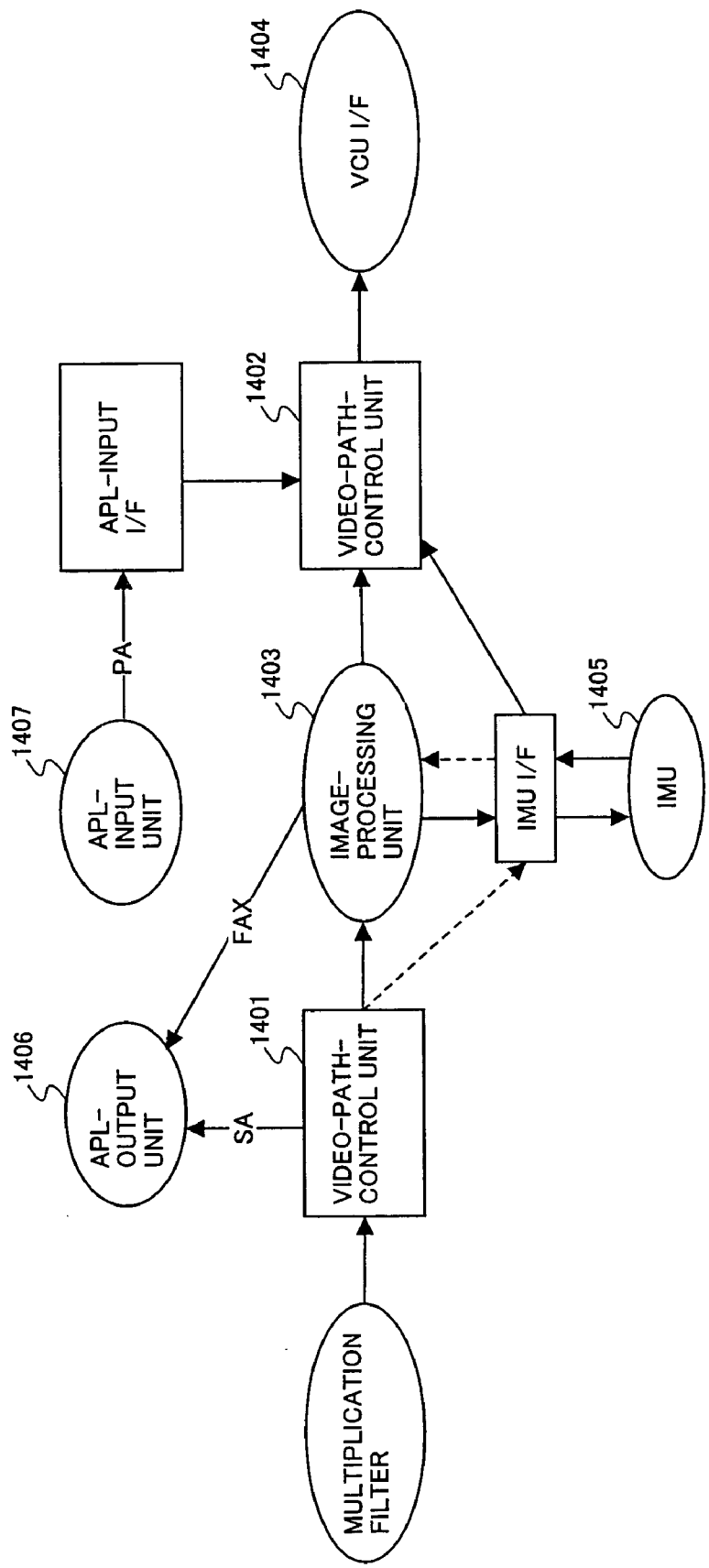
FIG. 14 is a block diagram showing a video flow controlled by video-path-control units.

A description will now be given of a video flow controlled by video-path-control units with reference to FIG. 14. FIG. 14 includes video-path-control units 1401 and 1402, an image-processing unit 1403, a video-control-unit interface (VCU I/F) 1404, an image-memory unit (IMU) 1405, an application-output unit (APL-output unit) 1406, an application-input unit (APL-input unit) 1407, an application-input interface (APL-input I/F), a multiplication filter, and an IMU interface (IMU I/F). The multiplication filter shown in FIG. 14 is a last unit that processes image data before passing the image data to the image-processing unit 1403. The image data is filtered by being processed through the shading correction, the γ-correction, the multiplication of the image data, and the MTF correction. The image data that has been through the above-described correction processes is referred to as an image-signal, and the image signal is supplied to the image-processing unit 1403 through the video-path-control unit 1401. The image-processing unit 1403 executes the density correction and the gradation processing of the image signal received through the video-path-control unit 1401. The density correction sets a density by matching the image signal to recording characteristics of the image-recording system by use of an area-gradation method that considers recording of the image data onto paper. The image-processing unit additionally executes multi valuing and binarization of the image signal. The video-path-control unit 1402 receives the image signal from the image-processing unit 1403 after the image signal is being processed by the image-processing unit 1403, and mainly controls paths of the image signal being binary. The VCU I/F 1404 converts a format of the image signal received from the video-path-control unit 1402 to a data format of the image-recording system.

In addition to a regular video path from the image-reading system to the image-recording system, the video-path-control units 1401 and 1402 control video paths to the image memory unit (IMU) 1405 through the IMU I/F, and to an external application unit. The IMU 1405 includes buffer memories for a scanner and a printer, and the like. The external application unit includes a facsimile, a printer, a scanner, and the like. For instance, the video-path-control unit 1401 supplies the image signal that is multi-valued through a path SA for a scanner application to the application-output unit 1406. The image-processing unit 1403 supplies the image signal as a facsimile-transmission signal that is binary through a path FAX to the application-output unit 1406. Additionally, the video-path-control unit 1402 receives a binary image signal as a printer-application signal from the application-input unit 1407 through path PA and the application-input interface (APL-input I/F).

Figure 15:
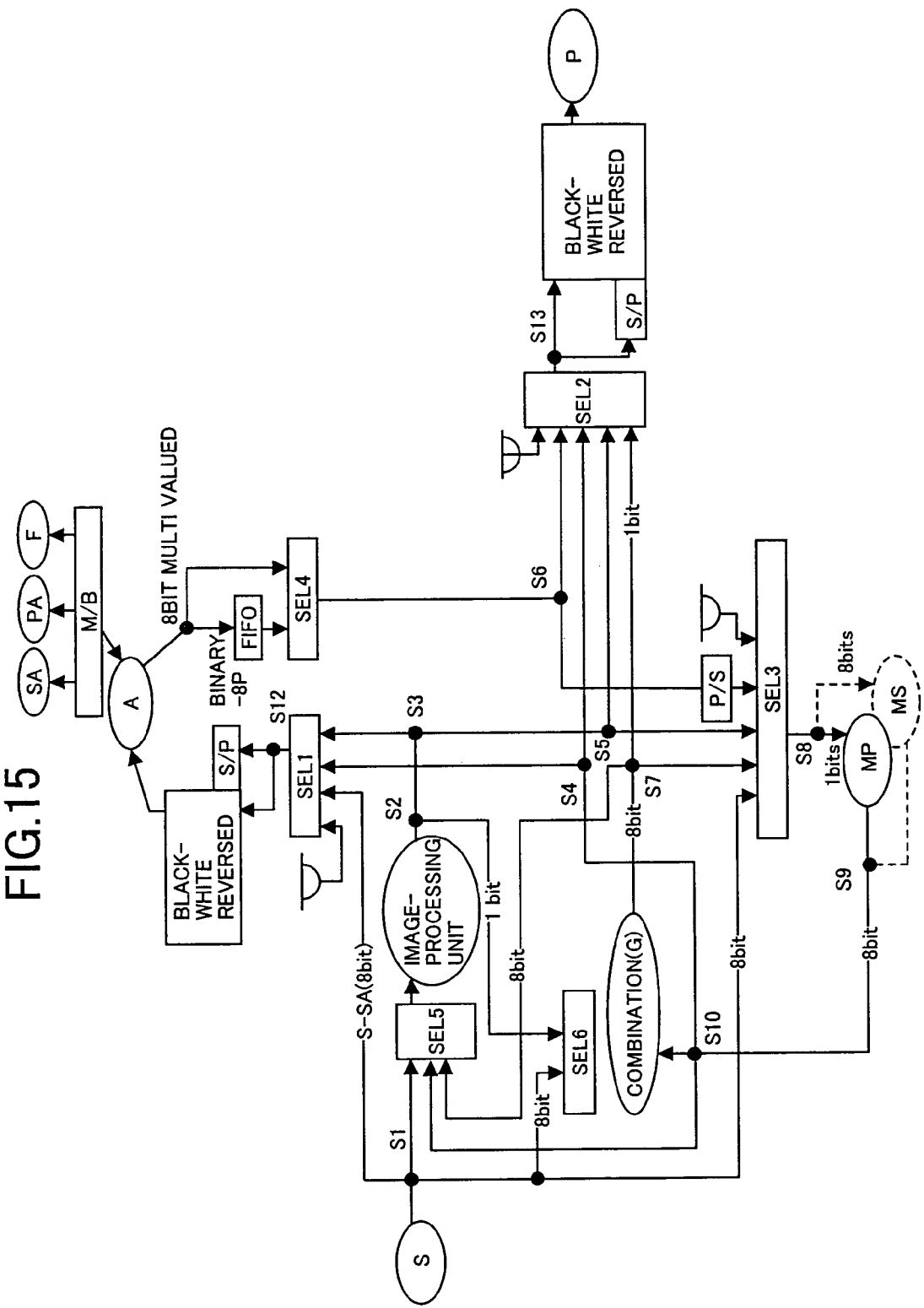
FIG. 15 is a block diagram showing a video-control system.

A description will now be given of a video-control system with reference to FIG. 15. A signal "S" shown in FIG. 15 indicates an image signal after being processed through the shading correction, the multiplication of the image signal, and the filtering processes as described above. Units "A", "MS", "MP", "P", "F", and "M/B" are respectively, an interface (I/F) terminal connecting to an external application, a buffer memory for a scanner, each module in a buffer memory for a printer, an image-recording system located next to the PWM unit 110c, a facsimile unit, and a motherboard connecting external application units. A character "G" indicates a combination of the image signal and an image signal stored in a memory. Selectors SEL1 through SEL6 are provided in the video-control system for switching a video path. The video-control system shown in FIG. 15 includes only a signal path for multi valuing and binarization. In other words, an image-processing unit provided in the video-control system includes a single RAM for storing a dither matrix and a single FIFO memory for the error-diffusion process for executing multi valuing and binarization for the reason of simplifying a circuit structure of the video-control system. Consequently, a binary error diffusion process and multi-valued-error-diffusion process cannot be executed concurrently. However, the binary-error-diffusion process and the multi-valued-error-diffusion process may be executed almost concurrently by use of a time-partition process. All the images to be processed through a plurality of operations are scanned initially by the scanner, and are stored in the buffer memory MS. Subsequently, the image-processing unit executes only the binarization and multi-valuing processes on the image signals stored in the buffer memory MS, and reproduces the most appropriate image signals.

There are two different methods to process jobs when the video-control system has received a job that includes an execution of the multi-valued-error-diffusion process and a job that includes an execution of the binary-error-diffusion process almost simultaneously, for example, a job that executes the multi-valued-error-diffusion process on first image data, and then generates five copies of the first image data, and a job that executes the binary-error-diffusion processes on second image data, and then executes facsimile transmission of the second image data. One of the methods stores the image data for both of the jobs described above in the buffer memory MS. The other method stores the first image data for executing the multi-valued-error-diffusion process in the buffer memory MS, and releases the image-processing unit for the binary-error-diffusion process when the video-control system receives a request to execute the binary-error-diffusion process on the second image data.

The first method executes the binary-error-diffusion process on the second image data after executing the multi-valued-error-diffusion process on the first image data, and stores the second image data in an area of the buffer memory MS different from the area of the buffer memory MS wherein the first image data is stored while executing the multi-valued-error-diffusion process on the first image data. To be concrete, initially, the first image data for generating five copies is read by the scanner, and is supplied through a path S, S1, SEL3, and MS to the buffer memory MS, followed by being stored in the buffer memory MS. The first image data stored in the buffer memory is then supplied through a path MS, S9, S10, SEL5, the image-processing unit, S3, SEL2, S13, and P to the image-recording system P, thereby converting the density of the first image data, and executing the multi-valued-error-diffusion process on the first image data by use of the image-processing unit, followed by printing the first image data by use of the image recoding system P. The video-control system prints out five copies of the first image data by repeating the above-described process for five times. While printing out the first image data by use of the image-recording system P, the scanner (an image-reading system) is not being used, and can accept a job to transmit the second image data by use of a facsimile. Accordingly, the second image data is scanned by the scanner, and is supplied through the path, S, S1, SEL3, and MS to the buffer memory MS, followed by being stored in the buffer memory MS. The path to read image data from the buffer memory MS and the path to store the image data in the buffer memory MS are not overlapped to each other, so that both of the first of second image data are safely stored in the buffer memory MS. After the five copies of the first image data are printed by the image-recording system P, the second image data stored in the buffer memory is supplied through a path MS, S9, S10, SEL5, the image-processing unit, S3, SEL1, S12, A, M/B, and F to the facsimile unit F, thereby converting the density of the second image data, and executing the binary-error-diffusion process on the second image data by use of the image-processing unit, followed by transmitting the second image data by use of the facsimile unit F.

The second method interrupts the copying process of the first image data if the second image data for the facsimile transmission is scanned by the scanner while reading the first image data from the buffer memory MS and printing the first image data by use of the image-recording system P. Even if the interruption of the copying process of the first image data is occurred, the first image data has been already stored in the buffer memory MS so that it is not necessary to reread the first image data again by use of the scanner. The second image data is supplied to the facsimile unit F by taking a path S, S1, SEL5, the image-processing unit, S3, SEL1, S12, A, M/B, and F to the facsimile unit F, where the second image data is transmitted therefrom. Subsequently, the first image data is read from the buffer memory MS, and is copied by the image-recording system so that the five copies of the first image data are printed as described above.

Additionally, a description will be given of paths that a combined process of external applications takes in the video-control system with reference to FIG. 15. For instance, a combined process of outputting first image data scanned by the scanner to a scanner application SA, and supplying second image data received from a personal computer as a printer application PA to the facsimile unit F without processing the second image data through the image-processing unit provided in the video-control system. The first image data is scanned by the scanner, and is supplied through a path S, S1, SEL1, S12, A, M/B, and SA to the scanner application SA. While the first image data is being scanned by the scanner, the second image data received from the personal computer can be transmitted from the facsimile unit F by switching a physical switch on the motherboard M/B, and then by taking a path PA, M/B, and F to the facsimile unit F. If the scanner application SA is being used by other units or devices, the first image data is stored in the buffer memory MS temporarily. When the scanner application SA is released from the use by the other units, the first image data stored in the buffer memory MS is transmitted to the scanner application SA by taking a path MS, S9, S10, S4, SEL1, S12, A, M/B, and SA. While transmitting the first image data to the scanner application SA, the scanner (image-reading system) and the image-recording system P are available for copying image data. For instance, when printing out the image data by binary copying process, the image data scanned by the scanner is supplied to the buffer memory MP through a path S, S3, SEL3, and MP. The image data stored in the buffer memory MP is then supplied through a path. MP, S9, S10, S4, SEL2, S13, and P to the image-recording system P, where the image data is printed out therefrom. Additionally, while outputting the image data from the buffer memory MP, the scanner is available for reading another image data, and the image data scanned by the scanner can be stored in either of the buffer memories MS and MP.

Figure 16:
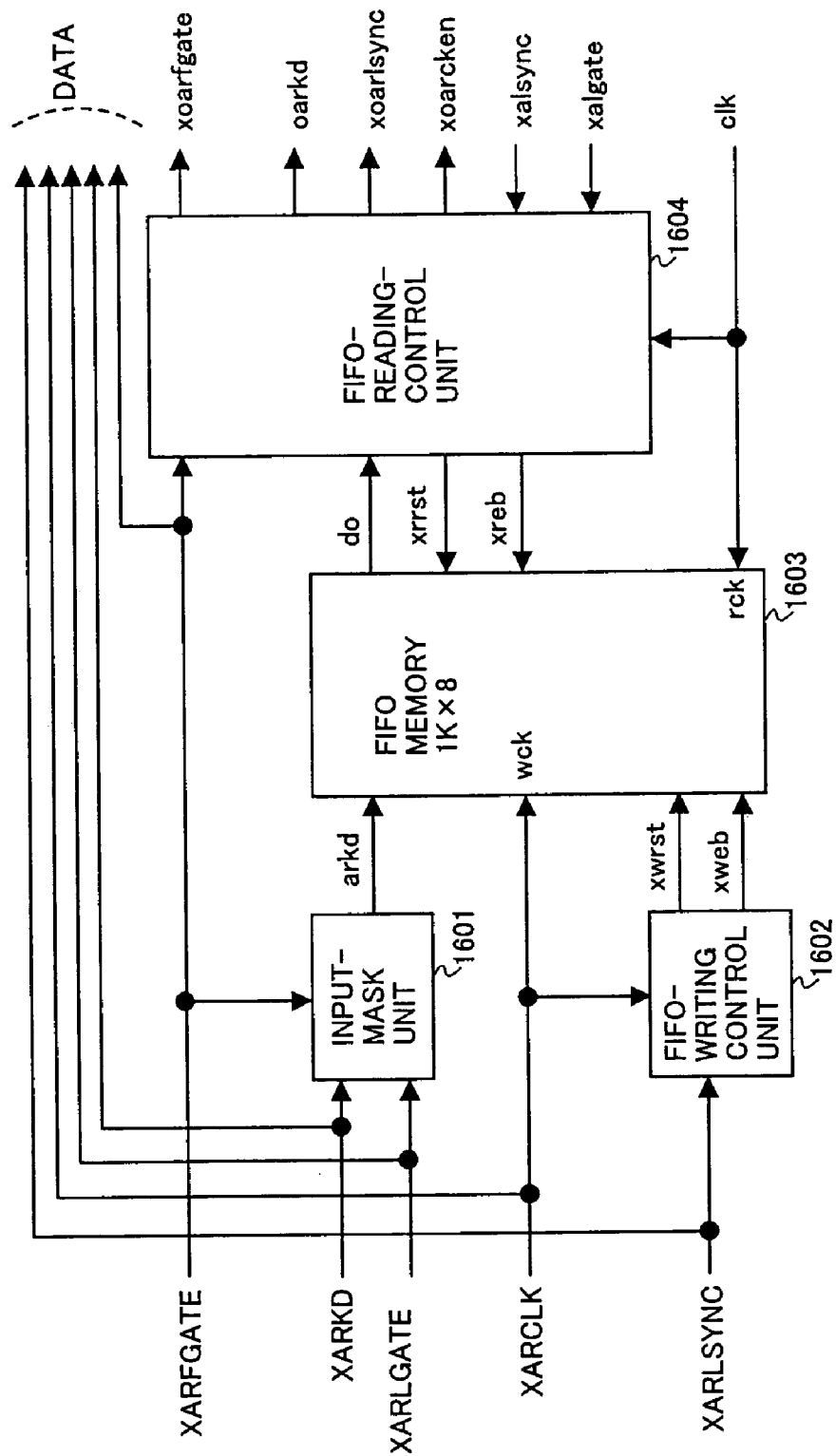
FIG. 16 is a block diagram showing an application-input-control unit.

A description will now be given of an application-input-control unit with reference to FIG. 16. The application-input-control unit shown in FIG. 16 includes an input-mask unit 1601, a FIFO-writing-control unit 1602, a FIFO (First-In First-Out) memory 1603 and a FIFO-reading-control unit 1604. The application-input-control unit is an interface unit that obtains image data synchronous to a clock that is asynchronous to a system clock provided in the composite device 100. The input-mask unit 1601 masks an area on an image data to white except an effective image area that has been received from an external application, and reverses an image level of the image data since the composite device 100 defines a white pixel and a black pixel respectively as a low level and a high level, whereas an interface regulation between the composite device 100 and an external application regularly sets the white pixel and the black pixel respectively as the high level and the low-level. Subsequently, the input-mask-un it 1601 supplies the image data to the FIFO memory 1603 after executing a masking process by the control of the FIFO-writing-control unit 1602.

The composite device 100 receives 7015-bit image data recorded at 600 dpi on a sheet of paper which width and length are respectively A4-sized and 297 mm at maximum from the external application. Additionally, binary image data is carried through the composite device 100 in 8-bit parallel data format, and thus data storage format of the FIFO memory 1603 is 1K×8 bit to store the 7015-bit image data therein. The FIFO-writing-control unit 1602 generates a write-reset signal "xwrst" and a write-enable signal "xweb" from a line-synchronous signal "XARLSYNC" from the external application based on a clock signal "XARCLK" supplied also from the external application as a standard clock signal. An assertion: time of the signal "XARLSYNC" corresponds to a cycle of the clock signal "XARCLK". Additionally, the FIFIO-writing-control unit controls writing of the image data to the FIFO memory 1603 by use of the signals "xwrst" and "xweb". The FIFO-reading-control unit 1604 generates control signals, and specifies a data format for the image data read from the FIFO memory 1603. To be concrete, the FIFO-reading-control unit 1604 generates a read-reset signal "xrrst" and a read-enable signal "xreb" based on the line-synchronous signal "XARLSYNC", the both signals being synchronous to the system clock of the composite device 100. Additionally, the FIFO-reading-control unit 1603 receives, binary image data, that is, 8-bit parallel data, from external applications such as facsimile and a printer, and converts the 8-bit parallel data to 1-bit serial data by use of a shift register to output to an image memory unit (IMU). In other words, the shift register converts the 8-bit parallel data to the 1-bit serial data by one bit, and sets unused bits to "0". The FIFO-reading-control unit 1603 also outputs the 8-bit parallel data to an image-recording system (VCU) without converting a data format of the 8-bit parallel data.

Figure 17:
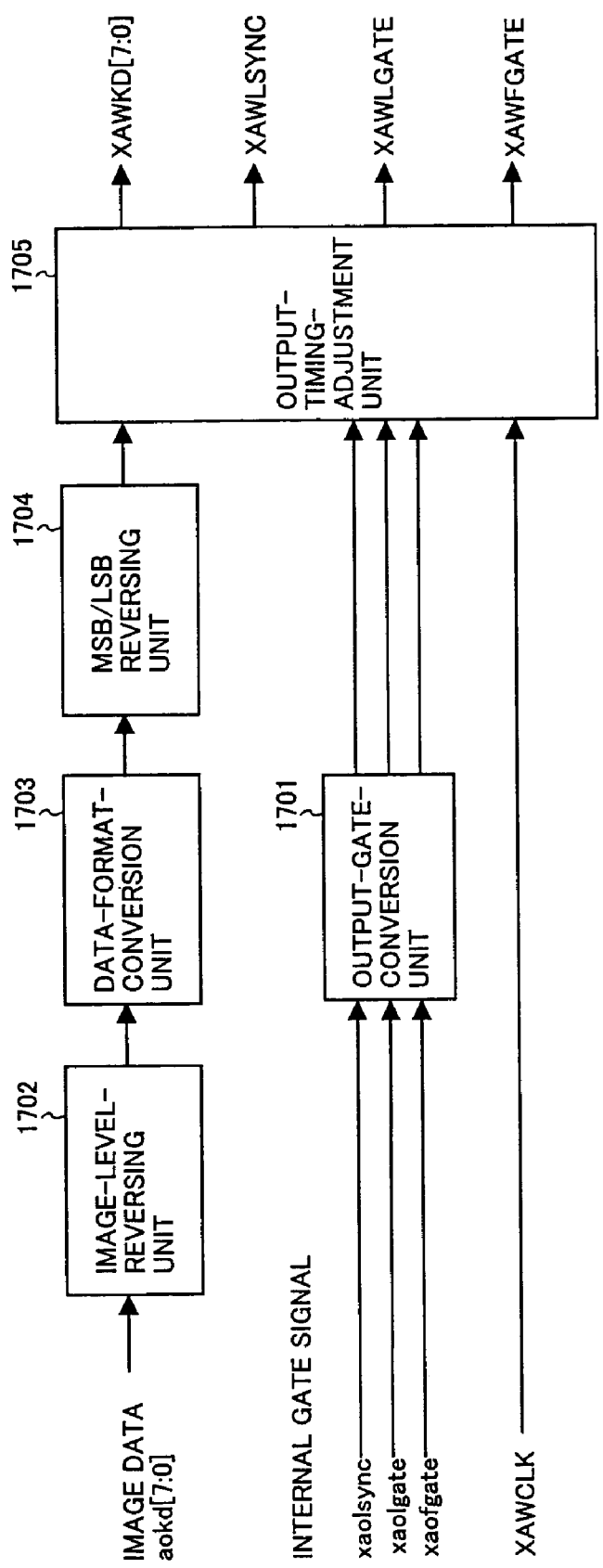
FIG. 17 is a block diagram showing an application-output-control unit.

A description will now be given of an application-output-control unit with reference to FIG. 17. The application-output-control unit shown in FIG. 17 includes an output-gate-conversion unit 1701, an image-level-reversing unit 1702, a data-format-conversion unit 1703, an MSB/LSB reversing unit 1704, and an output-timing-adjustment unit 1705. The application-output-control unit is an interface unit that outputs image data processed in the composite device 100. The output-gate-conversion unit 1701 executes a gate (an effective-image-area-regulation signal) conversion only in the main-scanning direction. To be concrete, the output-gate-conversion unit 1701 coverts the length of a gate in the main-scanning direction to a specified length, wherein the length can be set to a value between 0 dot and 8191 dot. The output-gate-conversion unit 1701 is mainly used for cutting out an image by use of a scanner application, wherein a shifting function of a multiplication unit is used for cutting the image in the main-scanning direction. This output-gate-conversion unit 1701 can be turned on and off depending on an operation executed on the image data. A conversion of a scanner-reading gate is executed at the maximum document size, and an edge of the image data to be outputted after multiplication of the image data is calculated. Subsequently, the edge of the image data is matched with an edge of an effective image area in the main-scanning direction (LGATE) by an image shifting process, and then the gate length is matched with the length in the main-scanning direction. The image is cut out in the sub-scanning direction by setting a gate length in the sub-scanning direction by use of a timing-control unit. Matching to a data format is specified by the length of the LGATE after the gate conversion by a dot. The length of the LGATE is converted according to the selected data format. If the image data is 8-bit multi-valued data or 1-bit binary serial data, the length of the LGATE remains as it has been set. If the image data is 8-bit binary parallel data, the length of the LGATE is converted to ⅛ of the length that has been set. If there exists a remainder from the division of the length, the length of the LGATE is set to a rounded-up value.

The image-level-reversing unit 1702 receives image data as a signal aokd[7:0] from units in the composite device 100, and reverses an image level of the image data since the composite device 100 defines a white pixel and a black pixel respectively as a low level and a high level, followed by passing the image data to the data-format-conversion unit 1703. The data-format-conversion unit 1703 selects a data format for the image data to be outputted to an external application among four data-formatting methods. The first data-formatting method does not convert the data format of the image data, and outputs the image data as multi-valued data read by a scanner or as serial binary image data. The second data-formatting method outputs 6 bits from the most significant bit in the 8-bit image data as 6-bit data after masking the least 2 bits in the image data excluding the 6-bit data to white, wherein the 6-bit data can be shifted to the most-significant-bit (MSB) side, or to the least-significant-bit (LSB) side. The third data-formatting process outputs 4 bits from the most significant bit in the 8-bit image data as 4-bit data after masking the least 4 bits in the image data excluding the 4-bit data to white, wherein the 4-bit data can be shifted to the MSB side or to the LSB side. Additionally, the fourth data-processing method outputs binary 8-bit parallel data after executing 8-bit packing on binary image data when transmitting the binary image data only by use of the MSB in an 8-bit bus. In this case, the MSB is processed through the 8-bit packing initially. The MSB/LSB reversing unit 1704 switches each bit from the MSB to the LSB in the 8-bit bus, or from the LSB to the MSB, and can execute the MSB/LSB reversing process for 1-bit binary, 4-bit multi-valued, 6-bit multi-valued, 8-bit multi-valued, and 8-bit binary packing. Subsequently, the MSB/LSB reversing unit 1704 supplies the image data to the output-timing-adjustment unit 1705.

The output-timing-adjustment unit 1705 outputs the image data and gate signals to an external application synchronously to a rising edge of an output clock "XAW- CLK". Each clock is generated by a clock-generating module provided in the composite device 100, and is supplied to an interface unit (I/F). When transmitting 8-bit multi-valued data and 1-bit binary data to an external application, a clock which cycle and frequency are identical to those of the system clock is supplied to the interface unit. When transmitting 8-bit binary parallel data to the external application, a clock which cycle is ⅛ of the cycle of the system clock is supplied to the interface unit.

Figure 18:
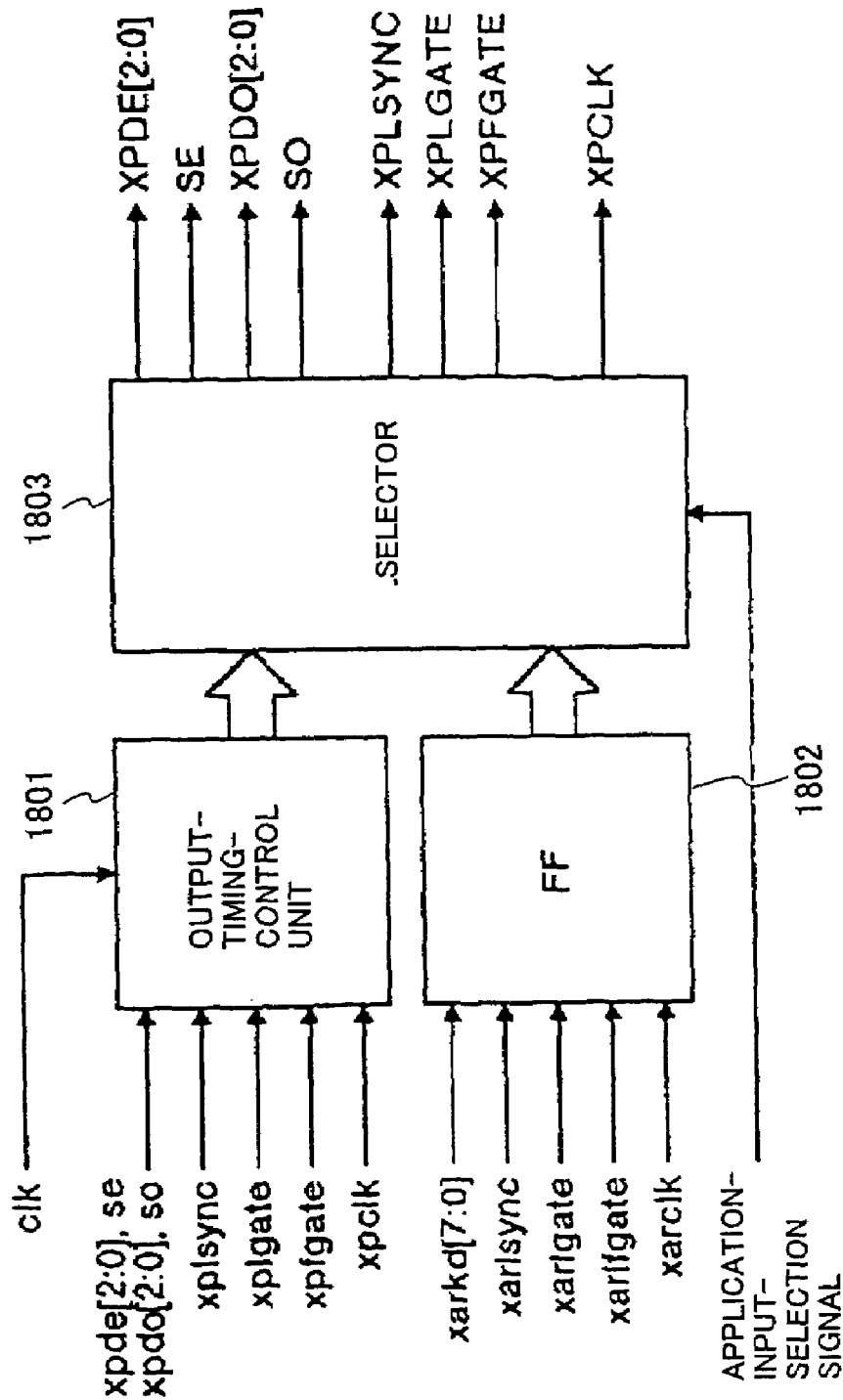
FIG. 18 is a block diagram showing an image-output-control unit.

A description will now be given of an image-output-control unit with reference to FIG. 18. The image-output-control unit shown in FIG. 18 controls outputting image data that has been processed through the composite device 100, and includes an output-timing-adjustment unit 1801 for gate signals, a FF unit 1802, and a selector 1803. The output-timing-adjustment unit 1801 outputs image data that has been processed through printer masking and gate signals that regulates an effective image area of the image data to the selector 1803. More precisely, the output-timing-adjustment unit 1801 outputs the image data and the gate signals that are to be supplied to the image-recording system (VCU), after setting output timing of the image data and the gate signals synchronous to a rising edge of a clock signal "XPCLK" used for outputting data to a VCUL. The clock signal "XPCLK" is generated by the clock-generating module provided in the composite device 100 such that the clock signal "XPCLK" has the same phase as the system clock. Additionally, the clock-generating unit generates the clock signal "XPCLK" which clock cycle is half the system clock cycle when the image data is 4-bit multi-valued data. When the image data is 2-bit multi-valued data, the cycle of the clock signal "XPCLK" is ¼ of the system clock cycle. When the image data is 8-bit binary data, the cycle of the clock signal "XPCLK" is ⅛ of the system clock cycle. The image data and the gate signals are set synchronous to the clock signal "XPCLK", and include a maximum phase difference of eight system clock cycles from a line-synchronous signal "XPLSYNC" that is supplied from the image-output-control unit to the VCU. The image data and the gate signals are processed at a rising edge of a system clock "clk", and timing to output the image data and the gate signals to the selector 1803 is adjusted by a reversed system clock "xclk" in the output-timing-adjustment unit 1801. The selector 1803 selects the image data and the gate signals supplied from the output-timing-adjustment unit 1801 or data supplied from the application-input-control unit by use of an application-input-selection signal, and outputs the selected data set synchronous to the clock signal "XPCLK" therefrom to an interface.

A description will now be given of a data structure with reference to FIGS. 19A through 19D. A data bus used for supplying data to the image-recording system (VCU) is 8-bit wide, and includes signal lines "xpde[2:0]", "se", "xpdo[2:0]", and "so" for transmitting density information and phase information. A bit assignment of the signal lines are based on the bit assignment of the signal lines for transmitting 4-bit multi-valued data, and is changed according to a data format of the data transmitted through the data bus. There are four types of data formats that are, 4-bit multi-valued, 2-bit multi-valued, binary, and 8-bit multi-valued formats for the data transmitted through the data bus. Even-numbered pixels and odd-numbered pixels are transmitted in parallel in the 4-bit multi-valued format. Four pixels are transmitted in parallel in the 2-bit multi-valued format. Eight pixels are transmitted in parallel in the binary format. Additionally, a data format of data is converted for transmitting the data serially through the data bus in the 8-bit multi-valued format.

Figure 19A:
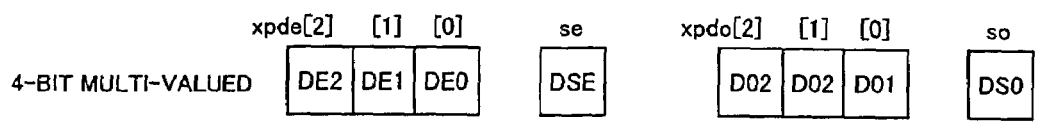
FIGS. 19A, 19B, 19C and 19D are block diagrams showing data structures used for transmitting data in a data bus.
Figure 19B:
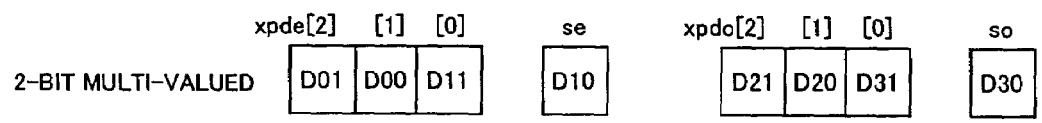

FIG. 19A shows a bit assignment of the signal lines for transmitting 4-bit multi-valued data through the data bus. The signal line xpde[2:0] is used for transmitting density information of even-numbered pixels. The signal line "se" is used for transmitting phase information or additional density information of the even-numbered pixels. The signal line xpdo[2:0] is used for transmitting density information of odd-numbered pixels. The signal line "so" is used for transmitting phase information or additional density information of the odd-numbered pixels. FIG. 19B shows a bit assignment of the signal lines for transmitting 2-bit multi-valued data through the data bus. If the phase information is included in the data transmitted through the data bus, a bit assignment takes a form used for transmitting information about triple-valued density. If the phase is fixed, a bit assignment takes a form for transmitting information about quad-valued density. The first, second, third and fourth pixels are provided respectively to the signal lines xpde[2:1], [xpde[0], se], xpdo[2:1], and [xpdo[0], so].

Figure 19C:
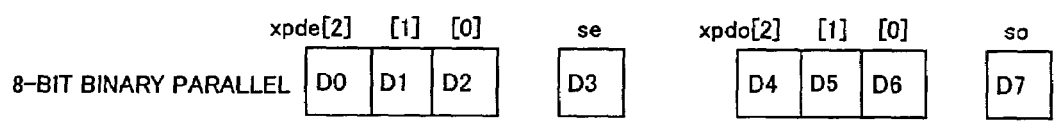
Figure 19D:
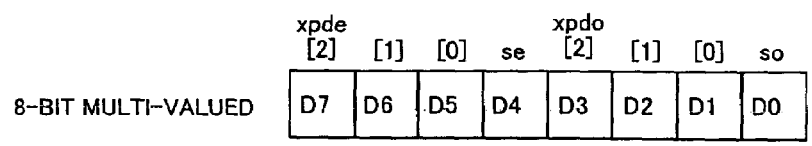

Additionally, FIG. 19C shows a bit assignment of the signal lines for transmitting binary data through the data bus. The bit assignment shown in FIG. 19C converts an image data to 8-bit parallel data for the 8-bit data bus by assigning information about eight pixels to the signal lines xpde[2], xpde[1], xpde[0], "se", xpdo[2], xpdo[1], xpdo[0], and "so" in order. FIG. 19D shows a bit assignment of the signal lines fir transmitting 8-bit multi-valued data through the data bus. In the bit assignment shown in FIG. 19D, 8-bit density information of each pixel is provided to the signal line [xpde[2:0], se, xpdo[2:0], so], wherein each bit of the information is provided to a bit-wide slot in the signal line such that the most significant bit (MSB) of the 8-bit density information is provided to the slot xpde[2], and the least significant bit is provided to the slot "so".

A description will now be given of a smoothing function provided in the composite device 100 with reference to FIG. 20. An image-smoothing unit shown in FIG. 20 includes an image matrix 2001, a jaggy-correction unit 2002, an isolated-point-correction unit 2003, an error-diffusion-enhancing unit 2004, a dithering unit 2005, a pixel-averaging unit 2006, an edging unit 2007, and a selector 2008. A 9-lines×13-pixels two-dimensional matrix is created in the image-matrix 2001 by generating delay data that includes 13 pixels for each of 9 lines in the main-scanning direction based on data supplied through the 9 lines. Each of the units following the image-matrix 2001 accesses the image-matrix 2001 simultaneously, and executes binary/multi valued conversion process except the edging unit 2007. The edging unit 2007 does not need any data from the image matrix 2001, and processes data supplied from a single line. The jaggy-correction unit 2002 including a code generator and a RAM, generates 12-bit code data by executing a pattern-matching process by use of arranged data in the image matrix 2001, and inputs the generated data to an address provided in the RAM. The RAM provided in the jaggy-correction unit 2002 is used for image correction, and outputs image-correction data corresponding to the data inputted thereto. The image-correction data should be downloaded to the RAM before the pattern-matching process.

The isolated-point-correction unit 2003 detects an isolated point in the 9×13 matrix including a focused point by the pattern-matching process. A pixel detected as an isolated point is removed by a masking process, or pixels are added to an two-dimensional area surrounding the pixel detected as the isolated point to create a set of pixels that do not consist an isolated point. The masking process and the addition of pixels to the isolated point can be selected by switching an operation mode of the composite device 100 to be executed or not. An isolated dot causes unevenness of density in an image-recording area since there are cases that the isolated dot is reproduced or not reproduced according to image-recording processes and image-recording conditions of an image-recording system, and thus causes deterioration of image quality. Accordingly, dot density of the isolated dot should be increased so that the isolated dot can be reproduced stably, or can be eliminated from the image. The error-diffusion-enhancing unit 2004 smoothes texture of the image by use of a band-path filter that keeps line drawings on the image, and generates a phase signal based on an order of pixels in the main-scanning direction.

The dithering unit 2005 converts data in the image matrix 2001 to a multi-valued signal virtually by executing a 5×5 or 9×9 low-pass filtering process on a binary dithering pattern provided from the image matrix 2001. The pixel-averaging unit 2006 takes an average of pixels adjacent to each other, and generates phase information for the multi-valued signal. The dithering unit 2005 executes each of 5×5, 7×7, and 9×9 filtering processes for smoothing the 9×13 matrix by use of a smoothing filter provided therein. The smoothing filter provided in the dithering unit 2006 receives a 1-bit binary signal from the image matrix 2001, and eliminates a high-level signal element from the 1-bit binary sigal. Subsequently, the pixel-averaging unit 2006 takes an average between an even-numbered pixel and an odd-numbered pixel in the main-scanning direction for a pixel to be smoothed. A value of the smoothed pixel is the average of the even-numbered pixel and the odd-numbered pixel. The pixel-averaging unit 2006 then generates 2-dotted image data after setting the even-numbered pixel as a right phase and the odd-numbered phase as a left phase. The selector 2008 selects a density signal and a phase signal among density signals and phase signals supplied from each unit connected to the selector 2008, and then converts the selected density signal and phase signal respectively to a 4-bit signal and a 2-bit signal to output therefrom.

Figure 21:
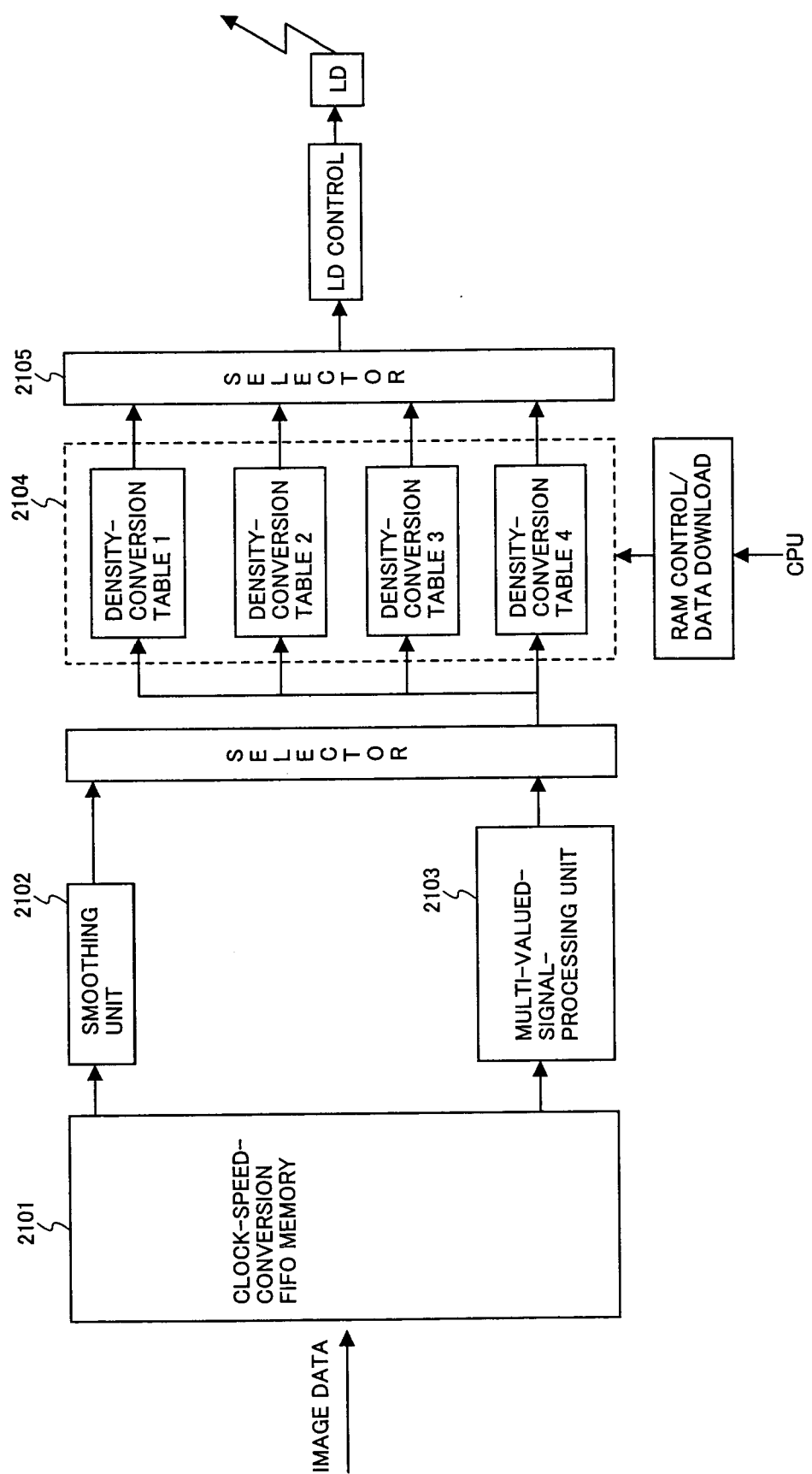
FIG. 21 is a block diagram showing an image-recording-control unit.

A description will now be given of an image-recording-control unit with reference to FIG. 21. The image-recording-control unit shown in FIG. 21 includes a clock-speed-conversion FIFO memory 2101, a smoothing module 2102, a multi-valued-signal-processing unit 2103, a density-conversion unit 2104, and a selector 2105. Image data inputted to the image-recording system from the video-path-control unit 109 is one of image data scanned by a scanner provided in the document-reading unit 101, image data stored in a memory module, and image data received from the external application 112. Since each clock provided in the scanner, the memory module and the external application 112 for processing pixels is not synchronous to a clock used for recording image data according to pixel density of the image data, the image-recording-control unit includes a 2-port RAM mechanism in its clock-speed-conversion FIFO memory 2101 to convert a clock speed used for processing the image data. Image data is initially recorded in a RAM provided in the clock-speed-conversion FIFO memory 2101 at a first clock speed, and then is read from the RAM at a second clock speed, thereby converting the clock speed for processing the image data.

Subsequently, the image data read from the RAM provided in the clock-speed-conversion FIFO memory 2101 is supplied to the smoothing module 2102 and the multi-valued-signal-processing unit 2103, where in a data format of the image data is converted. The smoothing module 2102 converts binary image data to multi-valued data. The multi-valued-signal-processing unit 2103 executes a conversion process of a phase signal. The density-conversion unit 2104 includes a plurality of density-conversion tables, and converts density level of the image data by use of the tables in parallel, considering density-reproduction characteristics of an image-forming process, after receiving the multi-valued data from the smoothing unit 2102 and the multi-valued-signal-processing unit 2103. Data stored in each table in the density-conversion unit 2104 is downloaded by the CPU 119. Additionally, the data downloaded by the CPU 119 and used for converting density of the image data is controlled in detail for the most appropriate reproduction of the image, considering changes in the processing mode, usage of a printer, reception of an image by a facsimile, copy of an image scanned by a scanner, a document that mainly includes texts, copy of a printed document, and copy of a photo. Subsequently, the selector 2105 selects image data which density level has been converted by the density-conversion unit 2104 according to a processing mode. The image data selected by the selector 2104 is generated as a latent image on an image-forming unit by turning a laser diode (LD) on and off by controlling a phase and a power of the laser diode (LD) by use of a PM (Pulse Modulation) and a PWM (Pulse-Width Modulation).

Figure 22:
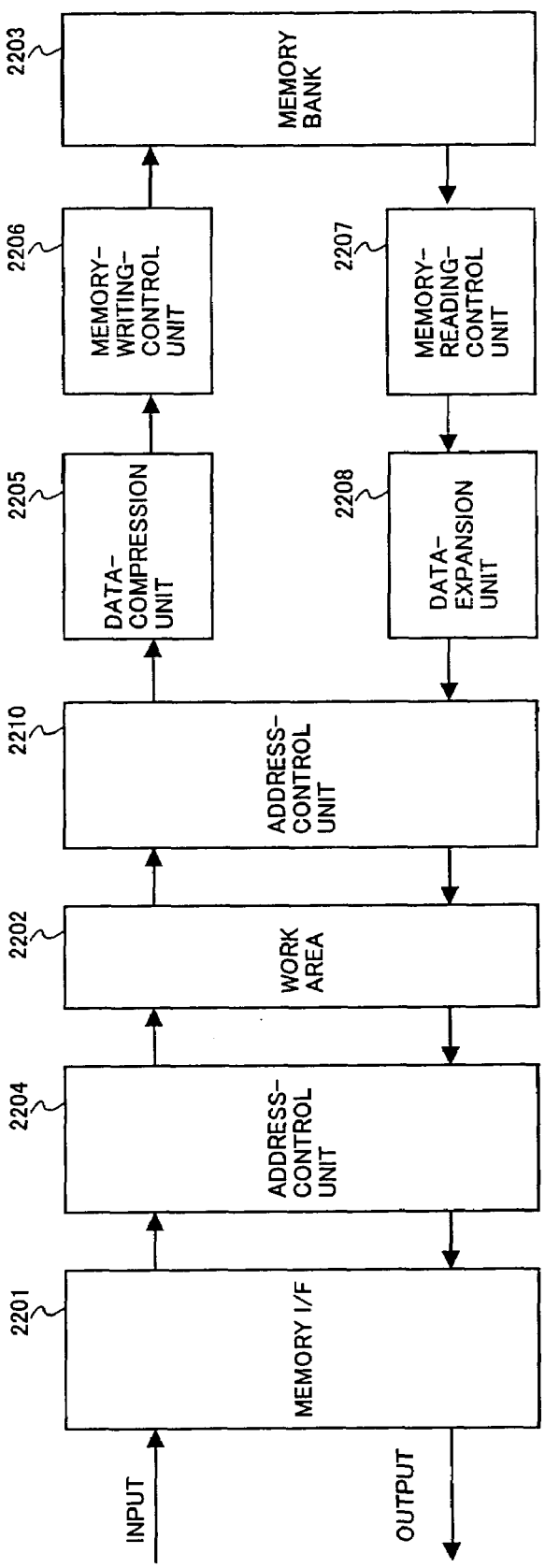
FIG. 22 is a block diagram showing a memory module.

A description will now be given of a memory module with reference to FIG. 22. The memory module shown in FIG. 22 includes a memory interface (I/F) 2201, a work area 2202, a memory bank 2203, address-control units 2204 and 2210, a data-compression unit 2205, a memory-writing-control unit 2206, a memory-reading-control unit 2207, and a data-expansion unit 2208. The memory interface 2201 controls input and output of image data. The work area 2202 includes a RAM for storing data to process the image data. The memory bank 2203 is a memory area used for storing the image data, and includes a non-electric memory such as a RAM, a HDD, a MO, a CD-RW, a DVD, and the like. The work area 2202 is used for executing bit-map expansion on input image data and output image data. The input image data and the output image data can be expanded individually to a memory area with any memory address by the address-control unit 2204. For instance, mixture of input image data and a bit map expanded from image data stored in the memory bank 2203, aggregation of two images, rotation of an image, addition of a printing pattern such as a date onto input image data are executed in the work area 2202. Image data is stored in the memory bank 2203 by the memory-writing-control unit 2206 after being compressed by the data-compression unit 2205 for effectively allocating memory areas in the memory bank 2203. This data compression regularly encodes image data in reverse conversion. However, non-reverse conversion of the image data can be executed as long as image quality of a reproduced image does not decrease visually. When storing the input image data in the memory bank 2203 by use of the memory-writing-control unit 2206, ID information and property information of the input image data such as an input system where the input image is supplied from and a processing mode, are attached to the input image data.

The memory-reading-control unit 2207 reads image data from the memory bank 2203. The image data read by the memory-reading-control unit 2207 is expanded by the data-expansion unit 2208 to a bit map. The property information of image data affects bit-map expansion of the image data occasionally. However, the property information of the image data is basically used for controlling the above-described image recording-control unit to set appropriate parameters for recording an image, and is especially used for controlling a selection of density-conversion tables provided in the image-recording-control unit.

Figure 23A:
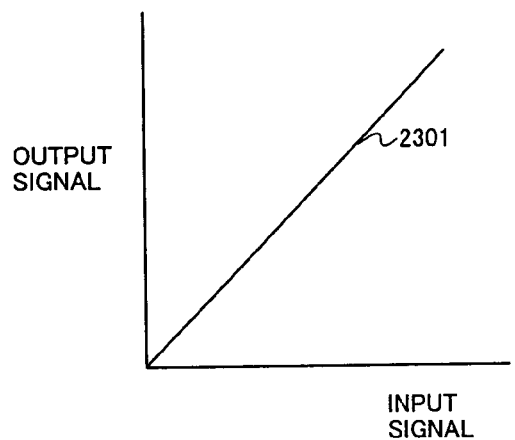
FIGS. 23A, 23B and 23C are graphs showing characteristics of a density-conversion table.
Figure 23B:
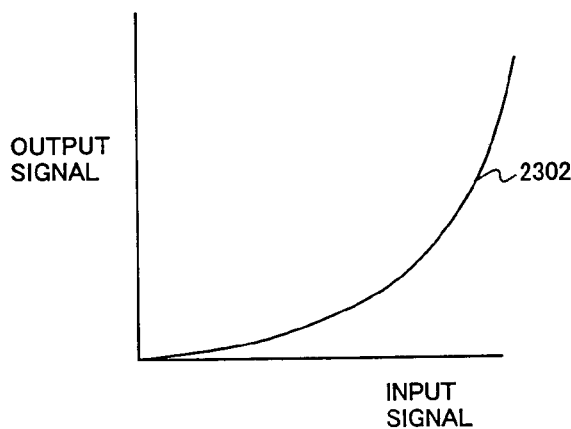
Figure 23C:
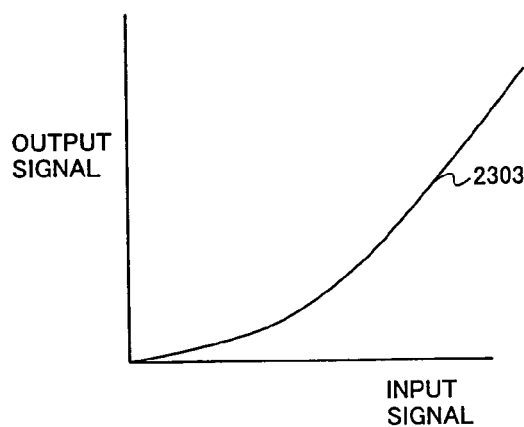

A description will now be given of an embodiment of a density-conversion table with reference to FIGS. 23A, 23B and 23C. Characteristics of a density-conversion table can be linear to data inputted thereto in a case that a binary density level is to be reproduced. Linear data is downloaded by the CPU 119 to the density-conversion table so that an output density level becomes equal to an input density level. Characteristics 2301 of the color-conversion table shown in FIG. 23A can be adapted to conversion of density level of image data in a case that the density of the image data is set to the most appropriate density level by being processed through γ-correction executed by a scanner provided in the document-reading unit 101 or density correction, and in a case that a γ-process executed in an image-forming unit is linear to an input signal. In a case that tone reproduction of the image data is important, data linear to density should be downloaded in order to correct linearity of the process. FIGS. 23B and 23C respectively show characteristics 2302 and 2303 of the density-conversion table. The characteristics 2302 and 2303 of the density-conversion table are between characteristics linear to density and characteristics linear to data, and are used for reproducing a balance between texts and patterns in a case that the image data includes the texts and the patterns. Additionally, data downloaded to the density-conversion table are affected by a dot formation. It is generally hard to reproduce a one-dot isolated point, but is fine to reproduce density in an area wherein dots and lines are clustered together. The data downloaded to the density-conversion table is further affected by a modulation method for controlling the laser diode (LD), and image processing for tone reproduction. Accordingly, various data and elements are necessary for generating the density-conversion table.

Figure 24:
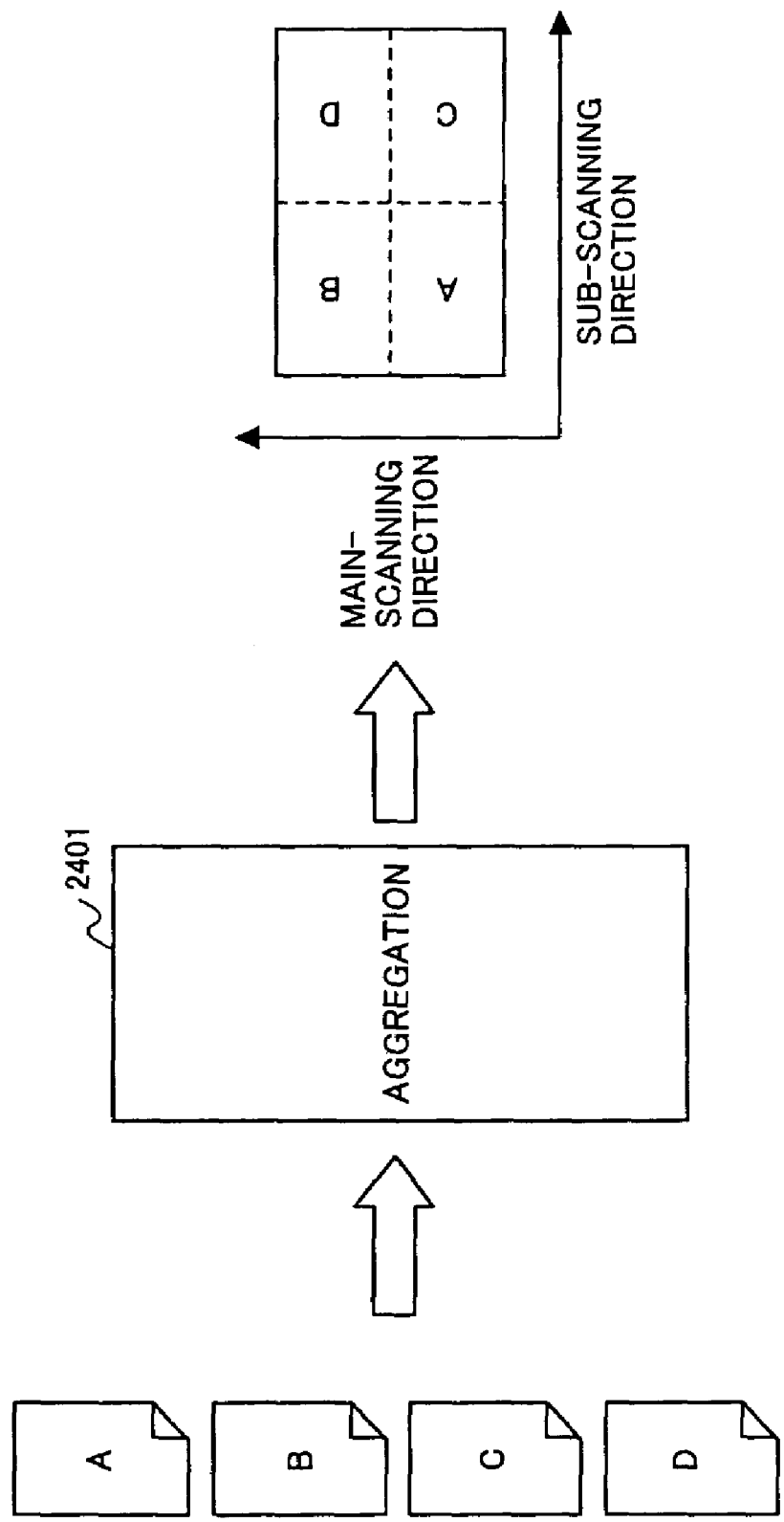
FIG. 24 is a block diagram showing an image-aggregation unit to place images together on a single document.

A description will now be given of an image-aggregation unit 2401 to place images together on a single document with reference to FIG. 24. FIG. 24 shows a case that images A, B, C and D are read by a scanner, and their image sizes are reduced so that all the images can be fit on a single printing paper. It is assumed that the images A and D include mainly texts, the image B includes patterns, and the image C includes texts and patterns. The images A and D, the image B, the image C are read by the scanner respectively in a text mode, a photo mode, and a text/photo mode, and are stored in the memory module. Characteristics of the γ-correction executed by the scanner, a filter used for the MTF correction, the density γ-correction are set differently for each of the images A and D, the image B, and the image C. Additionally, characteristics of "γ" of the density conversion are differently set for each of the images A and D, the image B, and the image C by respectively setting resolution of the images A and D, gradation of the image B, and the balance of the texts and the patterns in the image C to the first priority.

When the images are stored in the memory module, parameters that exclude characteristics of the memory-writing control and are used in an image-processing system are read to the memory module, and characteristics necessary to write the images in the memory module are added to properties of the images stored therein. For instance, in the text mode, density-conversion characteristics necessary for the text mode or assumed density-conversion characteristics are added to the properties. The images are aggregated in the work area 2202 of the memory module, and the aggregated image is outputted to the image-recording-control unit through the video-path-control unit 109. When aggregating the images by use of the work area 2202, addresses where the images are connected to each other in the main-scanning and sub-scanning directions are extracted from the property information of the aggregated image, and counter control is executed. The aggregated image is supplied to the density-conversion unit 2104 of the image-recording-control unit, and density conversion of the aggregated image is executed by switching the density-conversion table to be used among at least three types of the density-conversion tables according to characteristics of the aggregated image. The contents of the density-conversion table can be replaced depending on an emphasized element such as the texts and the patterns in the aggregated image.

According to the first embodiment of the present invention as described above, the input-density correction executed by the input-density-correction unit 103, the density correction executed by the density-correction unit 106, and the recording-density correction executed by the recording-control block 110 can be individually controlled by processing modes selected by a user. Accordingly, the density correction of image data can be executed by the composite device 100 in the most appropriate combination of processing modes.

Since the first embodiment of the present invention makes a user to control the input-density correction, the notch-density correction and the recording-density correction individually, the selection of the processing modes by the user is diverse. Consequently, the user might have to repeat test printing often for setting the most appropriate combination of the processing modes. To solve the above-described complication of setting the most appropriate processing mode, a composite device that stores combinations of settings for the input-density correction, the notch-density correction and the recording-density correction in the operation unit 120 of the composite device is provided according to a second embodiment of the present invention so that the composite device can record an image in a processing mode or a recording mode that is the most appropriate for a type of an input document and for characteristics of recording the image. It should be noted that the composite device according to the second embodiment includes identical units and functions as the composite device according to the first embodiment except its operation unit 120, and thus a description of the units in the composite device according to the second embodiment corresponding to the units in the composite device according to the first embodiment is omitted.

Figure 25A:
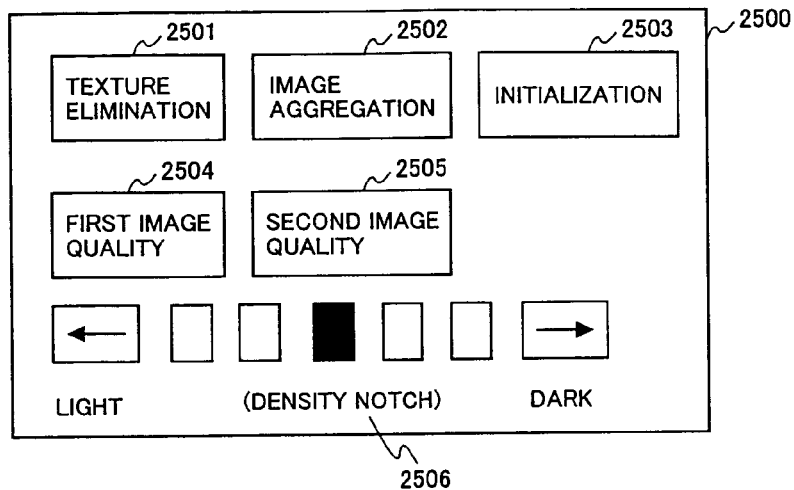
FIGS. 25A, 25B and 25C are block diagrams showing an operation screen provided in an operation unit according to a second embodiment of the present invention.
Figure 25B:
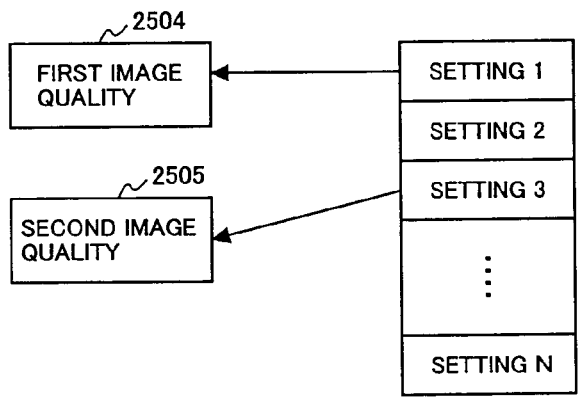
Figure 25C:
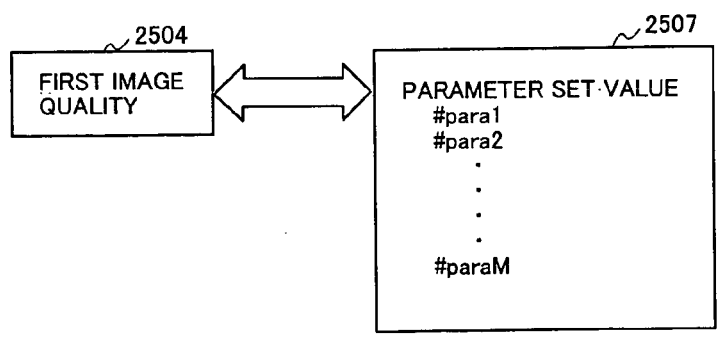

A description will now be given of an operation screen with reference to FIGS. 25A, 25B and 25C. An operation screen 2500 shown in FIG. 25A is provided in the operation unit 120 of the composite device 100, and includes a texture-elimination key 2501, an image-aggregation key 2502, an initialization key 2503, a first-image-quality key 2504, a second-image-quality key 2505, and a density notch 2506. The texture-elimination key 2501 is operated for selecting a texture-tracking level that is a parameter used for reading density of texture of an input document by use of an image-reading system including the document-reading unit 101 among fixed settings. For instance, the texture-elimination key 2501 controls the image-reading system to eliminate the texture of the input document completely, or to keep low density signals of the texture. Additionally, the texture-elimination key 2501 controls a threshold level used for eliminating density signals after selecting the texture-tracking level. A conversion table for the scanner γ correction is switched according to the selected texture-tracking level also by the texture-elimination key 2501.

The image-aggregation key 2502 is used for turning an image-aggregation process in the memory module on and off. For instance, the number of input documents to be aggregated onto a single printing paper is selected by the image-aggregation key 2502. A method to aggregate the input documents is set by the initialization key 2503. The first-image-quality key 2504 and the second-image-quality key 2505 are used for selecting an image-processing mode for recording an image. For instance, the image-processing mode can be a text mode, a photo mode, a text/photo mode, and a special-document mode, each of the modes not being fixed. The image-processing mode is set by the initialization key 2503, and only frequently used image-processing modes are displayed on the operation screen 2500. Infrequently used image-processing modes are selected by use of the initialization key 2503. When the density of a document to be recorded has been changed by the density notch, a set value of an image-reading table is switched to a value corresponding to the changed density.

The initialization key 2503 is also used for selecting image-processing modes, and for providing the selected image-processing modes to each of the first-image-quality key 2504 and the second-image-quality key 2505. To be concrete, image-processing modes with setting 1 through setting N are prepared as shown in FIG. 25B, and the two most frequently used image-processing modes are set to the first-image-quality key 2504 and the second-image-quality key 2505, for example, the image-processing mode with the setting 1 to the first-image-quality key 2504, and the image-processing mode with the setting 3 to the second-image-quality key 2505. If all of the image-processing modes with the setting 1 through the setting N are displayed on the operation screen 2505, a selection of the image-processing modes are increased, thereby satisfying a plurality of needs for recording an image. However, operability of the operation unit 120 decreases if the number of the image-recording modes that are actually used is small. The settings 1 through N can cover the most image-reading and image-reading conditions. However, any additional modes can be created for operating the composite device 100 in a special mode.

Parameters for a setting can be collected in a group to be registered as an image-processing mode by use of the initialization key 2503. As shown in FIG. 25C, an image-processing mode that is customized to match a specific environment for operating the composite device 100 can be executed by grouping various parameters for each setting to create a group of the parameters, and combining desirable parameter set values 2507 with the group of the parameters to create a new setting, followed by assigning the new setting to the first-image-quality key-2504.

Figure 26A:
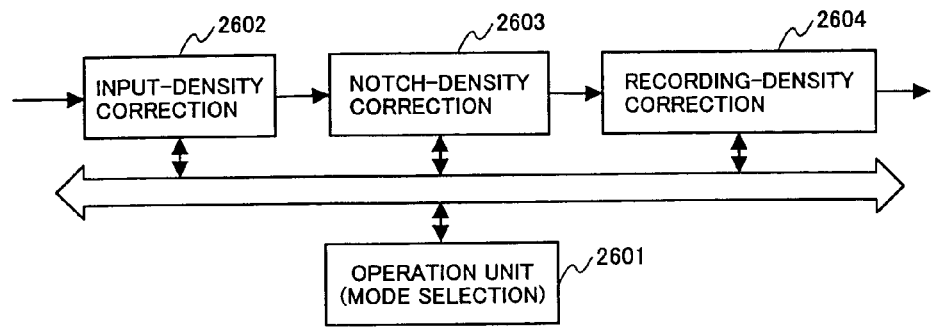
FIGS. 26A through 26E are graphs for describing density correction controlled by the operation screen provided in the operation unit.
Figure 26B:
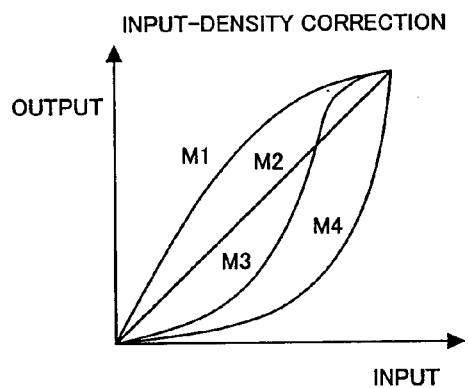
Figure 26C:
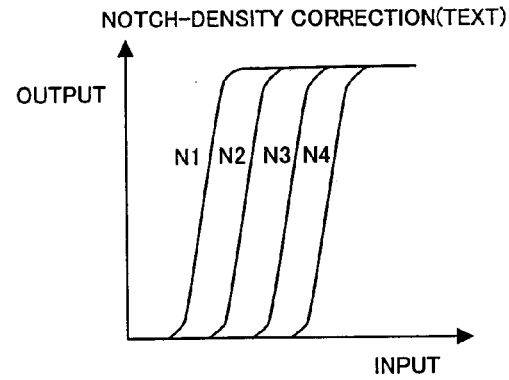
Figure 26D:
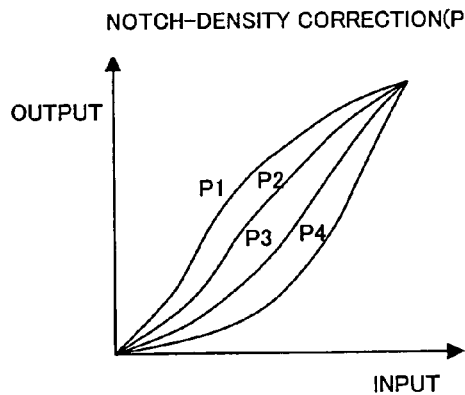
Figure 26E:
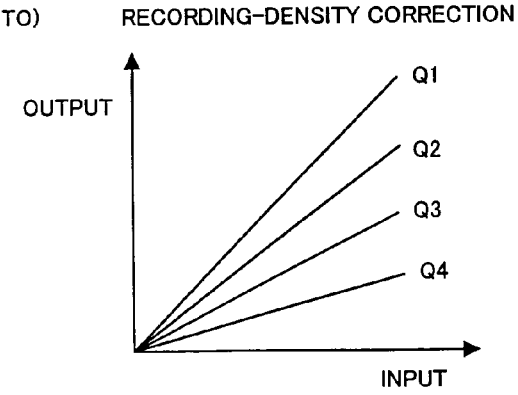

A description will now be given of density correction controlled by the operation screen 2500 provided in the operation unit 120 with reference to FIGS. 26A through 26E. As shown in FIG. 26A, each of an input-density correction 2602, a notch-density correction 2603 and a recording-density correction 2604 can be executed individually by controlling each of the correction using the operation screen provided in the operation unit 2601. The operation unit 2601 corresponds to the previously described operation unit 120. Additionally, the notch-density correction 2603 is density correction executed according to adjustment of the density notch as described above. The input-density correction 2602 is executed by selecting one of curves M1 through M4 from a graph shown in FIG. 26B. The notch-density correction 2603 is executed by selecting one of lines N1 through N4 from a graph shown in FIG. 26C if an input document contains mainly texts, and one of lines P1 through P4 from a graph shown in FIG. 26D if an input document contains mainly photographs and images. The recording-density correction 2604 is executed by selecting one of lines Q1 through Q4 from a graph shown in FIG. 26E.

However, it is not simple to select the most appropriate combination of the parameters used for each of the above-described correction. Accordingly, it is suggested to set the parameters M1, N2, and Q3 to the first-image-quality key 2504 by use of the initialization key 2500 as described with reference to FIG. 25 so that the input-density correction 2602, the notch-density correction 2603, and the recording-density correction 2604 corresponding respectively to each of the parameters M1, N2 and Q3 can be executed just by selecting the first-image-quality key 2504. According to the second embodiment of the present invention as described above, a desirable output image is obtained by executing a simple operation, and more precisely by registering a combination of settings and parameters that are used for the input-density correction executed by the input-density-correction unit 103, the density correction executed by the density-correction unit 106, and the recording-density correction executed by the recording-control block 110.

A description will now be given of an operation screen according to a third embodiment of the present invention with reference to FIG. 27. In the third embodiment of the present invention, groups of parameters defined as characteristics of density, characteristics of a filter are initially supplied to user of the composite device as predetermined image-quality modes, since it is not simple for a general user to select the most appropriate combination of the parameters for setting image quality for recording an image. Accordingly, the user can select an image-quality mode that satisfies the user's needs, and additionally can set another image-quality mode by use of a predetermined image-quality mode as a customizing sample, thereby increasing the operability of the composite device by the user. It is preferred to keep a current image-quality mode being used by the user after adjustment of the composite device has been executed in a maintenance mode by a professional service man in order to increase the operability of the composite device by the user. The thirds embodiment of the present invention relates to a method to adjust an absolute value for each setting of the composite device in a case that a service man adjusts settings of the composite device in a maintenance mode when a change in the setting is necessary.

Figure 27A:
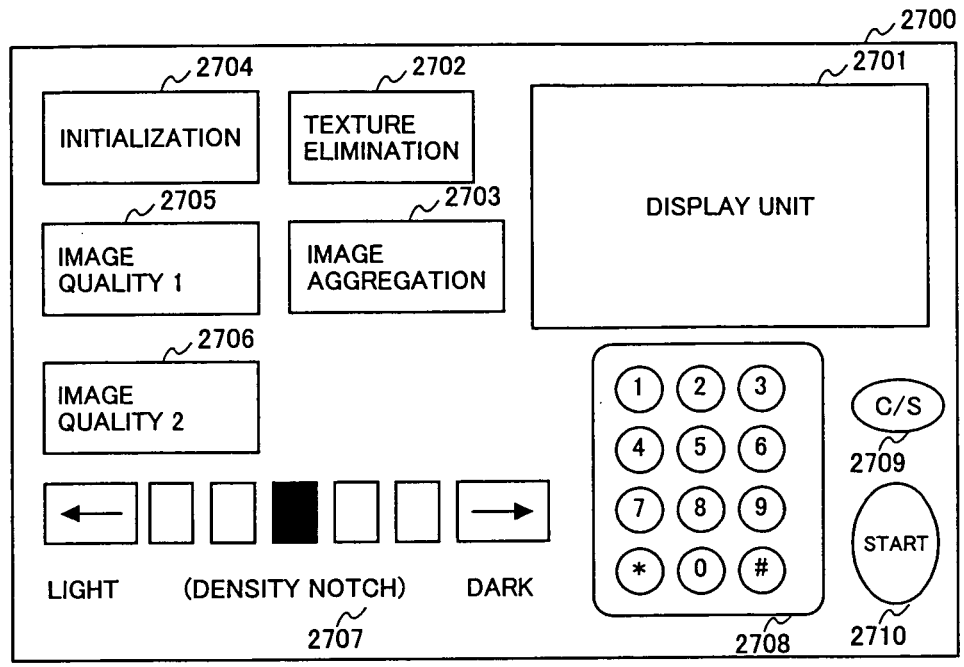
FIGS. 27A through 27F are block diagrams showing an operation screen provided in an operation unit according to a third embodiment of the present invention.
Figure 27B:
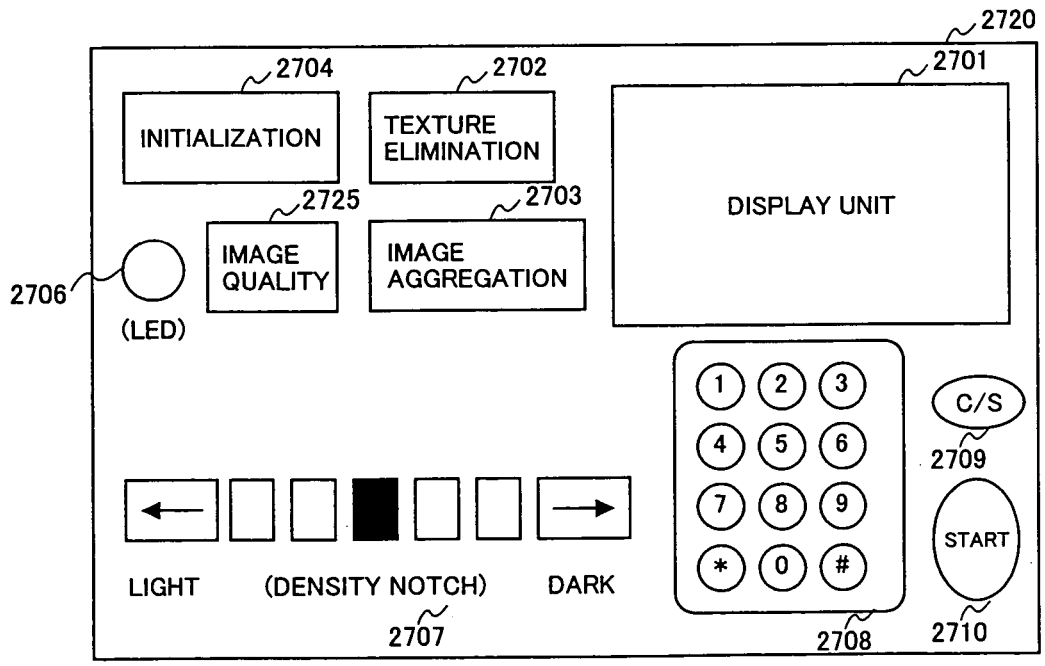

An operation screen 2700 shown in FIG. 27A includes a display unit 2701, a texture-elimination key 2702, an image-aggregation key 2703, an initialization key 2704, a first-image-quality key 2705, a second-image-quality key 2706, a density notch 2707, a ten key 2708, a clear/stop (C/S) key 2709, and a start key 2710. On the other hand, an operation screen 2720 shown in FIG. 27B includes an image-quality-key 2725 and a light-emitting diode (LED) 2726 instead of the first-image-quality key 2705 and the second-image-quality key 2706. The operation screen 2720 shown in FIG. 27B distinguishes a selected image-quality key that is one of the first-image-quality key 2705 and the second-image-quality key 2706 by use of the LED 2726. For instance, the turned-on LED 2726 may indicate that the first-image-quality key 2705 is selected. On the other hand, the turned-off LED 2726 may indicate that the second-image-quality key 2706 is selected.

The texture-elimination key 2702 is operated for selecting a texture-tracking level that is a parameter used for reading density of texture of an input document by use of an image-reading system including the document-reading unit 101 among fixed settings. For instance, the texture-elimination key 2702 controls the image-reading system to eliminate the texture of the input document completely, or to keep low density signals of the texture. Additionally, the texture-elimination key 2702 controls a threshold level used for eliminating density signals after selecting the texture-tracking level. A conversion table for the scanner γ correction is switched according to the selected texture-tracking level.

The image-aggregation key 2703 is used for turning an image-aggregation process in the memory module on and off. For instance, the number of input documents to be aggregated onto a single printing paper is selected by the image-aggregation key 2703. A method to aggregate the input documents is set by the initialization key 2704. The first-image-quality key 2705 and the second-image-quality key 2706 are used for selecting an image-processing mode for recording an image. For instance, the image-processing mode can be a text mode, a photo mode, a text/photo mode, and a special-document mode, each of the modes not being fixed. The image-processing mode is set by the initialization ey 2704, and only frequently used image-processing modes are displayed on the operation screen 2700 and operation screen 2720. Infrequently used image-processing modes are selected by use of the initialization key 2704. When the density of a document to be recorded has been changed by the density notch, a set value of an image-reading table is switched to a value corresponding to the changed density.

Figure 27C:
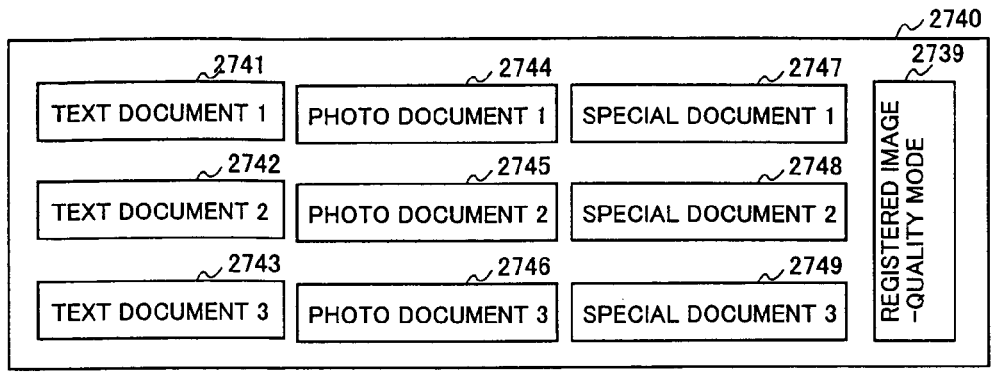

A description will now be given of a method to set an image-quality mode. Image-quality modes provided to the first-image-quality key 2705 and the second-image-quality key 2706 are selected by use of the initialization key 2704. FIG. 27C shows a method to select an image-quality mode among predetermined image-quality modes, and to register a new image-quality mode. FIG. 27F shows a method to select an image-quality mode among predetermined image-quality modes, and to adjust the selected image-quality mode if small adjustment of the selected image-quality mode is necessary. An image-quality-mode-selection screen 2740 includes image-quality modes "text document 1" 2741, "text document 2" 2742 and "text document 3" 2743 that are suitable for reading and recording a text document. Additionally, the image-quality-mode-selection screen 2740 includes image-quality modes "photo image 1"2744, "photo image 2" 2745 and "photo image 3" 2746 that are suitable for reading and recording a photo document that mainly includes photographs and images. Additionally, the image-quality-mode-selection screen 2740 includes image-quality modes "special document 1" 2747, "special document 2" 2748 and "special document 3" 2749 that are suitable for reading and recording a special document. The two most frequently used image-quality modes are assigned to the first-image-quality key 2705 and the second-image-quality key 2706. A plurality of image-quality modes that can be applied to various image qualities may be displayed on the operation screen 2700 to satisfy various types of needs from users. However, the number of the image-quality modes that are actually used is not large so that the operability of the composite device decreases by displaying the plurality of image-quality modes on the operation screen 2700. Accordingly, an image-quality mode is selected to be displayed on the operation screen 2700 depending on the frequency of the image-quality mode being used.

The image-quality-mode-selection screen 2740 further includes a registered-image-quality mode 2739.

The image-quality modes provided in the image-quality-mode-selection screen 2740 can be adapted to the most environments for operating the composite device. However, a special image-quality mode can be created by grouping various parameters for each setting to create a group of the parameters, and combining desirable parameter set values with the group of the parameters to create a new setting, followed by assigning the new setting to the registered-image-quality mode 2739. The composite device 100 can execute image processing in a special environment by assigning the registered-image-quality mode 2739 to the first-image-quality key 2705.

Figure 27D:
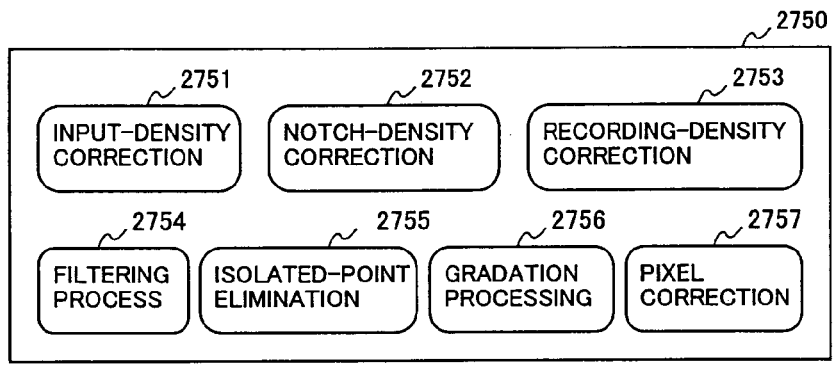
Figure 27E:
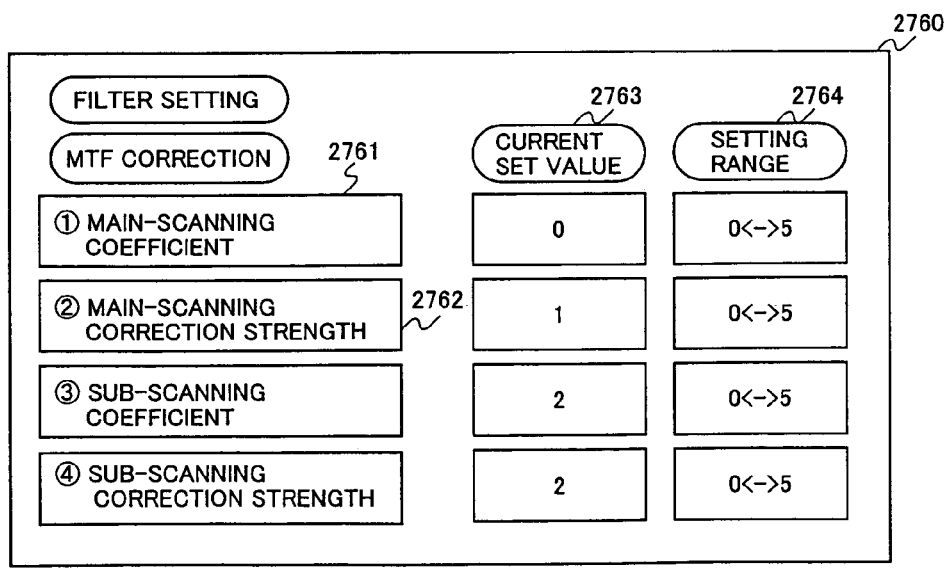
Figure 27F:
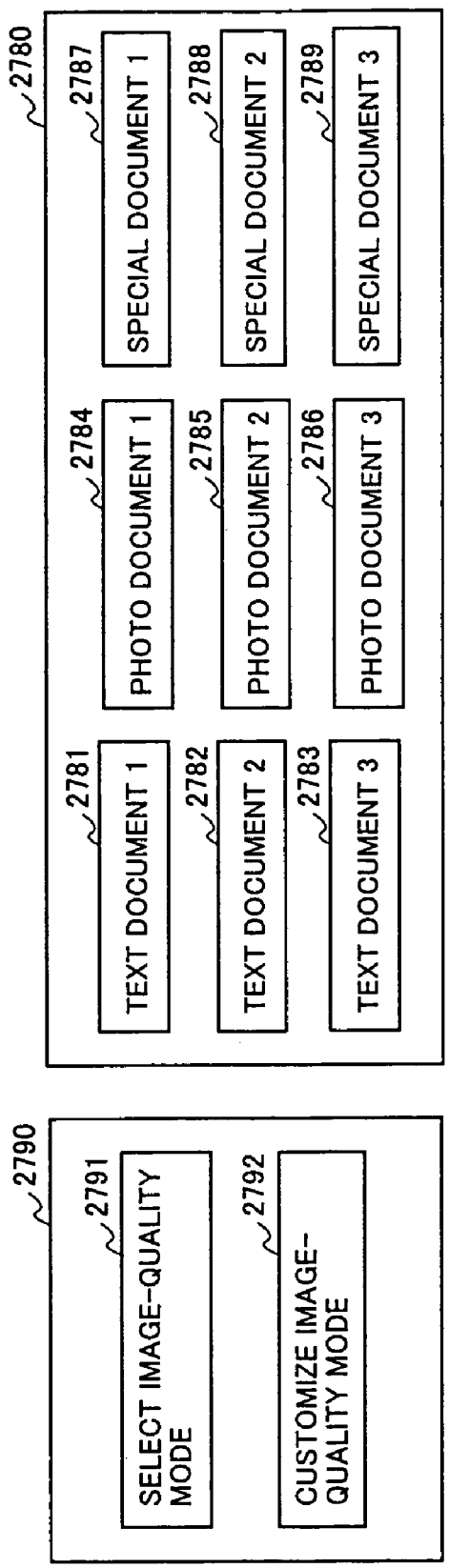

FIGS. 27D and 27E are respectively parameter-setting screens 2750 and 2760. When a process to set the registered-image-quality mode 2739 is executed by use of the initialization key 2704, the parameter-setting screen 2750 appears in the display unit 2701. The parameter-setting screen 2750 shows controllable modules by setting their parameters. Items shown in the parameter-setting screen 2750 are an input-density correction 2751, a notch-density correction 2752, a recording-density correction 2753, a filtering process 2754, an isolated-point elimination 2755, gradation processing 2756, and pixel correction 2757. When one of the items is selected, another screen including adjustable items for controlling image quality is displayed. For example, the parameter-setting screen 2760 is displayed when the filtering process 2754 is selected. The parameter-setting screen 2760 is a screen for setting MTF correction, and includes adjustable parameters such as a main-scanning coefficient 2761 and main-scanning correction strength 2762. Additionally, a current set value 2763 and a setting range 2764 are displayed for each of the adjustable parameters so that a user can set values for the adjustable parameters in detail. The set values for the adjustable parameters can be inputted as absolute values or in relative values. The main-scanning correction strength 2762 is set by inputting a relative value, for example. Range from the strongest to the weakest for the main-scanning correction strength is divided into a plurality of relative set values to be selected by a user. After selecting one of the relative set values for the main-scanning correction strength, the selected relative set value is converted to an absolute value by the CPU 119.

FIG. 27F shows operation screens 2780 and 2790 for a user to adjust parameters of a currently provided image-quality mode in detail. The user can decide to select an image-quality mode among the predetermined image-quality modes or to customize one of predetermined image-quality modes by selecting one of a "select image-quality mode" item 2791 and a "customize image-quality mode" item 2792 provided in the operation screen 2790. The "select image-quality mode" item 2791 is selected for selecting an image-quality mode among predetermined image-quality modes 2781 through 2789, and then assigning the selected image-quality mode to one of the first-image-quality key 2705 and the second-image-quality mode 2706. The "customize image-quality mode" item 2792 is selected for adjusting a predetermined image-quality mode that has been assigned to the first-image-quality key 2705. The current set value 2763 and the setting range 2764 for the predetermined image-quality mode that has been assigned to the first-image-quality key 2705 is displayed in the parameter-setting" screen 2760 by selecting the "customize image-quality mode" item 2792 for the first-image-quality key 2705, and thus the predetermined image-quality mode can be customized by changing the current set value 2763. It is possible to register a new image-quality mode in addition to the predetermined image-quality mode in the above-described case. However, the newly registered image-quality mode cannot be selected as the other predetermined image-quality modes.

A method to register a new image-quality mode is used as a method to adjust a predetermined image-quality mode that has been assigned to one of the first-image-quality key 2705 and the second-image-quality key 2706.

Figure 28A:
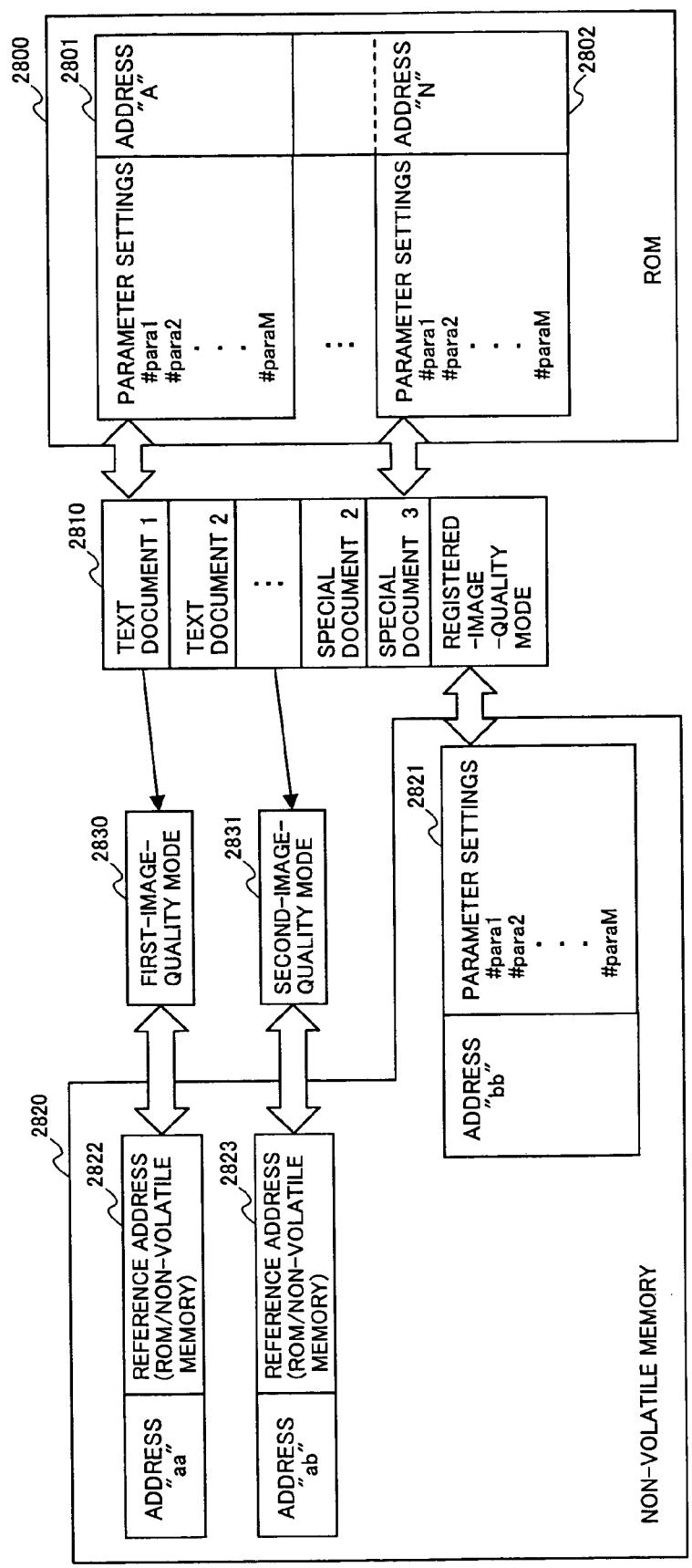
FIGS. 28A and 28B are block diagrams showing a method to store parameters used for setting an image-quality mode.
Figure 28B:
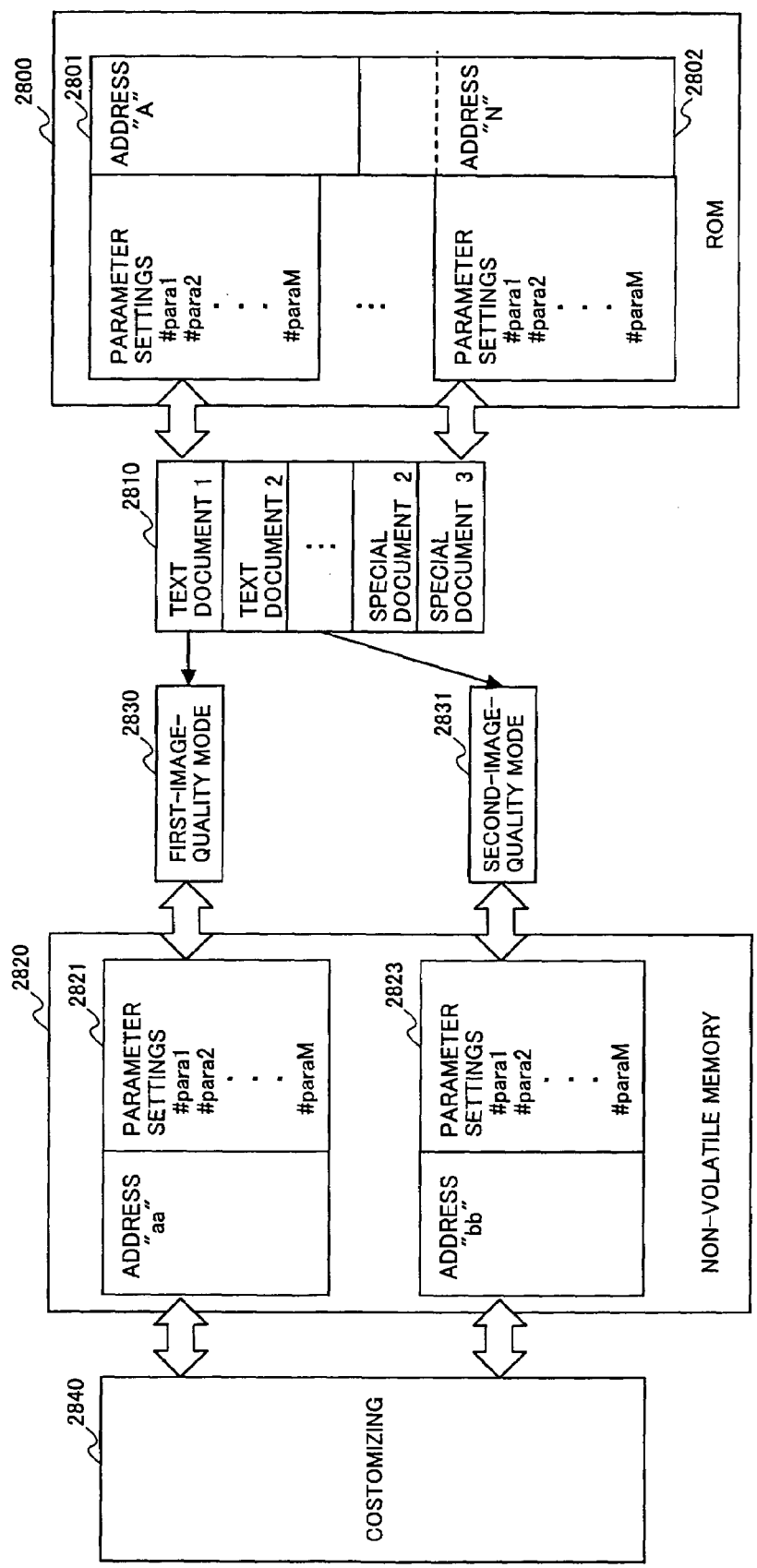

A description will now be given of a method to store parameters used for setting an image-quality mode with reference to FIGS. 28A and 28B. Fixed set values and variable set values are separated from each other and are managed by storing fixed set values in a ROM area and storing variable set values in a non-volatile memory area. FIG. 28A shows a memory structure mainly used for assigning the registered-image-quality mode 2739 to one of a first-image-quality mode 2830 and a second-image-quality mode 2831. FIG. 28B shows a memory structure used for adjusting a predetermined image-quality mode that has been assigned to one of the first-image-quality mode 2830 and the second-mage-quality mode 2831.

As shown in FIG. 28A, parameters for predetermined image-quality modes "text document 1" through "special document 3" are stored in a ROM 2800, and are supplied to a system. For instance, set values for the image-quality mode "text document 1" are stored in an address "A" 2801 of the ROM 2800, and set values for the image-quality mode "special document 3" are stored in an address "N" 2802 of the ROM 2800. On the other hand, parameters of the registered-image-quality mode 2739 are stored in an address "bb" 2821 of a non-volatile memory 2820 so that the parameters, which are objects of customization, can be adjusted. Parameters of the first-image-quality mode 2830 and parameters of the second-image-quality mode 2831 are not stored in the non-volatile memory 2820. Instead, addresses of image-quality modes that have been assigned to the first-image-quality mode 2830 and the second-image-quality mode 2831 are respectively stored in an address "aa" 2822 and an address "ab" 2823 of the non-volatile memory 2820, thereby decreasing the size of the memory being used. It should be noted that each of the addresses of the image-quality modes that have been assigned to the first-quality mode 2830 and the second-image-quality mode 2831 is located in one of the ROM 2800 and the non-volatile memory 2820. When the first-image-quality key 2705 is selected in the operation screen 2700, the address of the image-quality mode that has been assigned to the first-image quality mode 2830 is read from the address "aa" 2822 of the non-volatile memory 2820, and then parameters of the image-quality mode stored in one of the ROM 2800 and the non-volatile memory 2820 are downloaded to a RAM that is used as a work area of the system. Subsequently, the system executes necessary processes on the downloaded parameters.

In the memory structure shown in FIG. 28B, when one of the predetermined image-quality modes "text document 1" through "special document 3" is assigned to either the first-image-quality mode 2830 or the second-image-quality mode 2831, all the parameters of an assigned predetermined image-quality mode stored in the ROM 2800 are copied to an address in the non-volatile memory 2820, or the address of the predetermined image-quality mode is stored in the non-volatile memory 2820. When customizing the predetermined image-quality mode assigned to one of the first-image-quality mode 2830 and the second image quality mode 2831, each of the parameters of the predetermined image-quality mode is overwritten with a new value for adjusting the parameters, and then is stored in the same address as before in the non-volatile memory 2820 if all the parameters of the predetermined image-quality mode are copied to the non-volatile memory 2820. On the other hand, if the address of the predetermined image-quality mode that has been assigned to one of the first-image-quality mode 2830 and the second-image-quality mode 2831 is stored in either the address "aa" 2822 or the address "ab" 2823 of the non-volatile memory 2820, only new values for adjusting the parameters are stored as additional information in one of the address "aa" 2822 and the address "ab" 2823 of the non-volatile memory 2820 with the address of the predetermined image-quality mode in the ROM 2800. When initializing the first-image-quality mode 2830 and the second-image-quality mode 2831, new values for adjusting the parameters of the predetermined image-quality mode are deleted from the non-volatile memory 2820.

Figure 29A:
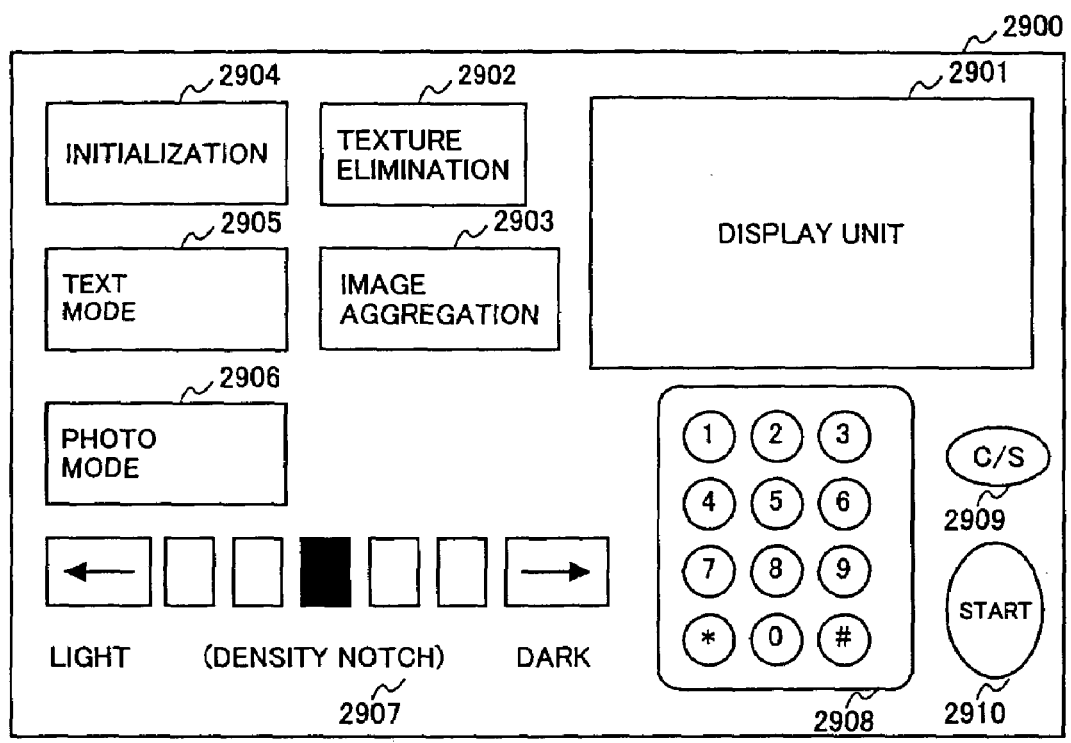

A description will now be given of an operation screen provided in an operation screed provided in an operation unit according to a fourth embodiment of the present invention with reference to FIGS. 29A and 29B. The fourth embodiment increases the operability of the operation unit and the composite device 100 in addition to the above-described previous embodiments. It is preferred that a current image-processing mode or a current image-quality mode being used by a user is kept after adjusting parameters and settings of the composite device by a professional service man. The fourth embodiment especially relates to a method to adjust current set values by increasing and decreasing the set values for each of parameters provided in an image-quality mode in a case that a change in settings of the composite device is necessary. An operation screen 2900 shown in FIG. 29A includes a display unit 2901, a texture-elimination key 2902, an image-aggregation key 2903, an initialization key 2904, a text-mode key 2905, a photo-mode key 2906, density notch 2907, a ten key 2908, a clear/stop (C/S) key 2909, and a start key 2910.

The texture-elimination key 2902 is operated for selecting a texture-tracking level that is a parameter used for reading density of texture of an input document by use of an image-reading system including the document-reading unit 101 among fixed settings. For instance, the texture-elimination key 2902 controls the image-reading system to completely eliminate the texture of the input document, or to keep low density signals of the texture. Additionally, the texture-elimination key 2902 controls a threshold-level used for eliminating density signals after selecting the texture-tracking level. A conversion table for the scanner γ correction is switched according to the selected texture-tracking level also by the texture-elimination key 2902.

The image-aggregation key 2903 is used for turning an image-aggregation process in the memory module on and off. For instance, the number of input documents to be aggregated onto a single printing paper is selected by the image-aggregation key 2903. A method to aggregate the input documents is set by the initialization key 2704.

The text-mode key 2905 and the photo-mode key 2906 are used for selecting an image-processing mode appropriate for recording an image. For instance, the image-processing mode can be a text mode, a photo mode, a text/photo mode, and a special-document mode, each of the modes not being fixed. The image-processing mode is set by the initialization key 2904, and only frequently used image-processing modes are displayed on the operation screen 2900. Infrequently used image-processing modes are selected by use of the initialization key 2904, thereby increasing the operability of the operation unit. When the density of a document to be recorded has been changed by the density notch, a set value of an image reading table is switched to a value corresponding to the changed density.

Image-quality modes to be assigned to the text key and the photo key are selected by the initialization key 2904. A method to adjust image quality for customizing an image-quality mode and a method to select the image-quality mode are shown in FIG. 29B. A text mode 2921 and a photo mode 2922 are initially set to a "text document 1" image-quality mode and a "photo document 1" image-quality mode respectively as factory settings as shown in an operation screen 2920. The "text document 1" mode and the "photo document 1" mode are selected for the text mode 2921 and the photo mode 2922 by a manufacturer of the composite device assuming that most general users of the composite device use the above-mentioned two modes frequently. A user can operate the composite device generally in the "text document 1" mode and the "photo document 1" mode. However, there is a case that the user prefers to adjust some of parameters provided to the text mode 2921 and the photo mode 2922. In such case, one of image-quality modes predetermined by the manufacturer of the composite device considering needs of a market can be selected. However, if a selection of the image-quality modes predetermined by the manufacturer does not satisfy the needs of the user, customization of a predetermined image-quality mode that satisfies the needs of the user the most among the predetermined image-quality modes is necessary.

A predetermined image-quality mode can be selected among a "text document 1" mode 2931, a "text document 2" mode 2932, and a "text document 3" mode 2933 as an image-quality mode appropriate to record a text document. An image-quality mode appropriate for recording a photo document can be selected among a "photo document 1" mode 2934, a "photo document 2" mode 2935, and a "photo document 3" mode 2936. Additionally, an image-quality mode appropriate for recording a special document can be selected among a "special document 1" mode 2937, a "special document 2" mode 2938, and a "special document 3" mode 2939. Each of the text-mode key 2905 and the photo-mode key 2906 is assigned with a frequently used predetermined image-quality mode. It should be noted that text-mode key 2905 and the photo-mode key 2906 are not necessarily assigned with a text document mode and a photo document mode respectively. A plurality of image-quality modes that can be adapted to various image qualities may be displayed on the operation screen 2900 to satisfy various types of needs from users. However, the number of the image-quality modes that are actually used is not large so that the operability of the composite device decreases by displaying the plurality of image-quality modes on the operation screen 2900. Accordingly, an image-quality mode is selected to be displayed on the operation screen 2700 depending on the frequency of the image-quality mode being used.

A description will now be given of adjustable items related to image-quality adjustment and a method to adjust image quality. An image-quality mode should be initially selected among the predetermined image-quality modes shown in an initialization screen 2930 for adjusting parameters of the image-quality mode. For example, when customization of the "text document 2" mode 2932 is executed to satisfy needs of a user, the "text document 2" mode 2932 is initially selected by choosing a "mode selection" item 2951 included in an operation screen 2950. An image-quality mode may be selected in the operation screen 2900. Alternatively, an image-quality mode may be selected by specifying a number provided to the image-quality mode after providing consecutive numbers to the predetermined image-quality modes in the initialization screen 2930.

Adjustable items 2952 displayed on the operation screen 2950 includes, for example, a reading-density correction 2953, and are adjusted by inputting relative values to set values of the adjustable items 2952. For instance, in a case that the "text document 2" mode 2932 has been selected for changing the adjustable items 2952 thereof, set values 2970 of the adjustable items 2952 are displayed as a value "0". The set values 2970 that are set to "0" are not absolute values but standardized values according to parameters of the "text document 2" mode 2932 supplied from the initialization screen 2930. A user or an operator adds a value "1" to the standardized set value "0" corresponding to the reading-density correction 2953 to increase strength of the reading-density correction 2953 relatively to standard strength of the reading-density correction 2953 of the "text document 2" mode 2932. Similarly, the user or the operator subtracts a value "1" from the standardized value "0" to decrease the strength of the reading-density correction 2953 relatively the standard strength of the reading-density correction 2953. A value "1" is added to the standardized set value "0" of a "sharpness: low-density area" item 2959 to increase sharpness of low-density area of a document than the sharpness set by a manufacturer. A value "2" is added to the standardized set value "0" of the "sharpness: low-density area" item 2959 to increase sharpness of the low-density area of the document than the sharpness set by adding "1" to the standardized value "0". Alternatively, a value "1" is subtracted from the standardized set value "0" of the "sharpness: low-density area" item 2959 to decrease sharpness of the low-density area of the document than the sharpness set by the manufacturer.

Each of set values given to the adjustable items 2952 of the predetermined image-quality modes selected by the "mode selection" item 2951 is initially set to a value "0". For instance, when the "text document 1" mode 2931 is selected by the "mode selection" item 2951 of the operation screen 2950, a set value given to a "recording-density correction: solid area" item 2954 is standardized o a value "0". A standard strength for the "recording-density correction: solid area" item of the "text document 1" mode 2931 and that of the "text document 2" mode 2932 are different. However, it is unnecessary to notify a user about the difference in the standard strength of the recording-density correction of the "text document 1" mode 2931 and the "text document 2" mode 2932. Each of the parameters for a predetermined image-quality mode is preferably set to a standard set value. "0" when the predetermined image-quality mode is selected by use of the "mode selection" item 2951 displayed in the operation screen 2950. The adjustable items 2952 of an image-quality mode are displayed in the display unit 2901 of the operation screen 2900 according to the image-quality mode that has been selected. Since some of the adjustable items 2952 are not effective in the most of the predetermined image-quality modes, the display unit 2901 generally does not show all of the adjustable items 2952.

A description will now be given of image-quality adjustment in the operation screen 2950 with reference to FIGS. 30A and 30B. FIG. 30A shows the operation screen 2950 when customizing the "text document 1" mode 2931. FIG. 30B shows the operation screen 2950 when customizing the "photo document 2" mode 2935. The adjustable items 2952 in the operation screen 2950 shown in FIG. 30A does not include an item "sharpness: line drawing (soft)" 2956, whereas the adjustable items 2952 in the operation screen 2950 shown in FIG. 29B includes the item "sharpness: line drawing (soft)" 2956, since a request for adjusting the sharpness of texts in a text document is mainly to sharpen the lines of the texts so that an item to-soften the liens of the texts is unnecessary for a text document mode. Accordingly, the item "sharpness: line drawing (soft)" 2956 is not displayed in the operation screen 2950 when the "text document 1" mode 2931 is selected. For adjusting a density level of the item "reading-density correction" 2953 to be higher or darker, the set value 2970 for the item 2953 should be set from a value "0" to a value "1".

When the "photo document 2" mode 2935 is selected to be customized, the adjustable items 2952 of the "photo document 2" mode 2935 does not include items such as an item "sharpness: line drawing (sharp)" 2955 that is not related to smooth an image on a photo document as shown in FIG. 30B since the "photo document 2" mode 2935 is an image-quality mode that is used for recording an image with smoothed gradation. Each of the adjustable items 2952 of the "photo document 2" mode 2935 is adjusted by substituting a numerical value for a standardized value "0" relatively.

Figure 31A:
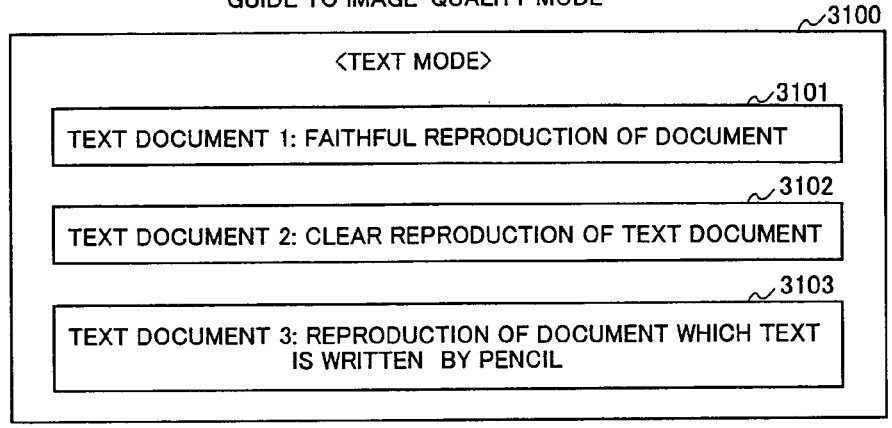
FIGS. 31A, 31B and 31C are block diagrams showing embodiments of a predetermined image-quality mode.
Figure 31B:
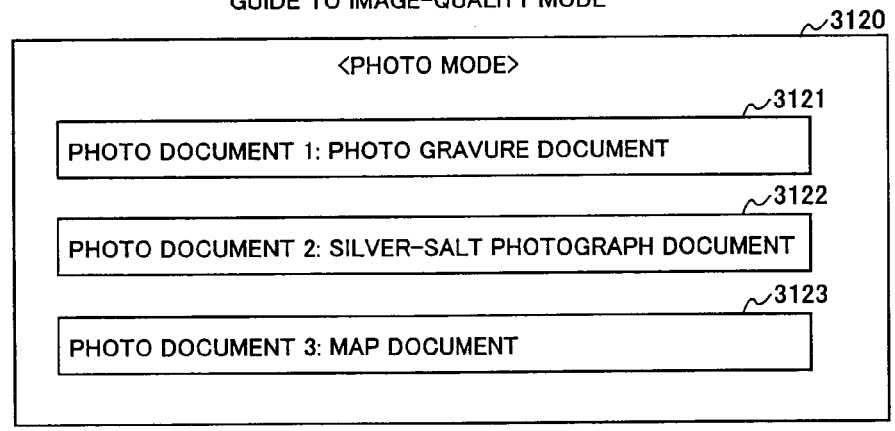
Figure 31C:
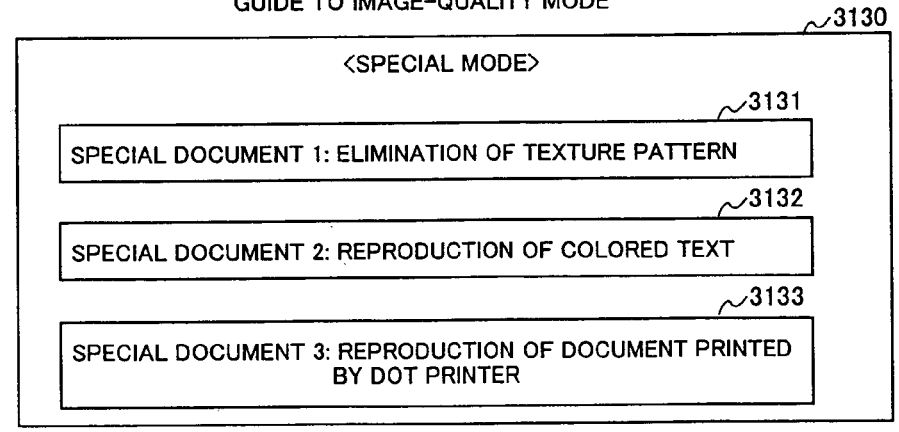

FIGS. 31A, 31B and 31C show embodiments of a predetermined image-quality mode. A text mode 3100 for reading and recording a text document, a photo mode 3120 for a photo document that mainly includes photographs and images and a special mode 3130 for a special document are respectively shown in FIGS. 31A, 31B and 31C. Each of the modes is provided with three types of image-quality modes. However, the number of the modes provided to each of the text mode 3100, the photo mode 3120 and the special mode 3130 may be increased or decreased if necessary. For example, the text mode 3100 includes a "text document 1" mode 3101, a "text document 2" mode 3102 and a "text document 3" mode 3103. The "text document 1" mode 3101 reproduces a text document faithfully. The "text document 2" mode 3102 reproduces texts on the text document clearly. The "text document 3" mode 3103 reproduces texts written by use of a pencil clearly. Additionally, the photo mode 3120 includes a "photo document 1" mode 3121, a "photo document 2" mode 3122 and a "photo document 3" mode 3123. The "photo document 1" mode 3121 reproduces gradation levels of a printed matter such as a photogravure. The "photo document 2" mode 3122 reproduces gradation levels of a silver-salt photograph. The "photo document 3" mode 3123 determines detailed use of colors on a printed matter such as a map. Additionally, the special mode 3130 includes a "special document 1" mode 3131, a "special document 2" mode 3132 and a "special document 3" mode 3133. The "special document 1" mode 3131 reproduces only texts from a printed matter that includes the texts and texture pattern, for example, a certificate of an automobile inspection, by eliminating the texture pattern. The "special document 2" mode 3132 reproduces colored texts clearly included in a printed matter such as a form used for transferring money at a bank. The "special document 3" mode 3133 raises density reproduction of a document such as an image printed by a dot printer, the document including an area which density is supposed to be even but actually is uneven.

Figure 32:
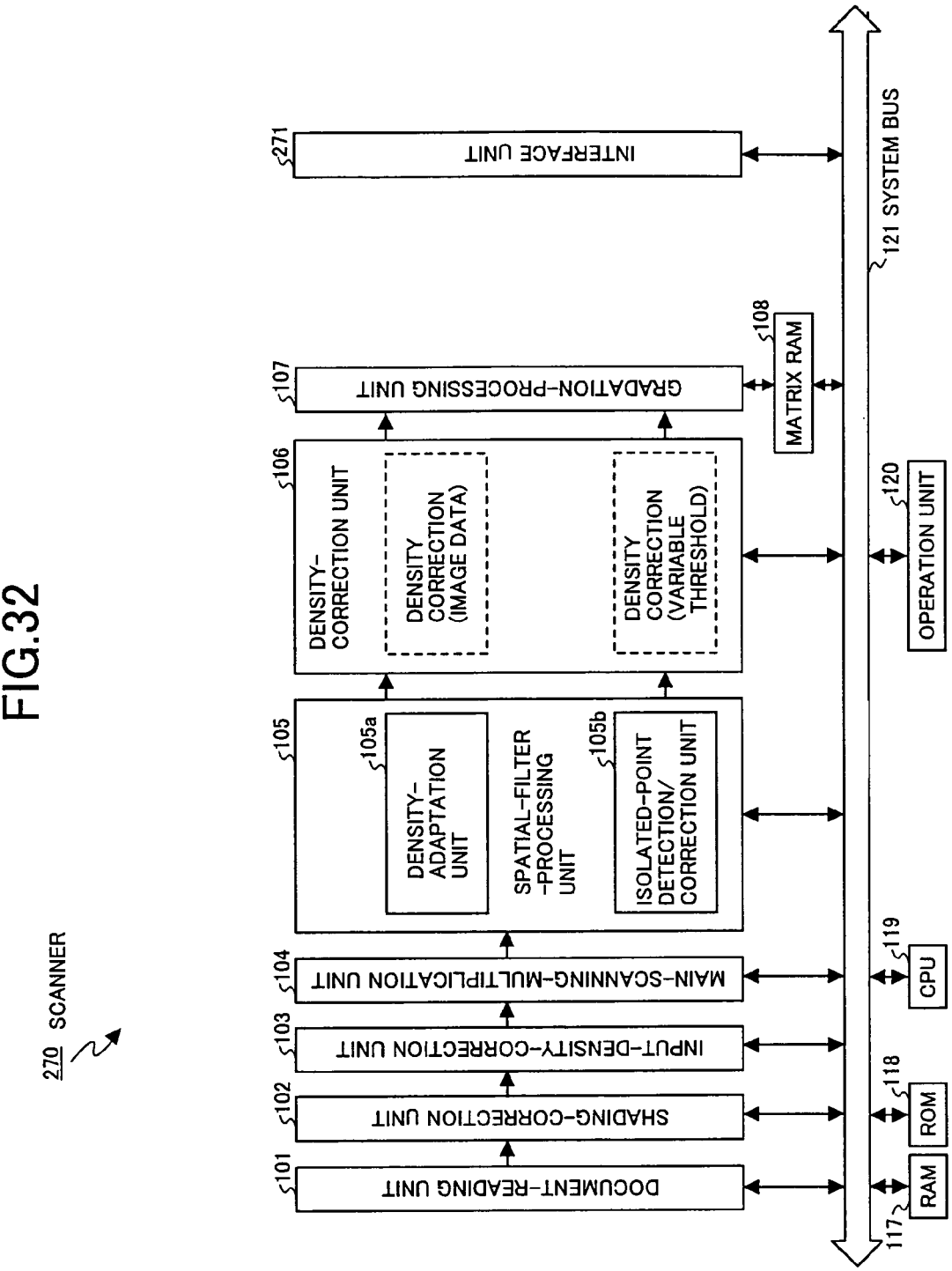
FIG. 32 is a block diagram showing a structure of a scanner according to a fifth embodiment of the present invention.

The above-described embodiments show cases wherein the present invention is adapted to the composite device 100. However, the present invention is not limited to the above-described embodiments, and can be adapted to a scanner. FIG. 32 is a block diagram showing a structure of a scanner according to a fifth embodiment of the present invention. Each unit with a number included in a scanner 270 shown in FIG. 32 corresponds to a unit with the same number included in a scanner part of the composite device 100 shown in FIG. 1. Additionally, the scanner 270 includes an interface unit 271 that is used for transmitting image data to external computers and applications. The scanner 270 controls input-density correction and notch-density correction individually so as to execute the most appropriate density correction, where as a conventional scanner cannot control the input-density correction and the use-density correction individually. The input-density correction is correction on density characteristics that depend on an image reading process. The notch-density correction is linked with operation of a density notch provided in the scanner 270. Accordingly, the scanner 270 can control elimination of stains on the texture of a document and scanning of the document with a desirable density by use of the density notch, for example.

The input-density-correction unit 103 is a processing unit that corrects density characteristics of a document depending on the document-reading unit 101, and converts a density signal-supplied from the shading-correction unit 102 to another digital signal which characteristic is linear to density of an image recorded on a surface of the document. The density-correction unit 106 is a processing unit that attends to density correction of a document read by the document-reading unit 101 according to image data and a variable threshold received from the spatial-filter-processing unit 105, and converts density to be reproduced according to an operation using the density notch. The input-density-correction unit 103 and the density-correction unit 106 are individually controlled by an operation using the operation unit 120. Accordingly, a desirable output image can be obtained by a simple operation using the operation unit 120 after registering, a combination of setting of density correction executed by each of the input-density-correction unit 103 and the density-correction unit 106.

A description will now be given of an image-processing system according to a sixth embodiment of the present invention with reference to FIG. 33. An image-processing system 3300 shown in FIG. 33 includes an image-reading unit 3301, an image-recording unit 3302, a first-density-correction unit 3303, a second-density-correction unit 3304, a third-density-correction unit 3305, a control unit 3306, a video-path-control unit 3307, and a system bus 3308. The control unit 3306 is connected by the system bus 3308 to the units 3301, 3302, 3303, 3304, 3305 and 3307. The video-path-control unit 3307 controls recording of an image read by the image-reading unit 3301 by use of the image-recording unit 3302, and exchanging of data between the an external application and the image-processing system 3300.

The first-density-correction unit 3303 executes correction on density characteristics that depend on an image-reading process, that is, input-density correction. The second-density-correction unit 3304 executes correction on characteristics to reproduce density of a document according to an operation using a density notch provided in the image-processing system 3300, that is, notch-density correction. The third density-correction unit 3305 executes correction on density characteristics that depend on the image-recording unit 3302, that is, recording-density correction. The control unit 3306 controls each of the first-density-correction unit 3303, the second-density-correction unit 3304 and the third-density-correction unit 3305 separately through the system bus 3308 so that each of the units 3303, 3304 and 3305 can execute the most appropriate density correction on an input image. The image-processing system 3300 can control execution of the input-density correction and the notch-density correction separately, whereas a conventional composite device controls the input-density correction and the notch-density correction as a single density correction. Additionally, a user can adjust settings for the recording-density correction in addition to the other density correction at once though the control unit 3306 in the image-processing system 3300 according to the sixth embodiment, whereas the user needs to adjust the setting for the recording-density correction separately from the other density correction in a conventional composite device.

As described above, the present invention is adapted to a composite device and a scanner. However, the present invention is not limited to the above-described embodiments, and may be adapted to a printer. To be concrete, a user can adjust the recording-density correction of a printer by providing the recording-control unit 110 shown in FIG. 1 in the printer.

The above description is provided in order to enable any person skilled in the art to make and use the invention and sets forth the best mode contemplated by the inventors of carrying out the invention.

The present invention is not limited to the specially disclosed embodiments and variations, and modifications may be made without departing from the scope and spirit of the invention.

The present application is based on Japanese Priority Application No. 2000-264423, filed on Aug. 31, 2000, the entire contents of which are hereby incorporated by reference.

What is claimed is:

1. An image-processing device comprising:
   an image-reading unit that reads image data from a document optically;
   an image-recording unit that records the image data read onto recording paper;
   a first-density-correction unit that corrects first density characteristics that depend on said image-reading unit;
   a second-density-correction unit that corrects second characteristics to reproduce density of the document;
   a third-density-correction unit that corrects third density characteristics that depend on said image-recording unit; and
   a control unit that independently controls each of said first, second and third density-correction units to execute density correction.

2. The image-processing device as claimed in claim 1, wherein said control unit includes a switch unit that switches a filter coefficient according to density of said image data, a data-correction unit that executes data correction according to a density level, and a dot-correction unit that corrects formation of dots to be recorded.

3. The image-processing device as claimed in claim 2, wherein said switch unit includes a selection unit that sets a correction coefficient individually for each of a low density area, a high density area, and an intermediate density area based on a fixed threshold, and selects a selection signal.

4. The image-processing device as claimed in claim 2, wherein said data-correction unit sets a signal different from said image data, and executes one of addition of the signal to the said image data and subtraction of the signal from said image data, followed by executing a gradation-reproduction process on said image data.

5. The image-processing device as claimed in claim 2, wherein said dot-correction unit corrects data of adjacent pixels in two dimensions based on arrangement of pixels.

6. The image-processing device as claimed in claim 1, further comprising an image-quality-selecting unit that selects an image-quality mode, wherein said control unit controls one or three of the first, second, and third density correction based on the image-quality mode selected by said image-quality-selecting unit.

7. The image-processing device as claimed in claim 6, wherein said image-quality-selecting unit includes a parameter-grouping unit that collects parameters for density correction as a group, and an image-quality-mode-assigning unit that assigns the group created by the parameter-grouping unit to an image-quality mode.

8. The image-processing device as claimed in claim 7, wherein said image-quality-mode-assigning unit includes an image-quality-mode-selecting unit that selects an image-quality mode for regular use among a plurality of predetermined image-quality modes, an image-quality-correction unit that corrects characteristics of the image-quality mode selected by the image-quality-mode-assigning unit, a parameter-adjusting unit that adjusts parameters for the characteristics of the image-quality mode corrected by the image-quality-correction unit, and a parameter-storing unit that stores the parameters for the characteristics of the image-quality mode adjusted by the parameter-adjusting unit.

9. The image-processing device as claimed in claim 7, wherein said image-quality-mode-assigning unit includes an image-quality-mode-selecting unit that selects an image-quality mode for regular use among a plurality of predetermined image-quality modes, an image-reading-correction unit that corrects image-reading characteristics of said image-processing device, an image-reading-parameter-adjusting unit that adjusts parameters for the image-reading characteristics of the image-processing device corrected by the image-reading-correction unit, and an image-reading-parameter-storing unit that stores the parameters for the image-reading characteristics of the image-processing device adjusted by the image-reading-parameter-adjusting unit.

10. The image-processing device as claimed in claim 7, wherein said image-quality-mode-assigning unit includes an image-quality-mode-selecting unit that selects an image-quality mode for regular use among a plurality of predetermined image-quality modes, a pixel-generation-correction unit that corrects characteristics of pixel generation, a pixel-parameter-adjusting unit that adjusts parameters for the characteristics of the pixel generation corrected by the pixel-generation-correction unit, and a pixel-parameter-storing unit that stores the parameters for the characteristics of the pixel generation adjusted by the pixel-parameter-adjusting unit.

11. The image-processing device as claimed in claim 7, wherein said image-quality-mode-assigning unit includes an image-quality-mode-selecting unit that selects an image-quality mode for regular use among a plurality of predetermined image-quality modes, an image-quality-correction unit that corrects characteristics of the image-quality mode selected by the image-quality-mode-assigning unit, a relative-parameter-adjusting unit that adjusts parameters for the characteristics of the image-quality mode corrected by the image-quality-correction unit relatively to the parameters set once by the image-quality-correction unit, and a parameter-storing unit that stores the parameters for the characteristics of the image-quality mode adjusted by the relative-parameter-adjusting unit.

12. The image-processing device as claimed in claim 7, wherein said image-quality-mode-assigning unit includes an image-quality-mode-selecting unit that selects an image-quality mode for regular use among a plurality of predetermined image-quality modes, an image-reading-correction unit that corrects image-reading characteristics of said image-processing device, a relative-image-reading-parameter-adjusting unit that adjusts parameters for the image-reading characteristics of the image-processing device corrected by the image-reading-correction unit relatively to the parameters once set by the image-reading-correction unit, and an image-reading-parameter-storing unit that stores the parameters for the image-reading characteristics of the image-processing device adjusted by the relative-image-reading-parameter-adjusting unit.

13. The image-processing device as claimed in claim 7, wherein said image-quality-mode-assigning unit includes an image-quality-mode-selecting unit that selects an image-quality mode for regular use among a plurality of predetermined image-quality modes, a pixel-generation-correction unit that corrects characteristics of pixel generation, a relative-pixel-parameter-adjusting unit that adjusts parameters for the characteristics of the pixel generation corrected by the pixel-generation-correction unit relatively to the parameters once set by the pixel-generation-correction unit, and a pixel-parameter-storing unit that stores the parameters for the characteristics of the pixel generation adjusted by the relative-pixel-parameter-adjusting unit.

14. A method of processing an image by use of an image-processing device that includes an image-reading unit, an image-recording unit, a first-density correction unit, a second-density-correction unit and a third-density-correction unit, said method comprising the steps of:
    reading image data from a document optically by use of the image-reading unit;
    recording the image data on recording paper by use of the image-recording unit;
    correcting first density characteristics that depend on said image-reading unit by use of the first-density-correction unit;
    correcting second characteristics to reproduce density of the document by use of the second-density-correction unit;
    correcting third density characteristics that depend on said image-recording unit by use of the third-density correction unit; and
    controlling said first-density-correction unit, said second-density-correction unit, and said third-density-correction unit independently.

15. The method as claimed in claim 14, further comprising the steps of:
    switching a filter coefficient according to density of said image data;
    correcting data according to a density level; and
    correcting formation of dots to be recorded.

16. The method as claimed in claim 15, further comprising the steps of:
    setting a correction coefficient individually for each of a low density area, a high density area, and an intermediate density area based on a fixed threshold; and
    selecting a selection signal among said low, high, and intermediate density areas.

17. The method as claimed in claim 15, further comprising the steps of:
    setting a signal different from said image data;
    executing one of addition of the signal to the said image data and subtraction of the signal from said image data; and
    executing a gradation-reproduction process on said image data.

18. The method as claimed in claim 15, further comprising the step of correcting data of adjacent pixels in two dimensions based on arrangement of pixels.

19. The method as claimed in claim 14, further comprising the steps of:
    selecting an image-quality mode that determines a type of image processing; and
    controlling density correction executed by one or all of the first, second, and third density correction units based on the image-quality mode selected.

20. The method as claimed in claim 19, further comprising the steps of:
    collecting parameters for the density correction as a group; and
    assigning the created group to an image-quality mode.

21. An image-processing device comprising:
    an image-reading unit that reads image data from a document optically;
    an image-recording unit that records the image data read by said image-reading unit onto recording paper;
    a first-density-correction unit that corrects first density characteristics that depend on said image-reading unit;
    a second-density-correction unit that corrects second characteristics to reproduce density of the document; and
    a control unit that independently controls each of said first and second density-correction units to execute density correction based on an image-quality mode applied by an operation unit.

22. The image-processing device as claimed in claim 21, wherein said operation unit includes an operation screen where image-quality modes are displayed, one of said image-quality modes being selected so that each of said first and second density-correction units is adjusted individually by the control unit.

23. An image-processing device comprising:
    an image-reading unit that reads image data from a document optically;
    an image-recording unit that records the image data read by said image-reading unit onto recording paper;
    a density-correction unit that corrects density characteristics that depend on said image-recording unit; and
    a control unit that independently controls said density-correction unit to execute density correction based on an image-quality mode applied by an operation unit, wherein
    a correction pattern according to characteristics of the image-recording unit can be set independently from a correction pattern according to the image-quality mode.

24. The image-processing device as claimed in claim 23, wherein said operation unit includes an operation screen where image-quality modes are displayed, one of said image-quality modes being selected so that said density-correction unit is adjusted individually by the control unit.

25. A method of processing an image by use of an image-processing device that includes an image-reading unit, an image-recording unit, a first-density correction unit and a second-density-correction unit, said method comprising the steps of:
    reading image data from a document optically by use of the image-reading unit;
    recording the image data on recording paper by use of the image-recording unit;
    correcting first density characteristics that depend on said image-reading unit by use of the first-density-correction unit;

correcting second characteristics to reproduce density of the document by use of the second-density-correction unit; and controlling said first-density-correction unit and said second-density-correction unit independently.

26. The method as claimed in claim 25, further comprising the steps of:

selecting an image-quality mode that determines a type of image processing; and controlling density correction executed by one or both of said first and second density-correction units independently based on the image-quality mode selected.

27. A method of processing an image by use of an image-processing device that includes an image-reading unit, an image-recording unit and a density correction unit, said method comprising the steps of:

reading image data from a document optically by use of the image-reading unit;

recording the image data on recording paper by use of the image-recording unit;

correcting density characteristics that depend on said image-recording unit by use of the density correction unit; and controlling said density-correction unit independently; wherein a correction pattern according to characteristics of the image-recording unit can be set independently from a correction pattern according to the image-quality mode.

28. The method as claimed in claim 27, further comprising the steps of:

selecting an image-quality mode that determines a type of image processing; and controlling density correction executed by said density-correction unit independently based on the image-quality mode selected.

29. A record medium readable by a machine, tangibly embodying a program of instructions executable by the machine to perform method steps for processing an image by use of an image-processing device that includes an image-reading unit an image-recording unit, a first-density-correction unit, a second-density-correction unit and a third-density-correction unit, said method steps comprising:

reading image data from a document optically by use of the image-reading unit;

recording the image data on recording paper by use of the image-recording unit;

correcting first density characteristics that depend on said image-reading unit by use of the first-density-correction unit;

correcting second characteristics to reproduce density of the document by use of the second-density-correction unit;

correcting third density characteristics that depend on said image-recording unit by use of the third-density correction unit; and controlling said first-density-correction unit, said second-density-correction unit, and said third-density-correction unit independently.

30. The record medium as claimed in claim 29, wherein said method steps comprising:

selecting an image-quality mode that determines a type of image processing; and controlling density correction executed by said density-correction unit independently based on the image-quality mode selected.

31. An image-processing system comprising:

an image-reading unit that reads image data from a document optically;

an image-recording unit that records the image data read onto recording paper;

a first-density-correction unit that corrects first density characteristics that depend on said image-reading unit;

a second-density-correction unit that corrects second characteristics to reproduce density of the document;

a third-density-correction unit that corrects third density characteristics that depend on said image-recording unit;

a control unit that independently controls each of said first, second and third density-correction units to execute density correction; and an external-application interface that exchanges the image data with an external application.

32. The image-processing system as claimed in claim 31, wherein the image data is transmitted through said external-application interface to the external application after being processed through said first and second density-correction unit.

33. The image-processing system as claimed in claim 31, wherein the image data is processed through said third-density-correction unit after being received from the external application through said external-application interface.

34. The image processing device of claim 23, wherein the correction pattern of the density correction unit is registerable.

35. The method of claim 27, wherein the correction pattern of the density correction unit is registerable.

* * * * *